United States Patent
Tsuboi et al.

(10) Patent No.: US 12,225,389 B2
(45) Date of Patent: *Feb. 11, 2025

(54) STATION PLACEMENT ASSISTANCE METHOD, STATION PLACEMENT ASSISTANCE APPARATUS AND STATION PLACEMENT ASSISTANCE PROGRAM

(71) Applicant: NIPPON TELEGRAPH AND TELEPHONE CORPORATION, Tokyo (JP)

(72) Inventors: Hideyuki Tsuboi, Musashino (JP); Kazuto Goto, Musashino (JP); Hideki Toshinaga, Musashino (JP); Shuki Wai, Musashino (JP); Tatsuhiko Iwakuni, Musashino (JP); Daisei Uchida, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 423 days.

This patent is subject to a terminal disclaimer.

(21) Appl. No.: 17/787,881

(22) PCT Filed: Dec. 25, 2019

(86) PCT No.: PCT/JP2019/050921
§ 371 (c)(1),
(2) Date: Jun. 21, 2022

(87) PCT Pub. No.: WO2021/130923
PCT Pub. Date: Jul. 1, 2021

(65) Prior Publication Data
US 2023/0022178 A1     Jan. 26, 2023

(51) Int. Cl.
*H04W 16/18*      (2009.01)

(52) U.S. Cl.
CPC ............... *H04W 16/18* (2013.01)

(58) Field of Classification Search
CPC ................................................ H04W 16/18
(Continued)

(56) References Cited

U.S. PATENT DOCUMENTS

2006/0003774 A1*   1/2006   Byun ............... H04W 16/18
                                                                         455/452.1

OTHER PUBLICATIONS

Sean Kinney, Telecom Infra Project focuses on millimeter wave for dense networks, Image courtesy of the Telecom Infra Project, RCR Wireless News, Intelligence on all things wireless, Sep. 13, 2017, https://www.rcrwireless.com/20170913/carriers/telecom-infra-project-millimeter-wave-tag17.

(Continued)

*Primary Examiner* — Sibte H Bukhari
(74) *Attorney, Agent, or Firm* — Harness, Dickey & Pierce, P.L.C.

(57) ABSTRACT

The present invention performs: generating base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and specifying a reliability coefficient indicating a degree of reliability of a (Continued)

processing result of a prescribed evaluation processing performed based on the point cloud data, based on the base station positional relationship specification data and the terminal station positional relationship specification data generated.

11 Claims, 36 Drawing Sheets

(58) Field of Classification Search
USPC .......................................................... 370/328
See application file for complete search history.

(56) References Cited

OTHER PUBLICATIONS

Frederic Lardinois, Facebook-backed Telecom Infra Project adds a new focus on millimeter wave tech for 5G, TechCrunch, Sep. 13, 2017, https://techcrunch.com/2017/09/12/facebook-backed-telecom-infra-project-adds-a-new-focus-on-millimeter-wave-tech-for-5g/?renderMode=ie11.

Jamie Davies, DT and Facebook TIP the scales for mmWave, telecoms.com, Sep. 12, 2017, http://telecoms.com/484622/dt-and-facebook-tip-the-scales-for-mmwave/.

* cited by examiner

Fig. 5

| POSITIONAL RELATIONSHIP PATTERN | BASE STATION CANDIDATE POSITION | TERMINAL STATION CANDIDATE POSITION | RELIABILITY COEFFICIENT |
|---|---|---|---|
| pt1 | WITHIN PROXIMITY RANGE | WITHIN PROXIMITY RANGE | ◎ 100 |
| pt2 | WITHIN PROXIMITY RANGE | OUTSIDE OF PROXIMITY RANGE BUT WITHIN MEASURABLE RANGE | ○ 80 |
| pt3 | WITHIN PROXIMITY RANGE | OUTSIDE OF MEASURABLE RANGE | △ 50 |
| pt4 | OUTSIDE OF PROXIMITY RANGE BUT WITHIN MEASURABLE RANGE | WITHIN PROXIMITY RANGE | ○ 80 |
| pt5 | OUTSIDE OF PROXIMITY RANGE BUT WITHIN MEASURABLE RANGE | OUTSIDE OF PROXIMITY RANGE BUT WITHIN MEASURABLE RANGE | ● 60 |
| pt6 | OUTSIDE OF PROXIMITY RANGE BUT WITHIN MEASURABLE RANGE | OUTSIDE OF MEASURABLE RANGE | ▲ 30 |
| pt7 | OUTSIDE OF MEASURABLE RANGE | WITHIN PROXIMITY RANGE | △ 50 |
| pt8 | OUTSIDE OF MEASURABLE RANGE | OUTSIDE OF PROXIMITY RANGE BUT WITHIN MEASURABLE RANGE | ▲ 30 |
| pt9 | OUTSIDE OF MEASURABLE RANGE | OUTSIDE OF MEASURABLE RANGE | × 0 |

| POSITIONAL RELATIONSHIP PATTERN | BASE STATION CANDIDATE POSITION | TERMINAL STATION CANDIDATE POSITION | RELIABILITY COEFFICIENT | CORRESPONDING POSITIONAL RELATIONSHIP PATTERN |
|---|---|---|---|---|
| ptA | WITHIN MEASURABLE RANGE | WITHIN MEASURABLE RANGE | ◎ 100 | pt1, pt2, pt4, pt5 |
| ptB | WITHIN MEASURABLE RANGE | OUTSIDE OF MEASURABLE RANGE | △ 50 | pt3, pt6 |
| ptC | OUTSIDE OF MEASURABLE RANGE | WITHIN MEASURABLE RANGE | △ 50 | pt7, pt8 |
| ptD | OUTSIDE OF MEASURABLE RANGE | OUTSIDE OF MEASURABLE RANGE | × 0 | pt9 |

Fig. 23

| RELIABILITY INDEX VALUE | | | RELIABILITY COEFFICIENT | | |
|---|---|---|---|---|---|
| BASE STATION (X) | TERMINAL STATION (Y) | AVERAGE | COEFFICIENT PATTERN 1 | COEFFICIENT PATTERN 2 | COEFFICIENT PATTERN 3 |
| 100 | 100 | 100.0 | 100.0 | 100.0 | 100.0 |
| 100 | 50 | 75.0 | 62.5 | 60.9 | 66.1 |
| 100 | 0 | 50.0 | 50.0 | 43.8 | 50.0 |
| 50 | 100 | 75.0 | 62.5 | 60.9 | 55.4 |
| 50 | 50 | 50.0 | 25.0 | 25.0 | 25.0 |
| 50 | 0 | 25.0 | 12.5 | 10.9 | 12.5 |
| 0 | 100 | 50.0 | 50.0 | 43.8 | 35.7 |
| 0 | 50 | 25.0 | 12.5 | 10.9 | 8.9 |
| 0 | 0 | 0.0 | 0.0 | 0.0 | 0.0 |

STATION PLACEMENT ASSISTANCE METHOD, STATION PLACEMENT ASSISTANCE APPARATUS AND STATION PLACEMENT ASSISTANCE PROGRAM

CROSS-REFERENCE TO RELATED APPLICATIONS

This application is a 371 U.S. National Phase of International Application No. PCT/JP2019/050921, filed on Dec. 25, 2019. The entire disclosure of the above application is incorporated herein by reference.

TECHNICAL FIELD

The present invention relates to a station placement assistance method, a station placement assistance apparatus, and a station placement assistance program.

BACKGROUND ART

FIG. 36 is a diagram of a use case proposed by mmWave Networks (see, for example, NPLs 1 to 3) partially modified and simplified for reference in a Telecom InfraProjcet (TIP) (main members: Facebook, Deutsche Telecom, Intel, NOKIA, etc.) which is a consortium for promoting open specifications of communication network devices in general. mmWave Networks is one of the TIP project groups, aiming to build networks faster and cheaper than the deployment of optical fibers by using millimeter-wave radio in unlicensed bands.

In buildings such as buildings 800 and 801 and houses 810, 811 and 812 illustrated in FIG. 36, terminal station apparatuses (hereinafter referred to as "terminal stations") 840 to 844 installed on respective wall surfaces of the buildings and base station apparatuses (hereinafter referred to as "base stations") 830 to 834 installed on utility poles 821 to 826 are apparatuses called mmWave Distribution Nodes (DNs).

The base stations 830 to 834 are connected to the communication apparatuses provided in the station buildings (Fiber Point of Presence (PoP)) 850 and 851 by optical fibers 900 and 901. The communication apparatus is connected to a communication network of a provider. Between the terminal stations 840 to 844 and the base stations 830 to 834 (hereinafter, also referred to as "between the two stations"), mmWave Link, that is, millimeter wave radio is performed. In FIG. 36, a link of millimeter wave radio is indicated in a dashed line.

In a form in which the base stations 830 to 834 are installed on the utility poles 821 to 826, the terminal stations 840 to 844 are installed on the wall surfaces of the buildings, and communication is performed by millimeter wave radio between the two stations, selecting candidate positions for installing the base stations 830 to 834 and the terminal stations 840 to 844 is referred to as base-station design (hereinafter also referred to as "station placement").

CITATION LIST

Non Patent Literature

NPL 1: Sean Kinney, "Telecom Infra Project focuses on millimeter wave for dense networks, Millimeter Wave Networks Project Group eyes 60 GHz band", Image courtesy of the Telecom Infra Project, RCR Wireless News, Intelligence on all things wireless, Sep. 13, 2017, [Searched on Dec. 16, 2019], Internet (URL: https://www.rcrwireless.com/20170913/carriers/telecom-infra-project-millimeter-wave-tag17)

NPL 2: Frederic Lardinois, "Facebook-backed Telecom Infra Project adds a new focus on millimeter wave tech for 5G", [Searched on Dec. 16, 2019], Internet (URL: https://techcrunch.com/2017/09/12/facebook-backed-telecom-infra-project-adds-a-new-focus-on-millimeter-wave-tech-for-5g/?renderMode=ie11)

NPL 3: Jamie Davies, "DT and Facebook TIP the scales for mmWave", GLOTEL AWARDS 2019, telecoms.com, Sep. 12, 2017, [Searched on Dec. 16, 2019], Internet (URL: http://telecoms.com/484622/dt-and-facebook-tip-the-scales-for-mmwave/)

SUMMARY OF THE INVENTION

Technical Problem

As a method for base-station design, there is a method using three-dimensional point cloud data obtained by imaging a space. In this approach, for example, the three-dimensional point cloud data is acquired by first a moving body such as a vehicle equipped with a Mobile Mapping System (MMS) traveling along a road around a residential area to be evaluated. Next, the wireless communication between the base stations 830 to 834 and the terminal stations 840 to 844 is evaluated by utilizing the acquired point cloud data. As an evaluation means, there are a means for making a line-of-sight determination in three dimensions between the two stations, and a means for calculating a shield factor. Here, the "shield factor" is an index indicating how much an object present between the base stations 830 to 834 and the terminal stations 840 to 844 affects the wireless communication, and may be referred to as a "transmittance" from the perspective of the opposite viewpoint. In order to perform these evaluation means, it is necessary to have point cloud data for all evaluation targets in the space including the candidate positions of the base stations 830 to 834 and the terminal stations 840 to 844.

However, in the area configured as the evaluation target in the apparatus that assists the base-station design, there are many places in which point cloud data cannot be partially obtained even if the moving body equipped with the MMS travels vertically and horizontally in advance. In such a case where the base-station design is performed using the apparatus based on the point cloud data in which information is partially missing, a processing result with low accuracy may be output.

For example, suppose that a certain object is present in the space between the base station 830 and the terminal station 840, but the point cloud data of the object cannot be acquired. At this time, even in a case where the apparatus that assists station placement makes use of the acquired point cloud data to make the line-of-sight determination in three dimensions between the two stations and perform the shield factor calculation, the processing is performed assuming that there is no object that shields between the two stations because there is no point cloud data of the space between the two stations. As a result, the apparatus that assists the base-station design may determine "good line-of-sight" or calculate a "low shield factor" sufficient for wireless communication. Thus, the reliability of the processing result is reduced, and the user may make erroneous decisions, for example, installing the terminal station 840 at a position on a wall surface of a building that is not appropriate.

There are cases in which either the base station 830 or the terminal station 840 is present in a range in which the point cloud data is not acquired, or cases in which either the base station 830 or the terminal station 840 is not present in a range in the proximity of the travel trajectory on which a moving body equipped with the MMS has traveled. In these cases, depending on the positional relationship between the base station 830, the terminal station 840, and the travel trajectory, the processing of line-of-sight determination in three dimensions and the shield factor calculation may be affected. Thus, the reliability of these processing results may be reduced, and the user may make erroneous decisions.

In light of the foregoing, an object of the present invention is to provide a technique for enabling a user to perform an appropriate base-station design even in a case where the state of acquisition of the point cloud data of the space between the position which is a candidate for the installation of the base station and the position which is a candidate for the installation of the terminal station is not good.

Means for Solving the Problem

An aspect of the present invention is a station placement assistance method including: specifying a positional relationship including generating base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and specifying a reliability coefficient indicating a degree of reliability of a processing result of a prescribed evaluation processing performed based on the point cloud data, based on the base station positional relationship specification data and the terminal station positional relationship specification data.

An aspect of the present invention is a station placement assistance apparatus including: a positional relationship specification unit configured to generate base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and a reliability coefficient specification unit configured to specify a reliability coefficient indicating a degree of reliability of a processing result of a prescribed evaluation processing performed based on the point cloud data, based on the base station positional relationship specification data and the terminal station positional relationship specification data.

An aspect of the present invention is a station placement assistance program for causing a computer to perform: specifying a positional relationship including generating base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and specifying a reliability coefficient indicating a degree of reliability of a processing result of a prescribed evaluation processing performed based on the point cloud data, based on the base station positional relationship specification data and the terminal station positional relationship specification data.

Effects of the Invention

According to the present invention, even in a case where the state of acquisition of the point cloud data of the space between the position which is a candidate for the installation of the base station and the position which is a candidate for the installation of the terminal station is not good, it is possible for the user to perform an appropriate base-station design.

BRIEF DESCRIPTION OF DRAWINGS

FIG. 5 is a diagram (Part 1) illustrating a data configuration of a reliability coefficient table according to the second embodiment.

FIG. 6 is a diagram (Part 2) illustrating a data configuration of a reliability coefficient table according to the second embodiment.

FIG. 23 is a diagram illustrating relationships between reliability index values and reliability coefficients according to the third embodiment.

DESCRIPTION OF EMBODIMENTS

First Embodiment

Figure 1:
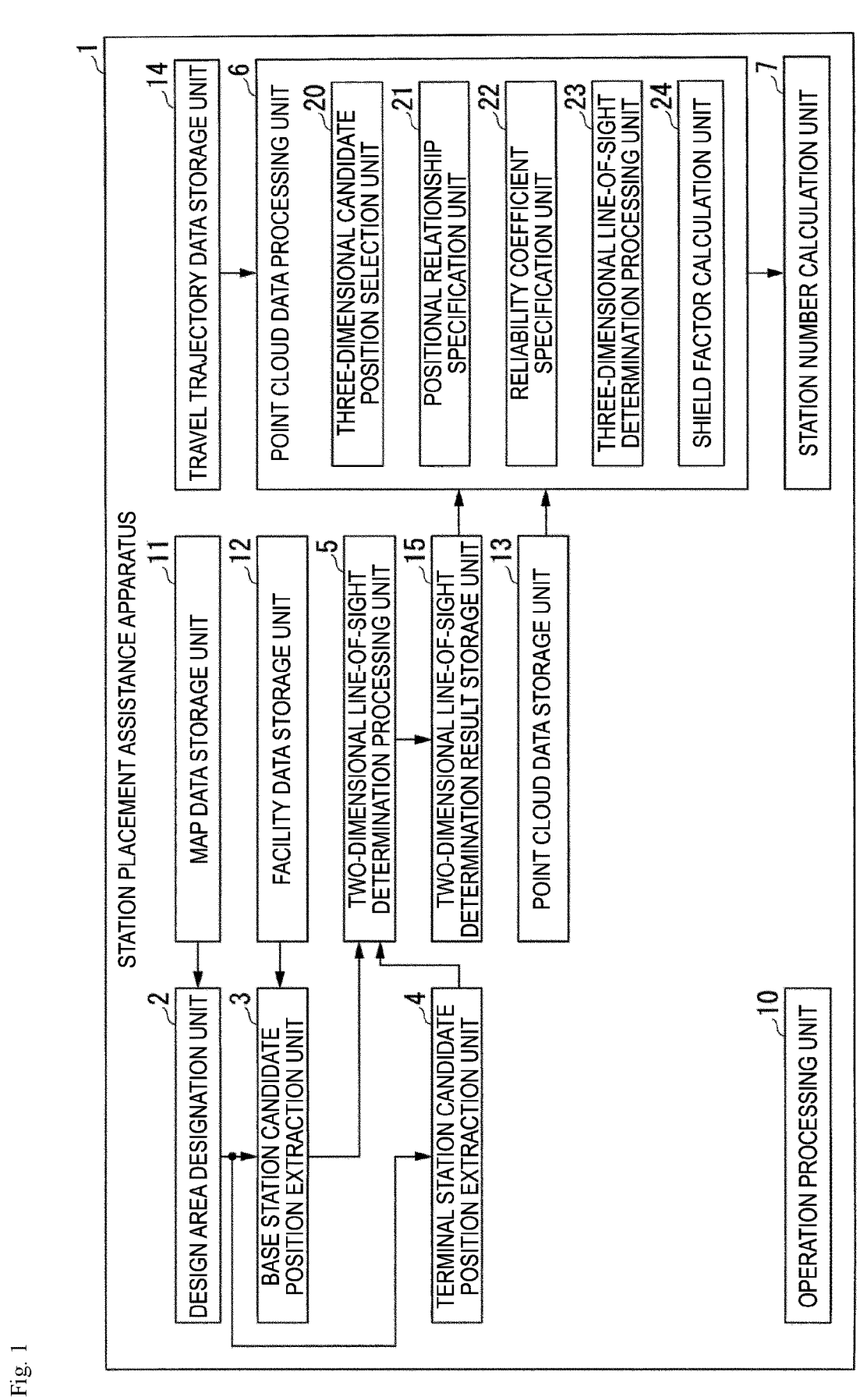
FIG. 1 is a block diagram illustrating a configuration of a station placement assistance apparatus according to a first embodiment.

Embodiments of the present invention will be described below with reference to the drawings. FIG. 1 is a block diagram illustrating a configuration of a station placement assistance apparatus 1 which is an apparatus that assists a base-station design according to a first embodiment. The station placement assistance apparatus 1 includes a design area designation unit 2, a base station candidate position extraction unit 3, a terminal station candidate position extraction unit 4, a two-dimensional line-of-sight determination processing unit 5, a point cloud data processing unit 6, a station number calculation unit 7, a map data storage unit 11, an operation processing unit 10, a facility data storage unit 12, a point cloud data storage unit 13, a travel trajectory data storage unit 14, and a two-dimensional line-of-sight determination result storage unit 15. The point cloud data processing unit 6 includes a three-dimensional candidate position selection unit 20, a positional relationship specification unit 21, a reliability coefficient specification unit 22, a three-dimensional line-of-sight determination processing unit 23, and a shield factor calculation unit 24.

Data stored in advance by the map data storage unit 11, the facility data storage unit 12, the point cloud data storage unit 13, and the travel trajectory data storage unit 14 included in the station placement assistance apparatus 1 will be described.

The map data storage unit 11 stores two-dimensional map data in advance. The map data includes, for example, data indicating the position and shape of a building that is a candidate at which a terminal station is installed, data indicating the range of the site of the building, data indicating a road, and the like. The facility data storage unit 12 stores base station candidate position data (hereinafter referred to as "two-dimensional base station candidate position data") in a two-dimensional coordinate system indicating the position of a base station installation structure which is an outdoor facility such as a utility pole that is a candidate at which a base station is installed.

The point cloud data storage unit 13 stores three-dimensional point cloud data acquired by the MMS, for example. The travel trajectory data storage unit 14 stores in advance travel trajectory data indicating a travel trajectory in which a moving body such as a vehicle equipped with the MMS has traveled. Here, the travel trajectory data is data represented by a two-dimensional line segment in a coordinate system of map data, for example.

Figure 2:
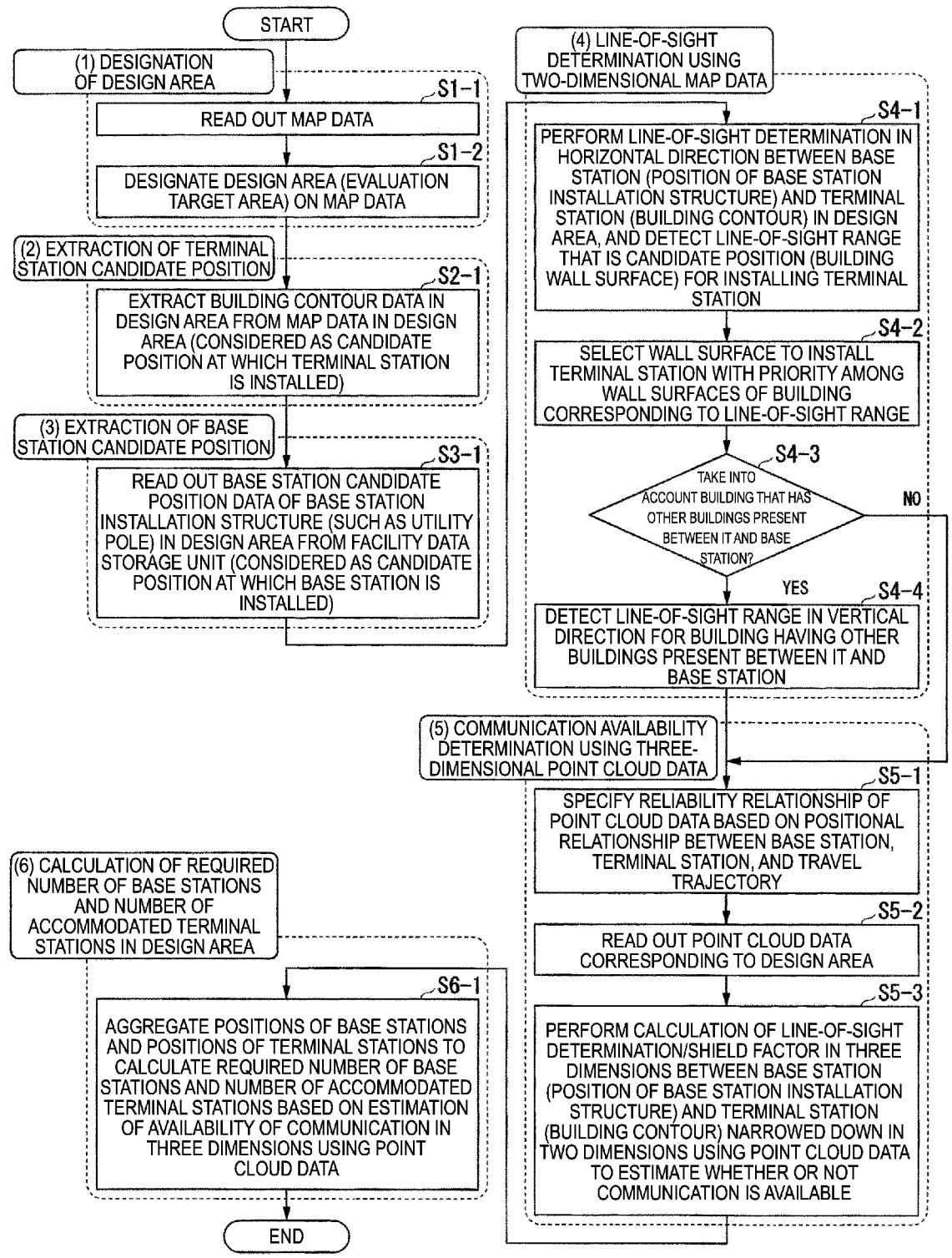
FIG. 2 is a flowchart illustrating a process flow according to the first embodiment.

Hereinafter, the configuration of each of the functions of the station placement assistance apparatus 1 and the process flow of the station placement assistance method by the station placement assistance apparatus 1 will be described with reference to the flowchart illustrated in FIG. 2.

The design area designation unit 2 reads out two-dimensional map data from the map data storage unit 11 (step S1-1). The design area designation unit 2 writes and stores the read map data in, for example, a working memory. The design area designation unit 2 selects, in the map data stored in the working memory, an area of a rectangular shape based on, for example, an instruction signal designating a range of the design area output by the operation processing unit 10 in response to the user operation of the station placement assistance apparatus 1. The design area designation unit 2 designates the selected area as the design area (step S1-2).

The terminal station candidate position extraction unit 4 extracts building contour data indicating the position and shape of the building from map data in the design area from the map data for each building (step S2-1). The building contour data extracted by the terminal station candidate position extraction unit 4 is data indicating a wall surface of a building on which the terminal station is likely to be installed, and is considered to be a position which is a candidate at which the terminal station is installed.

The terminal station candidate position extraction unit 4 generates and imparts, to the building contour data for each building to be extracted, building identification data which is identification information capable of uniquely identifying individual buildings. The terminal station candidate position extraction unit 4 outputs the imparted building identification data in association with the building contour data corresponding to the building.

The base station candidate position extraction unit 3 reads out and outputs, from the facility data storage unit 12, the two-dimensional base station candidate position data corresponding to the base station installation structure located within the design area designated by the design area designation unit 2 (step S3-1). Note that, in a case where the coordinates of the map data stored in the map data storage unit 11 and the coordinates of the two-dimensional base station candidate position data stored in the facility data storage unit 12 are not the same, the base station candidate position extraction unit 3 converts the coordinates of the read two-dimensional base station candidate position data to the coordinate system of the map data.

The two-dimensional line-of-sight determination processing unit 5 uses building contour data for each building output by the terminal station candidate position extraction unit 4 for each two-dimensional base station candidate position data output by the base station candidate position extraction unit 3, and determines the presence or absence of a line-of-sight for each building in the horizontal direction from the position indicated by each two-dimensional base station candidate position data by the means described in Literature 1 (JP 2019-004727) for example. The two-dimensional line-of-sight determination processing unit 5 detects a line-of-sight range in the building determined to have a line-of-sight, that is, wall surfaces of the building, as the line-of-sight range (step S4-1).

The two-dimensional line-of-sight determination processing unit 5 selects a candidate for the wall surface of the building on which the terminal station is installed with higher priority among the wall surfaces of the building corresponding to the detected line-of-sight range. In a case where the line-of-sight range of a certain building includes a plurality of wall surfaces, the two-dimensional line-of-sight determination processing unit 5 considers, for example, the wall surface closer to the base station as the wall surface on which the terminal station is installed with priority, and selects the wall surface as the final line-of-sight range in the horizontal direction.

The two-dimensional line-of-sight determination processing unit 5 associates building contour data of a building having a line-of-sight range detected in the horizontal direction with data indicating the line-of-sight range in the horizontal direction of the building, for each base station candidate position, and writes and stores the data in the two-dimensional line-of-sight determination result storage unit 15 (step S4-2). As a result, for each two-dimensional base station candidate position data, the building identification data of the building and the data indicating the line-of-sight range in the horizontal direction of the building corresponding to the building identification data are stored in the two-dimensional line-of-sight determination result storage unit 15.

The two-dimensional line-of-sight determination processing unit 5 determines whether to receive, from the operation processing unit 10, an instruction signal indicating "an instruction taking into account a building that has other buildings present between it and the base station candidate position" output by the operation processing unit 10 in response to the user operation of the station placement assistance apparatus 1 (step S4-3). Note that, the user of the station placement assistance apparatus 1 selects in advance whether to take into account a building having other buildings present between it and the base station candidate position before the process of FIG. 2 is started, and in a case of selecting to take into account, the operation processing unit 10 outputs an instruction signal indicating the "instruction to take into account a building having other buildings present between it and the base station candidate position" in response to the user operation.

In a case where the two-dimensional line-of-sight determination processing unit 5 determines that the instruction signal has not been received (step S4-3, No), the process proceeds to step S5-1. On the other hand, in a case where the two-dimensional line-of-sight determination processing unit 5 determines that the instruction signal has been received (step S4-3, Yes), the process proceeds to step S4-4.

The two-dimensional line-of-sight determination processing unit 5 detects, for each two-dimensional base station candidate position data, a building having other buildings present between it and a position indicated by the two-dimensional base station candidate position data, among buildings in the design area, as a line-of-sight detection target building in the vertical direction. The two-dimensional line-of-sight determination processing unit 5, for example, refers to the two-dimensional line-of-sight determination result storage unit 15, considers a building in which the line-of-sight range in the horizontal direction is not detected as a building having other buildings between it and the position indicated by the two-dimensional base station candidate position data, for each two-dimensional base station candidate position data, and detects the building as a line-of-sight detection target building in the vertical direction (hereinafter, the line-of-sight detection target building in the vertical direction is also referred to as a "line-of-sight detection target building").

The two-dimensional line-of-sight determination processing unit 5 fetches, from outside, data indicating the installation altitude for each base station candidate position designated by the user, and data indicating the height of the building, for example, in response to the user operation of the station placement assistance apparatus 1.

The two-dimensional line-of-sight determination processing unit 5 detects a line-of-sight range in the vertical direction from the height of installation altitude at the base station candidate position by using the fetched data indicating the height of the building for each line-of-sight detection target building for each detected base station candidate position. The two-dimensional line-of-sight determination processing unit 5 associates building identification data of a building in which a line-of-sight range in the vertical direction is detected with data indicating the line-of-sight range in the vertical direction detected in the building, and writes and stores the data in the two-dimensional line-of-sight determination result storage unit 15 (step S4-4). As a result, for each two-dimensional base station candidate position data, the building identification data of the building and the data indicating the line-of-sight range in the horizontal and vertical directions of the building corresponding to the building identification data are stored in the two-dimensional line-of-sight determination result storage unit 15.

In the point cloud data processing unit 6, the three-dimensional candidate position selection unit 20 selects a base station candidate position which is a candidate for installing the base station in the three-dimensional space, and a terminal station candidate position which is a candidate for installing the terminal station in the three-dimensional space.

For example, the user of the station placement assistance apparatus 1 operates the operation processing unit 10 to select any one of two-dimensional base station candidate position data from the two-dimensional line-of-sight determination result storage unit 15. The operation processing unit 10 outputs the selected two-dimensional base station candidate position data to the three-dimensional candidate position selection unit 20. The three-dimensional candidate position selection unit 20 fetches the two-dimensional base station candidate position data output by the operation processing unit 10. The three-dimensional candidate position selection unit 20 acquires point cloud data in the vicinity of the position indicated by the fetched two-dimensional base station candidate position data from the point cloud data storage unit 13, and displays the acquired point cloud data on the screen. The user operates the operation processing unit 10 to select a three-dimensional position which is a candidate for installing the base station, from among the point cloud data displayed on the screen, and outputs the selected three-dimensional position to the three-dimensional candidate position selection unit 20. The three-dimensional candidate position selection unit 20 fetches the three-dimensional position output by the operation processing unit 10, and sets the fetched three-dimensional position as three-dimensional base station candidate position data.

Next, the three-dimensional candidate position selection unit 20 reads out the data indicating the line-of-sight range of the building associated with the fetched two-dimensional base station candidate position data from the two-dimensional line-of-sight determination result storage unit 15. The three-dimensional candidate position selection unit 20 reads out the point cloud data in the range indicated by the read data indicating the line-of-sight range of the building from the point cloud data storage unit 13, and displays the read point cloud data on the screen. The user operates the operation processing unit 10 to select a three-dimensional position which is a candidate for installing the terminal station, from among the point cloud data displayed on the screen, and outputs the selected three-dimensional position to the three-dimensional candidate position selection unit 20. The three-dimensional candidate position selection unit 20 fetches the three-dimensional position output by the operation processing unit 10, and sets the fetched three-dimensional position as three-dimensional terminal station candidate position data. Hereinafter, the three-dimensional base station candidate position data is simply referred to as "base station candidate position data", and the three-dimensional terminal station candidate position data is simply referred to as "terminal station candidate position data".

The positional relationship specification unit 21 generates base station positional relationship specification data indicating a positional relationship between the travel trajectory and the base station candidate position, and terminal station positional relationship specification data indicating a positional relationship between the travel trajectory and the terminal station candidate position, based on the travel trajectory data stored in the travel trajectory data storage unit 14, for each combination of the base station candidate position data and the terminal station candidate position data selected by the three-dimensional candidate position selection unit 20. The reliability coefficient specification unit 22 specifies a reliability coefficient indicating the degree of reliability of the processing result of the prescribed evaluation processing performed based on the point cloud data, based on the base station positional relationship specification data and the terminal station positional relationship specification data generated by the positional relationship specification unit 21. Here, the prescribed evaluation processing is a three-dimensional line-of-sight determination processing performed by the three-dimensional line-of-sight determination processing unit 23 or the shield factor calculation processing performed by the shield factor calculation unit 24.

The reliability coefficient specification unit 22 outputs the specified reliability coefficient together with the combination of the base station candidate position data and the terminal station candidate position data corresponding to the reliability coefficient (step S5-1). As a result, the reliability coefficient specification unit 22 can present, to the user of the station placement assistance apparatus 1, a reliability coefficient indicating the degree of reliability of the processing result of the prescribed evaluation processing for each combination of the base station candidate position and the terminal station candidate position.

The three-dimensional line-of-sight determination processing unit 23 reads out point cloud data of the space between the base station candidate position and the terminal station candidate position indicated by each of the base station candidate position data and the terminal station candidate position data selected by the three-dimensional candidate position selection unit 20 from the point cloud data storage unit 13 (step S5-2). The three-dimensional line-of-sight determination processing unit 23 performs a three-dimensional line-of-sight determination processing between the base station candidate position and the terminal station candidate position, based on the read point cloud data, by means described in Literature 2 (JP 2019-001401), for example, and estimates whether the communication is available based on the result of the determination processing (step S5-3).

In the case of performing the shield factor calculation in the point cloud data processing unit 6, the shield factor calculation unit 24 reads out point cloud data of the space between the base station candidate position and the terminal station candidate position indicated by each of the base station candidate position data and the terminal station candidate position data selected by the three-dimensional candidate position selection unit 20 from the point cloud data storage unit 13 (step S5-2). The shield factor calculation unit 24 calculates the shield factor between the base station candidate position and the terminal station candidate position, based on the read point cloud data, by means described in Literature 3 (JP 2019-242831), for example, and estimates whether the communication is available based on the result of the calculation processing (step S5-3). The point cloud data processing unit 6 performs the processes in steps S5-1 to S5-3 for all combinations of the base station candidate position data and the terminal station candidate position data.

The station number calculation unit 7 aggregates the base station candidate positions and the terminal station candidate positions based on the result of the estimation of the availability of the communication performed by the point cloud data processing unit 6 using the three-dimensional point cloud data, and calculates the required number of base stations and the number of accommodated terminal stations for each base station candidate position (step S6-1).

Figure 3:
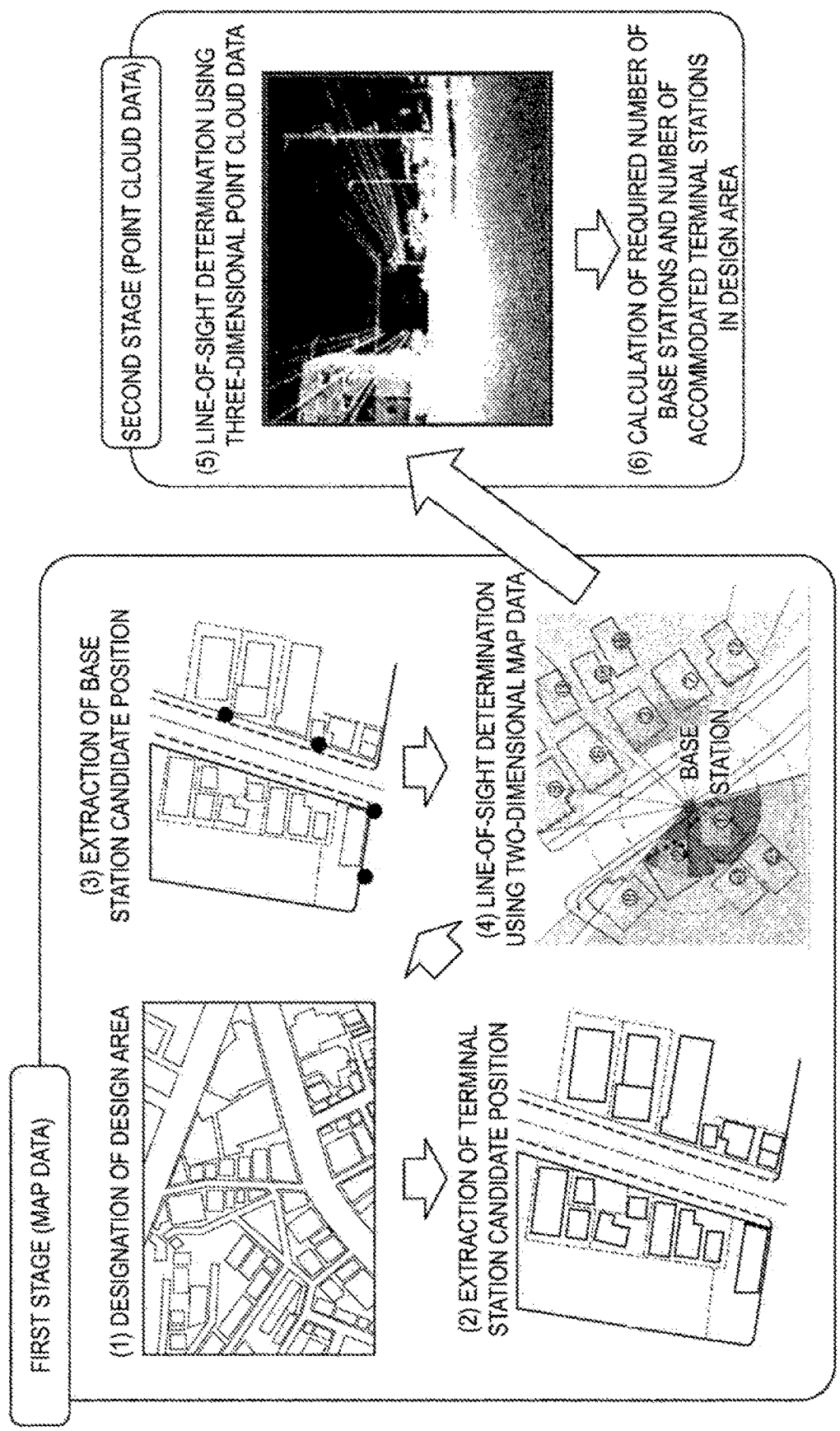
FIG. 3 is a diagram illustrating the processing according to the first embodiment in two stages.

The configuration of the processing in the station placement assistance apparatus 1 can be regarded as a two-stage process: a processing performed using map data which is two-dimensional data as illustrated in FIG. 3, and a processing performed using point cloud data which is three-dimensional data in response to the result of the processing.

As illustrated in FIG. 3, the processing performed using map data which is two-dimensional data of the first stage includes four processes: (1) designation of a design area, (2) extraction of a terminal station candidate position, (3) extraction of a base station candidate position, and (4) line-of-sight determination using two-dimensional map data.

(1) The processing of the designation of the design area corresponds to the processing of steps S1-1 and S1-2 performed by the design area designation unit 2. (2) The processing of the extraction of the terminal station candidate position corresponds to the processing of step S2-1 performed by the terminal station candidate position extraction unit 4. (3) The processing of the extraction of the base station candidate position corresponds to the processing of step S3-1 performed by the base station candidate position extraction unit 3. (4) The processing of the line-of-sight determination using the two-dimensional map data corresponds to the processing of steps S4-1, S4-2, S4-3, and S4-4 performed by the two-dimensional line-of-sight determination processing unit 5.

The processing performed using point cloud data which is the three-dimensional data of the second stage includes two processes: (5) communication availability determination using three-dimensional point cloud data, and (6) calculation of the required number of base stations and the number of accommodated terminal stations in the design area. (5) The processing of the communication availability determination using the three-dimensional point cloud data corresponds to the processing of steps S5-1, S5-2, and S5-3 performed by the point cloud data processing unit 6. (6) The processing of the calculation of the required number of base stations and the number of accommodated terminal stations in the design area corresponds to the processing of step S6-1 performed by the station number calculation unit 7.

For example, in wireless communication such as millimeter wave, for a base station to be installed in on outdoor facility such as a utility pole and a terminal station to be installed on a wall surface of a building, a three-dimensional line-of-sight determination between a base station candidate position and a terminal station candidate position can be performed using three-dimensional point cloud data to assist the base-station design. In order to handle the three-dimensional point cloud data, a large amount of data and significant computational resources are required. Thus, in the station placement assistance apparatus 1, prior to using the three-dimensional point cloud data, the two-dimensional line-of-sight determination processing unit 5 determines the line-of-sight between the base station candidate position and the terminal station candidate position in two dimensions, and using the determination result, the point cloud data processing unit 6 narrows down the point cloud data to be utilized and performs three-dimensional line-of-sight determination processing. Thus, it is possible to perform efficient three-dimensional line-of-sight determination processing with reduced computational resources.

In wireless communication, not only a simple linear line-of-sight determination, it is also important to calculate a "shield factor" in a region of a spheroidal shape between transmission and reception, a so-called Fresnel zone, which is related to radio waves propagating in space. The point cloud data processing unit 6 of the station placement assistance apparatus 1 includes the shield factor calculation unit 24 to calculate the shield factor. In the calculation of the shield factor, more computational resources are required than the three-dimensional line-of-sight determination processing. However, in the station placement assistance apparatus 1, the point cloud data to be utilized can be sufficiently narrowed down in the two-dimensional line-of-sight determination processing performed by the two-dimensional line-of-sight determination processing unit 5. Thus, it is possible to perform efficient calculation processing of the shield factor with reduced computational resources.

In the station placement assistance apparatus 1 according to the first embodiment described above, the positional relationship specification unit 21 generates base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for traveling to measure an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus. The reliability coefficient specification unit 22 specifies a reliability coefficient indicating the degree of reliability of the processing result of the prescribed evaluation processing performed based on the point cloud data, based on the base station positional relationship specification data and the terminal station positional relationship specification data generated by the positional relationship specification unit 21.

As a result, the reliability coefficient specification unit 22 can present, to the user, a reliability coefficient indicating the degree of reliability of the processing result of the prescribed evaluation processing performed based on the point cloud data, for each base station candidate position and terminal station candidate position. Thus, in a case where not all of the point cloud data of the space between the base station candidate position and the terminal station candidate position can be acquired, it is possible to make the user recognize that the reliability of the point cloud data is low, and the reliability of the processing result of the prescribed evaluation processing using the point cloud data is also low with the reliability coefficient.

For example, even in a case where the three-dimensional line-of-sight determination processing unit 23 indicates "good line-of-sight" as a result of the determination processing, or in a case where the shield factor calculation unit 24 indicates "a sufficiently low shield factor required for wireless communication" as a result of the calculation processing, despite the fact that not all point cloud data can be acquired, it is possible to call attention to the user by indicating a small value of the reliability coefficient. As a result, it is possible to prevent the user from making erroneous decisions, for example, from selecting a candidate position for installing the base station and the terminal station in a space in which point cloud data that is a basis of the three-dimensional line-of-sight determination or the shield factor calculation cannot be acquired.

By specifying the reliability coefficient, it is possible to prompt the user to make the following decisions, depending on the magnitude of the value of the reliability coefficient. For example, in a case where not all of the point cloud data between the base station candidate position and the terminal station candidate position can be acquired for the user, but the reliability coefficient is a large value, it is also possible to prompt the user to determine that the examination using the acquired point cloud data is possible for the combination of the base station candidate position and the terminal station candidate position to be examined.

By specifying the reliability coefficient, it is possible to determine whether the three-dimensional line-of-sight determination processing unit 23 performs the three-dimensional line-of-sight determination processing, and determine whether the shield factor calculation unit 24 calculates the shield factor, depending on the magnitude of the reliability coefficient value. For example, in a case where the reliability coefficient is a small value, the three-dimensional line-of-sight determination processing unit 23 or the shield factor calculation unit 24 can reduce the calculated amount by not performing processing for the combination of the base station candidate position and the terminal station candidate position to be processed. Furthermore, by notifying the user that the three-dimensional line-of-sight determination processing unit 23 or the shield factor calculation unit 24 did not perform processing, it is possible to prompt the user to redo the acquisition of the point cloud data of the space between the base station candidate position and the terminal station candidate position to be processed, or to review the base station candidate position and the terminal station candidate position. Thus, even in a case where the state of acquisition of the point cloud data of the space between the base station candidate position and the terminal station candidate position is not good, it is possible for the user to perform an appropriate base-station design.

Second Embodiment

Figure 4:
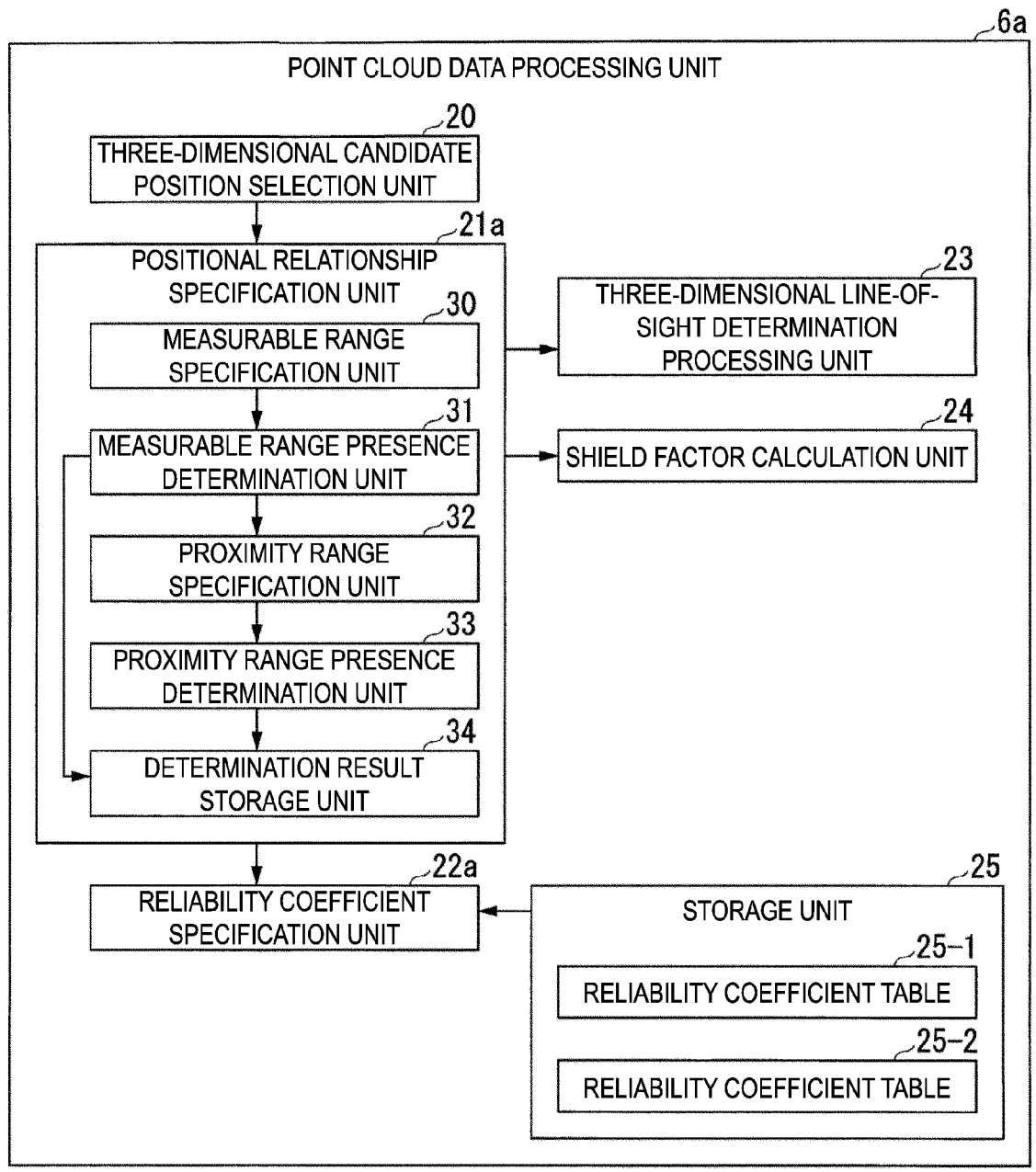
FIG. 4 is a block diagram illustrating a configuration of a point cloud data processing unit in a station placement assistance apparatus according to a second embodiment.

FIG. 4 is a block diagram illustrating an internal configuration of a point cloud data processing unit 6a applied to a second embodiment. In the second embodiment, the same reference signs are assigned to the same components as those in the first embodiment. Although not illustrated in the drawings, in the following description, the reference sign "1a" is given to the station placement assistance apparatus according to the second embodiment, and it is referred to as a station placement assistance apparatus 1a. The station placement assistance apparatus 1a has a configuration in which the point cloud data processing unit 6 in the station placement assistance apparatus 1 according to the first embodiment is replaced with a point cloud data processing unit 6a illustrated in FIG. 4.

First, a description will be given with reference to FIGS. 7 to 14 of what kind of association the reliability coefficient specified in the second embodiment has with the positional relationship of the travel trajectory of a moving body such as a vehicle equipped with the MMS, a base station candidate position, and a terminal station candidate position.

Figure 7:
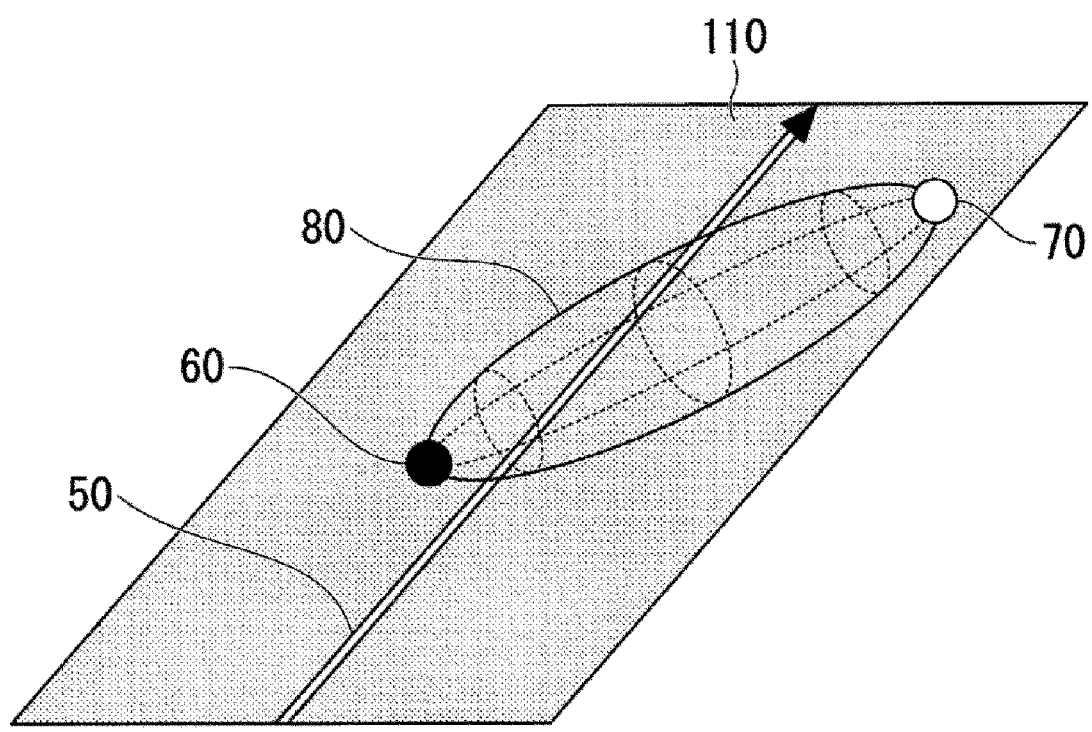
FIG. 7 is a diagram illustrating a positional relationship configuration between the travel trajectory, the base station candidate position, and the terminal station candidate position according to the second embodiment.

In FIG. 7, a line segment of the arrow indicated by the reference sign 50 is a travel trajectory indicated by the travel trajectory data stored in the travel trajectory data storage unit 14, indicating that a moving body such as a vehicle equipped with the MMS has traveled in the direction of the arrow. The MMS irradiates the surrounding space with a laser radar, measures the reflection of the laser radar from an object, and records data of the direction and the distance in which the object is present. The point cloud data is generated by performing an operation that converts the recorded data of the direction and the distance into coordinates of a three-dimensional space. At this time, the distance at which the data of the direction and the distance can be obtained is limited by the laser radar irradiated by the MMS, and the distance of this limit is referred to as a measurable distance. The measurable distance is the distance determined by the performance of the MMS and is a known value in advance.

The planar region indicated by the reference sign 110 is a region indicating the measurable range of the laser radar irradiated by the MMS for measurement, and is a region centered on the line segment of the travel trajectory 50 having a size of a length of the measurable distance of the MMS on both sides of the line segment, and hereinafter referred to as a measurable range 110.

In FIG. 7, the base station candidate position 60 indicated by the base station candidate position data and the terminal station candidate position 70 indicated by the terminal station candidate position data are located on both sides of the travel trajectory 50, and both the base station candidate position 60 and the terminal station candidate position 70 are included in the space in which the measurable range 110 is extended in the vertical direction. In other words, both the position on the two-dimensional plane in which the coordinate components in the vertical direction of the base station candidate position 60 are discarded, and position on the two-dimensional plane in which the coordinate components in the vertical direction of the terminal station candidate position 70 are discarded are located within the range of the measurable range 110.

Note that in practice, the space within a sphere having the measurable distance as the radius centered on the MMS is the measurable range. In the MMS traveling straight, the measurable range is the space in a cylinder with the measurable distance as the radius centered on the travel trajectory 50. Usually when compared to the altitude at which the base station apparatus is installed (for example, on a utility pole) and the altitude at which the terminal station apparatus is installed (on the wall surface of a building), in any of the above-mentioned measurable ranges, the measurable distance in the horizontal direction is a sufficiently large value. Thus, in a case where the positions in two dimensions where the coordinate components of the base station candidate position 60 and the terminal station candidate position 70 in the vertical direction are discarded are located within the range of the measurable range 110, the base station candidate position 60 and the terminal station candidate position 70 are located within the range of the measurable range even in the three-dimensional space.

Hereinafter, the base station candidate position 60 or the terminal station candidate position 70 being included in the space in which the measurable range 110 is extended in the vertical direction is referred to as "the base station candidate position 60 or the terminal station candidate position 70 being located within the range of the measurable range 110". In contrast, the base station candidate position 60 or the terminal station candidate position 70 not being included in the space in which the measurable range 110 is extended in the vertical direction is referred to as "the base station candidate position 60 or the terminal station candidate position 70 being located outside of the range of the measurable range 110".

The spheroid indicated by the reference sign 80 is a Fresnel zone representing a radio wave propagation region formed when a radio communication apparatus is installed in each of the base station candidate position 60 and the terminal station candidate position 70. If the point cloud data is present in the Fresnel zone 80, there is a high possibility that it is determined that there is no line-of-sight, and the shield factor is high.

Figure 8:
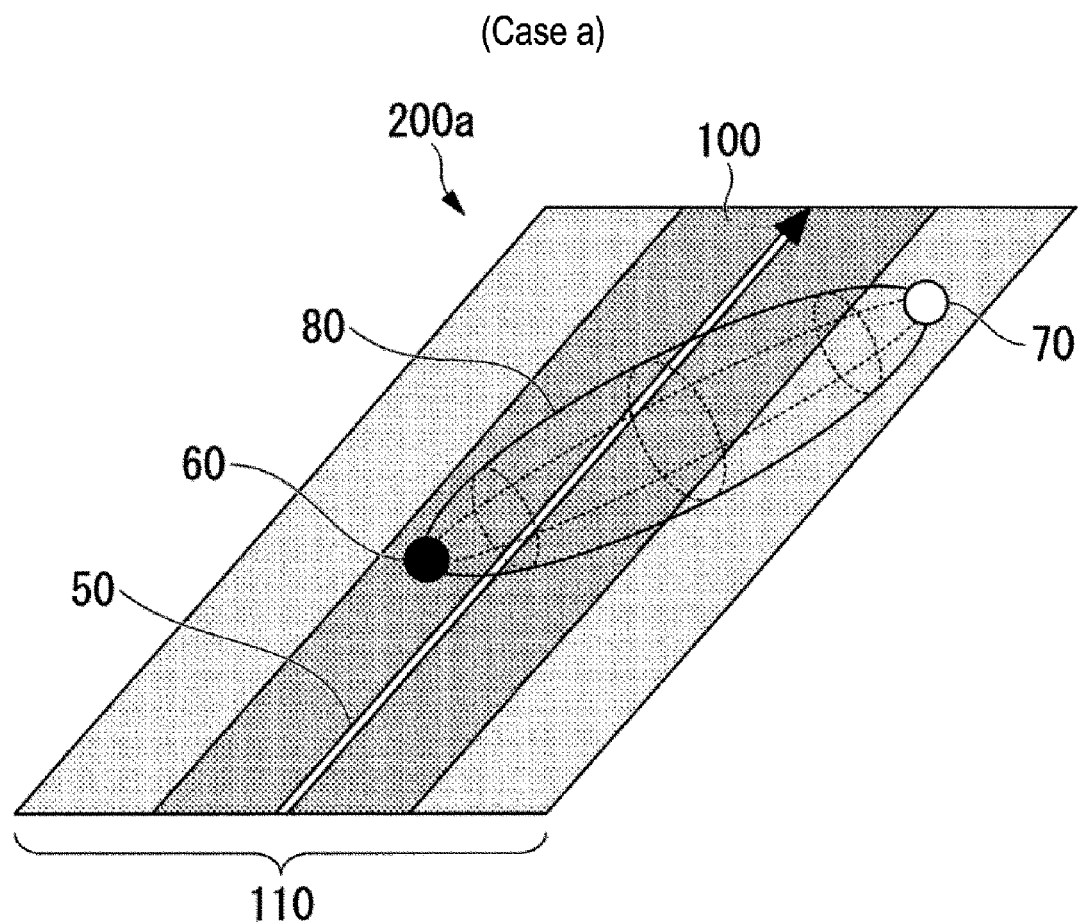
FIG. 8 is a diagram illustrating a positional relationship configuration of "Case a" according to the second embodiment.

FIG. 8 is a diagram in which a planar region indicated by reference sign 100 is added to FIG. 7. The planar region indicated by the reference sign 100 is a region centered on the line segment of the travel trajectory 50 having a size of a length of a predetermined proximity distance that is shorter than a predetermined measurable distance of the MMS on both sides of the line segment, and is hereinafter referred to as a proximity range 100.

As illustrated in FIG. 8, the base station candidate position 60 is included in the space in which the proximity range 100 is extended in the vertical direction. In contrast, the terminal station candidate position 70 is not included in the space in which the proximity range 100 is extended in the vertical direction. In other words, the position on the two-dimensional plane in which the coordinate components in the vertical direction of the base station candidate position 60 are discarded is located within the range of the proximity range 100. The position on the two-dimensional plane in which the coordinate components in the vertical direction of the terminal station candidate position 70 are discarded is located outside of the range of the proximity range 100.

Hereinafter, the base station candidate position 60 or the terminal station candidate position 70 being included in the space in which the proximity range 100 is extended in the vertical direction is referred to as "the base station candidate position 60 or the terminal station candidate position 70 being located within the range of the proximity range 100". In contrast, the base station candidate position 60 or the terminal station candidate position 70 not being included in the space in which the proximity range 100 is extended in the vertical direction is referred to as "the base station candidate position 60 or the terminal station candidate position 70 being located outside of the range of the proximity range 100".

As illustrated in FIG. 8, a case in which both the base station candidate position 60 and the terminal station candidate position 70 are located within the range of the measurable range 110 is hereinafter referred to as "Case a", and the positional relationship of "Case a" is hereinafter referred to as a positional relationship configuration 200*a*.

In the case of the "Case a", both the base station candidate position 60 and the terminal station candidate position 70 are located within the range of the measurable range 110. Thus, it is considered that all of the point cloud data in the space between the base station candidate position 60 and the terminal station candidate position 70 can be acquired as long as there is no omission in the measurement process. Thus, it is assumed that the processing result of the three-dimensional line-of-sight determination processing by the three-dimensional line-of-sight determination processing unit 23 or the processing result of the shield factor calculation processing by the shield factor calculation unit 24 performed based on the acquired point cloud data has a high reliability result. Thus, it is considered meaningful to perform the processing by the three-dimensional line-of-sight determination processing unit 23 or the shield factor calculation unit 24.

Figure 9:
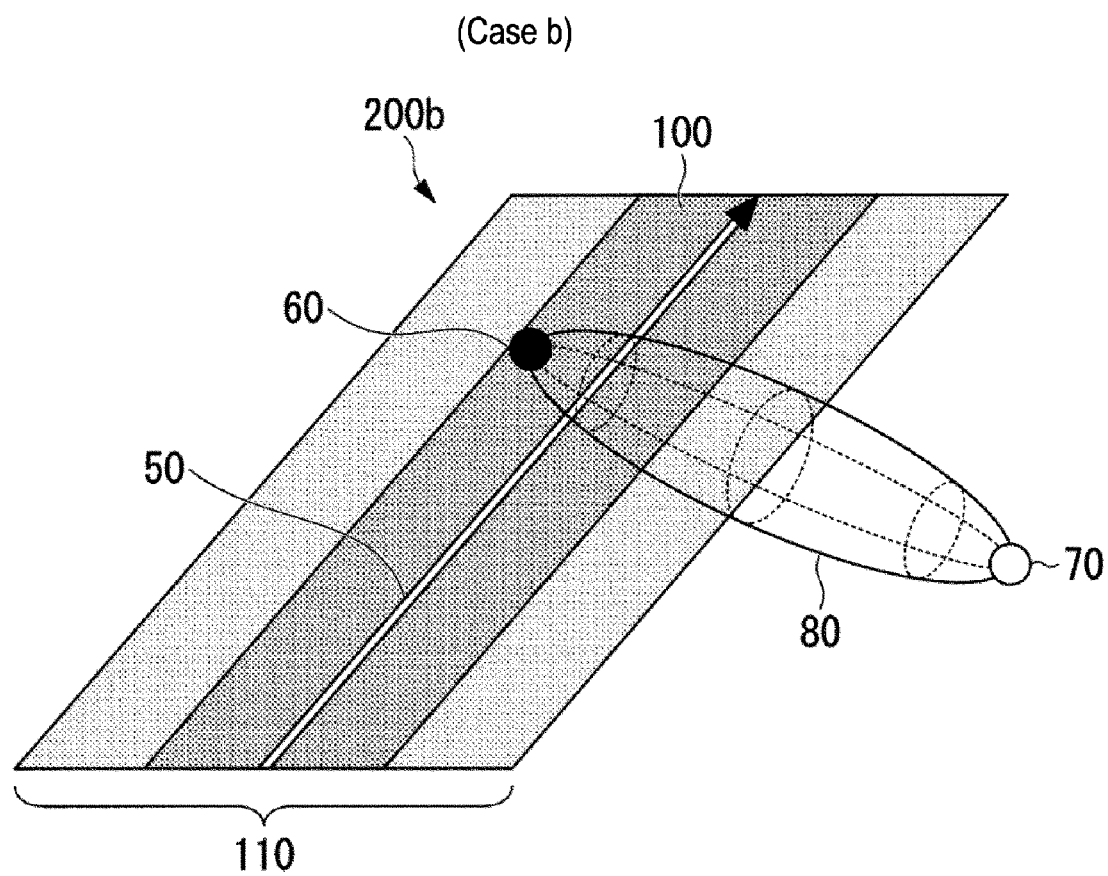
FIG. 9 is a diagram illustrating a positional relationship configuration of "Case b" according to the second embodiment.

In the case of the "Case b" illustrated by the positional relationship configuration 200*b* illustrated in FIG. 9, the base station candidate position 60 is located within the range of the measurable range 110 and the proximity range 100, but the terminal station candidate position 70 is located outside of the range of the measurable range 110. In this manner, in a case where either the base station candidate position 60 or the terminal station candidate position 70 is located outside of the range of the measurable range 110, part of the point cloud data between the wireless stations cannot be acquired. In such a case, compared to "Case a", it is assumed that the processing result of the three-dimensional line-of-sight determination processing or the processing result of the shield factor calculation processing has a low reliability result.

However, even in a case such as "Case b", in a case where the processing result of the three-dimensional line-of-sight determination processing by the three-dimensional line-of-sight determination processing unit 23 performed based on the acquired point cloud data is "no line-of-sight", or in a case where the processing result of the shield factor calculation processing by the shield factor calculation unit 24 indicates a "high shield factor", it can be used as reference information for the user to determine that the propagation environment is not good beyond the obtained result in reality. Thus, although it is necessary to warn the user that the reliability is low, it is considered that there is some meaning in performing the processing by the three-dimensional line-of-sight determination processing unit 23 or the shield factor calculation unit 24.

Figure 10:
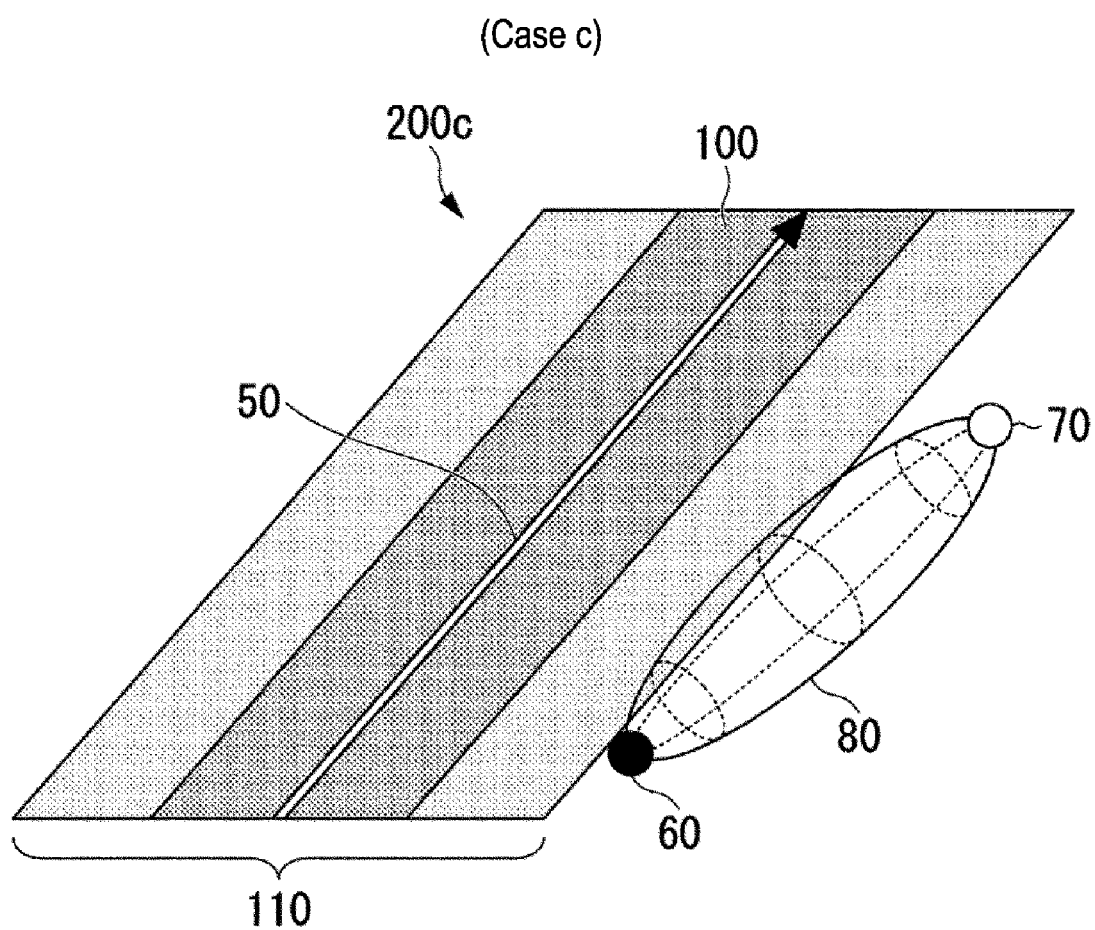
FIG. 10 is a diagram illustrating a positional relationship configuration of "Case c" according to the second embodiment.

In the case of the "Case c" of the positional relationship configuration 200*c* illustrated in FIG. 10, both the base station candidate position 60 and the terminal station candidate position 70 are located outside of the range of the measurable range 110. In this case, the point cloud data between the base station candidate position 60 and the terminal station candidate position 70 cannot be acquired. Thus, it is assumed that the three-dimensional line-of-sight determination processing by the three-dimensional line-of-sight determination processing unit 23 and the shield factor calculation processing by the shield factor calculation unit 24 performed based on the point cloud data are not meaningful, and even if the processing is performed, the processing result has an extremely low reliability result. Thus, in the case of the "Case c", it may be desirable not to perform the processing by the three-dimensional line-of-sight determination processing unit 23 and the shield factor calculation unit 24, but present information to the user indicating "unprocessable" such as "line-of-sight cannot be determined" or "shield factor cannot be calculated".

As described above with reference to the three cases "Case a" to "Case c" illustrated in FIGS. 8 to 10, in each case, the acquisition state of the point cloud data present in the space between the base station candidate position 60 and the terminal station candidate position 70 is different, and thus the reliability of the point cloud data is also different. By utilizing the point cloud data with different reliability in this manner, the reliability of the processing result of the three-dimensional line-of-sight determination processing between the base station candidate position 60 and the terminal station candidate position 70 or the shield factor calculation processing is also different depending on the reliability of the point cloud data.

Thus, by clearly indicating the degree of reliability of the processing result of the prescribed evaluation processing performed based on the acquired point cloud data to the user utilizing the station placement assistance apparatus 1a by the reliability coefficient, for example, in the case where the reliability coefficient is a large value, the processing result of the prescribed evaluation processing can be helpful for the actual installation of the base station and the terminal station. Conversely, in the case where the reliability coefficient is a small value, it is possible to prompt the user to redo the acquisition of the point cloud data, or to review the positions of the base station candidate position 60 and the terminal station candidate position 70.

The reliability of the point cloud data is defined by the positional relationship of each of the base station candidate position 60, the terminal station candidate position 70, and the travel trajectory 50. Cases other than the three cases illustrated in FIGS. 8 to 10 in which the reliability of point cloud data is different are illustrated in FIG. 11.

Figure 11:
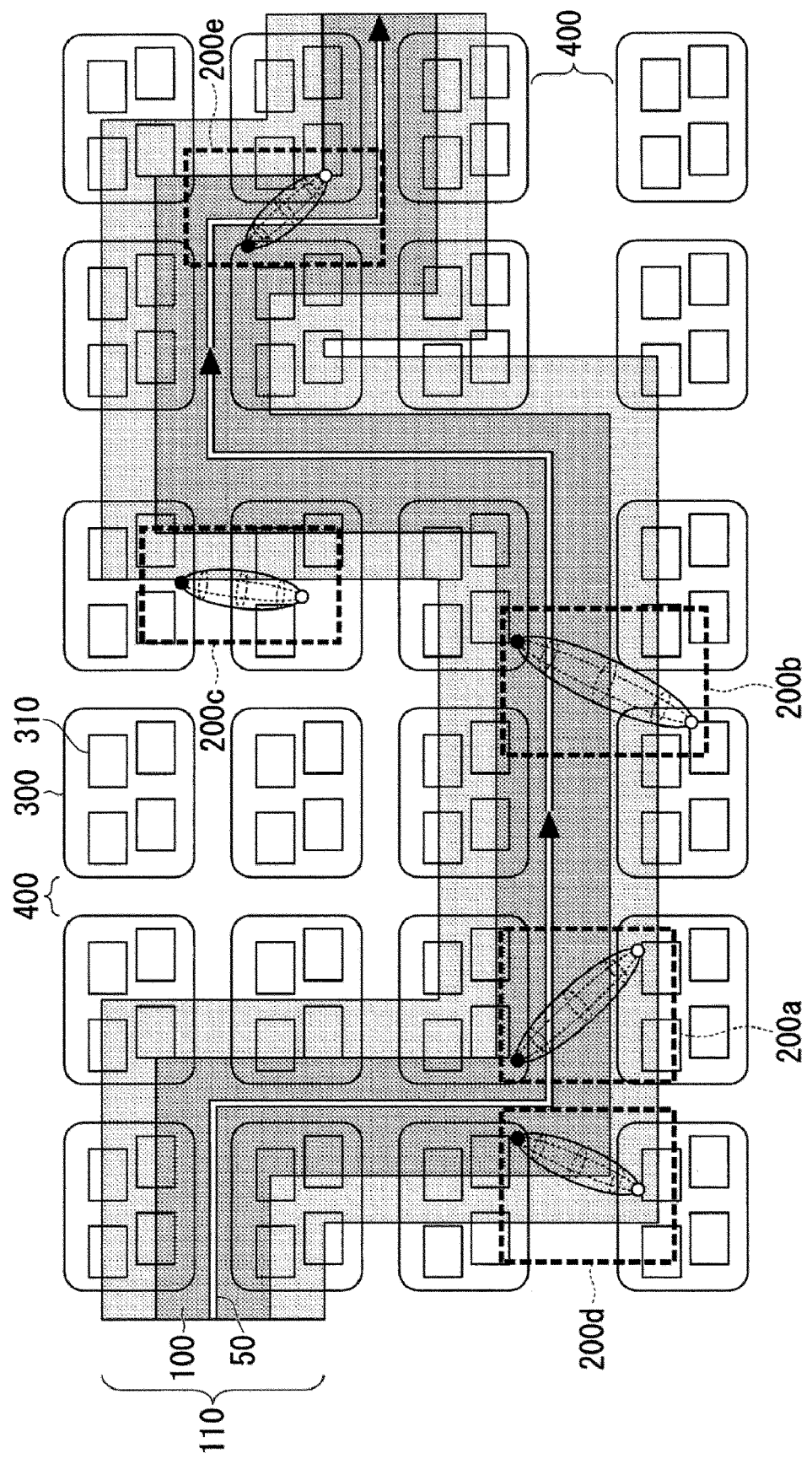
FIG. 11 is a diagram (Part 1) illustrating a plurality of positional relationship configurations according to the second embodiment.

FIG. 11 is a diagram illustrating a map of an urban area, and the region of the road 400 is illustrated in a grid. Each of the plurality of regions defined in a grid by the region of the road 400 is a site 300, and each of the sites 300 has a plurality of buildings 310 indicated in rectangular shapes.

In FIG. 11, a travel trajectory 50 is illustrated in which a moving body such as a vehicle equipped with the MMS has traveled, and a proximity range 100 and a measurable range 110 are illustrated along the travel trajectory 50. As can be seen in FIG. 11, the measurable range 110 does not cover the entire urban area.

FIG. 11 illustrates the "Case a" indicated by the positional relationship configuration 200a, the "Case b" indicated by the positional relationship configuration 200b, and the "Case c" indicated by the positional relationship configuration 200c illustrated in FIGS. 8 to 10. In addition to the three cases, FIG. 11 further illustrates the "Case d" indicated by the positional relationship configuration 200d and the "Case e" indicated by the positional relationship configuration 200e.

In the "Case d", both the base station candidate position 60 and the terminal station candidate position 70 are located within the range of the measurable range 110, and the base station candidate position 60 is further located within the range of the proximity range 100. When the "Case d" and the "Case a" are compared, the "Case d" is different from the "Case a" in that the base station candidate position 60 indicated by the black circle and the terminal station candidate position 70 indicated by the white circle included in the positional relationship configuration 200d are present on one side of the travel trajectory 50.

In the "Case e", both the base station candidate position 60 indicated by the black circle and the terminal station candidate position 70 indicated by the white circle included in the positional relationship configuration 200e are located within the range of the proximity range 100. Thus, the Fresnel zone 80 is also located within the range of the proximity range 100. Thus, in the case of the "Case e", it is considered that even higher reliability point cloud data can be acquired than in the case of the "Case a". Thus, in the case of the "Case e", it is assumed that the processing result of the three-dimensional line-of-sight determination processing by the three-dimensional line-of-sight determination processing unit 23 or the processing result of the shield factor calculation processing by the shield factor calculation unit 24 performed based on the acquired point cloud data has an even higher reliability result than in the case of the "Case a".

Figure 12:
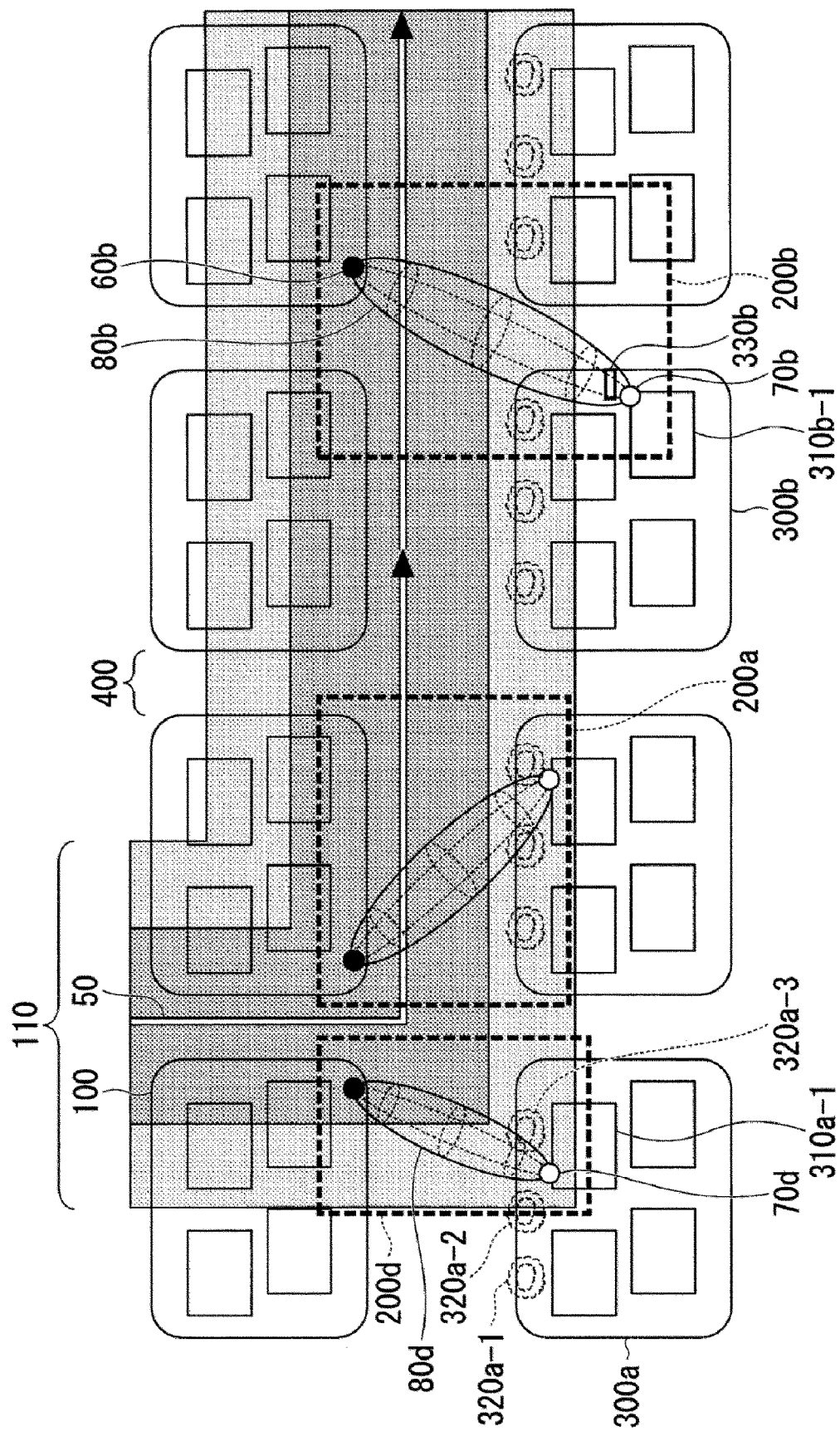
FIG. 12 is a diagram (Part 2) illustrating a plurality of positional relationship configurations according to the second embodiment.

Next, with reference to FIG. 12, a description will be given to further advance the consideration of the reliability of the point cloud data by using the "Case b" and the "Case d". FIG. 12 is an enlarged view of a region including the positional relationship configuration 200a, the positional relationship configuration 200b, and the positional relationship configuration 200d in FIG. 11. FIG. 12 illustrates not only an enlarged view of FIG. 11, but also trees 320a-1 to 320a-3 and a sign 330b omitted in FIG. 11.

Note that in the following FIGS. 12 to 14, in order to illustrate the base station candidate position 60, the terminal station candidate position 70, and the Fresnel zone 80 for each case, the reference signs "b" and "d" assigned to the "Case b" and the "Case d" are added to the respective signs. In order to be able to distinguish each of the sites 300 and the buildings 310 for convenience, different alphabetic characters and branch numbers are assigned to each of them.

As described above, in the case of the "Case b", the base station candidate position 60b is located within the range of the measurable range 110 and the proximity range 100. The terminal station candidate position 70b is located on the wall surface of the building 310b-1 that is built in the site 300b, and this position is outside of the range of the measurable range 110. The point cloud data cannot be acquired outside of the range of the measurable range 110. As illustrated in FIG. 12, a sign 330b on which a store name or the like is printed is present in a position in the proximity of the terminal station candidate position 70b that shields the Fresnel zone 80b. Because the sign 330b is not located within the range of the measurable range 110, the point cloud data of the sign 330b cannot be acquired.

Figure 13:
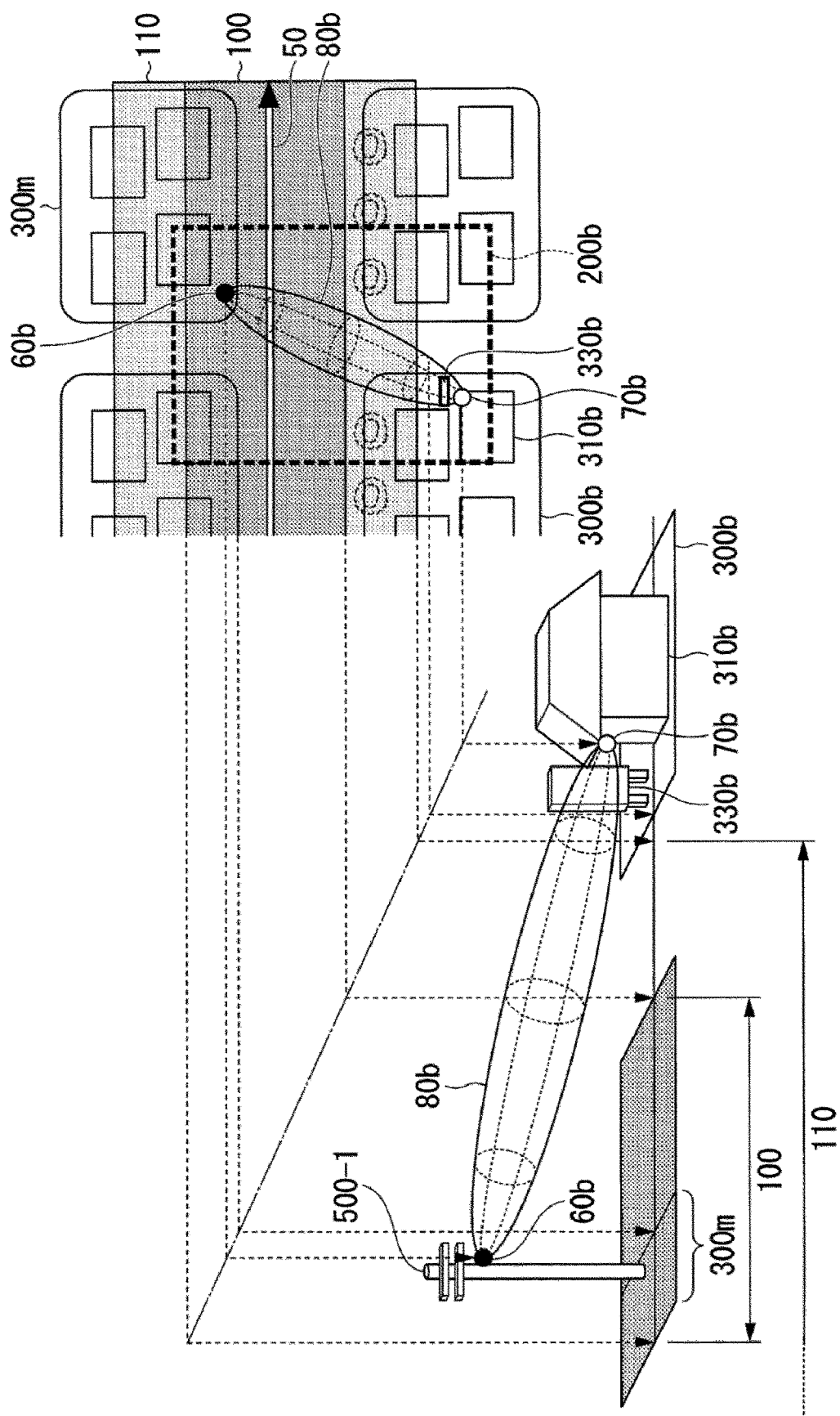
FIG. 13 is a diagram illustrating a positional relationship configuration of "Case b" and a three-dimensional configuration thereof according to the second embodiment.

FIG. 13 is a view illustrating a plan view of a region including the positional relationship configuration 200b illustrated in FIG. 12, and an aerial view illustrating the region in three dimensions. In the plan view and the aerial view, the corresponding objects, positions, and the like are given the same reference signs. As can be seen in FIG. 13, the sign 330b is located in a position that shields the Fresnel zone 80b and is located outside of the range of the measurable range 110. In such a case, because the acquired point cloud data does not include the point cloud data of the sign 330b, the three-dimensional line-of-sight determination processing performed by the three-dimensional line-of-sight determination processing unit 23 may make an erroneous determination of "good line-of-sight". The shield factor calculation processing performed by the shield factor calculation unit 24 may calculate a "low shield factor". In this case, the user of the station placement assistance apparatus 1a may make erroneous decisions.

On the other hand, assume a case where the processing result of "no line-of-sight" is obtained in the three-dimensional line-of-sight determination processing of the three-dimensional line-of-sight determination processing unit 23 or the processing result of a "high shield factor" is obtained in the shield factor calculation processing of the shield factor calculation unit 24 performed based on the acquired point cloud data. In this case, because it can be said that the obtained processing result is a correct processing result, in this regard, even in the case of the "Case b", the processing result of the three-dimensional line-of-sight determination processing or the processing result of the shield factor calculation processing has tentative reliability.

In the case of the "Case d" indicated by the positional relationship configuration 200d illustrated in FIG. 12, the terminal station candidate position 70*d* is located on the wall surface of the building 310*a*-1, and the trees 320*a*-1, 320*a*-2, and 320*a*-3 such as a roadside tree or a garden tree are planted in the site 300*a* on which the building 310*a*-1 is built. Of these, the position of the tree 320*a*-3 is a position that shields the Fresnel zone 80*d* between the base station candidate position 60*d* and the terminal station candidate position 70*d*.

Figure 14:
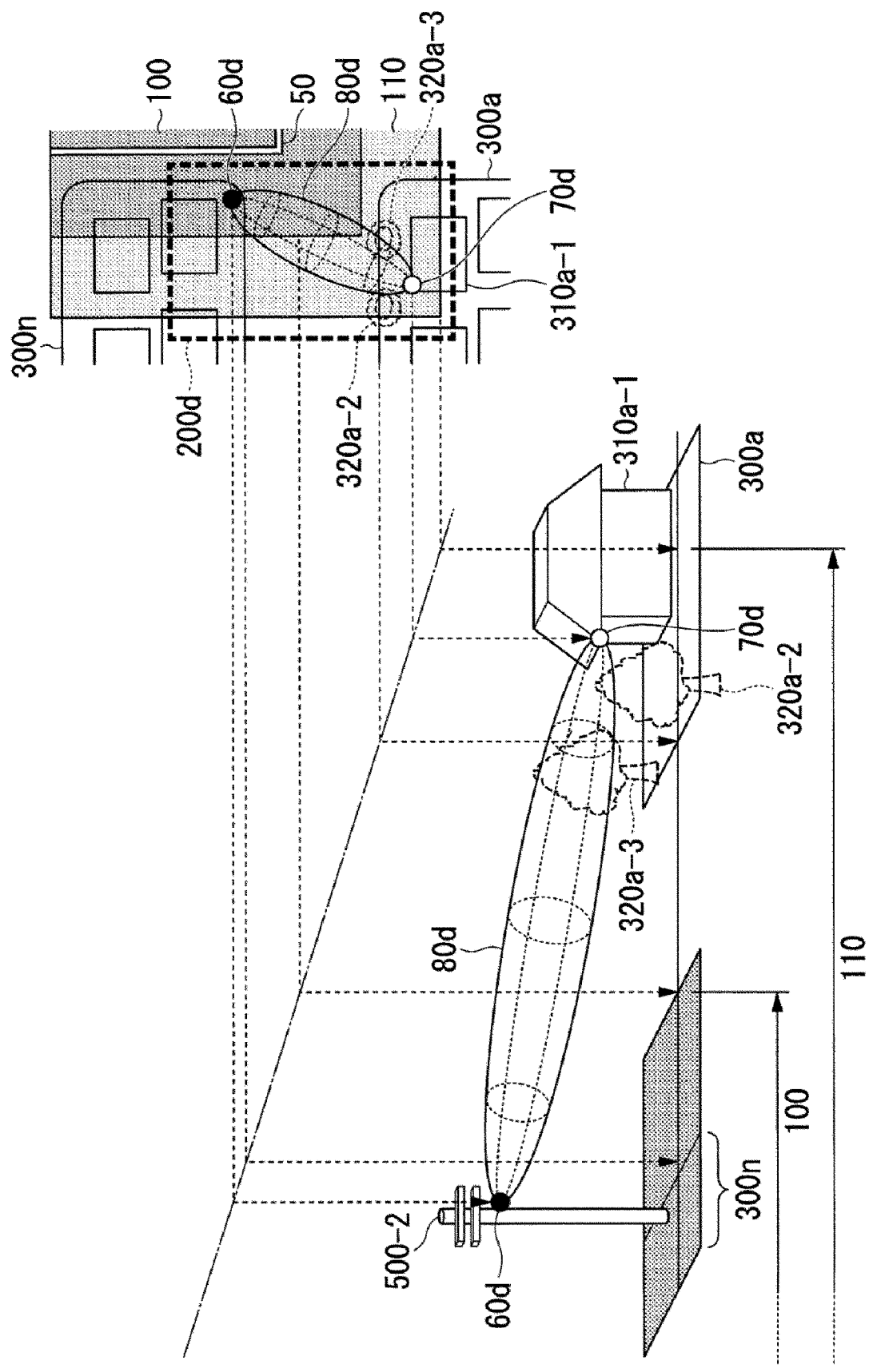
FIG. 14 is a diagram illustrating a positional relationship configuration of "Case d" and a three-dimensional configuration thereof according to the second embodiment.

FIG. 14 is a view illustrating a plan view of a region including the positional relationship configuration 200*d* illustrated in FIG. 12, and an aerial view illustrating the region in three dimensions. In the plan view and the aerial view, the corresponding objects, positions, and the like are given the same reference signs. As can be seen in FIG. 14, the tree 320*a*-3 is located in a position that shields the Fresnel zone 80*d* and is located within the range of the measurable range 110. For the tree 320*a*-3, the point cloud data can be acquired because it is located within the range of the measurable range 110.

In general, there are a large number of gaps in the point cloud data of trees, especially the point cloud data of branches and leaves of trees. For example, the thickness of the leaves is approximately several mm, while the interval of the acquisition of the point cloud data when not near the travel trajectory 50 is, for example, several cm to ten and several cm. Thus, depending on the degree of bushing of the branches and leaves of the trees, there are a large number of gaps in the point cloud data of the trees.

When the three-dimensional line-of-sight determination processing unit 23 performs three-dimensional line-of-sight determination processing based on the point cloud data having a large number of gaps, the processing result may be "good line-of-sight". When the shield factor calculation unit 24 performs the shield factor calculation processing based on the point cloud data having a large number of gaps, the processing result may indicate a "low shield factor". In this case, the user of the station placement assistance apparatus 1*a* may make erroneous decisions.

On the other hand, assume a case where the processing result of "no line-of-sight" is obtained in the three-dimensional line-of-sight determination processing of the three-dimensional line-of-sight determination processing unit 23 or the processing result of a "high shield factor" is obtained in the shield factor calculation processing of the shield factor calculation unit 24 performed based on the acquired point cloud data. In this case, because it can be said that the obtained processing result is a correct processing result, in this regard, even in the case of the "Case d", the processing result of the three-dimensional line-of-sight determination processing or the processing result of the shield factor calculation processing has tentative reliability.

Here, returning to FIG. 4, the configuration of the point cloud data processing unit 6*a* according to the second embodiment will be described. The point cloud data processing unit 6*a* includes a three-dimensional candidate position selection unit 20, a positional relationship specification unit 21*a*, a reliability coefficient specification unit 22*a*, a three-dimensional line-of-sight determination processing unit 23, a shield factor calculation unit 24, and a storage unit 25. The storage unit 25 stores the reliability coefficient tables 25-1 and 25-2 in advance.

The positional relationship specification unit 21*a* includes a measurable range specification unit 30, a measurable range presence determination unit 31, a proximity range specification unit 32, a proximity range presence determination unit 33, and a determination result storage unit 34. In the positional relationship specification unit 21*a*, the measurable range specification unit 30 generates the measurable range data indicating the measurable range 110 based on the travel trajectory data stored in the travel trajectory data storage unit 14 and the predetermined measurable distance.

The measurable range presence determination unit 31 determines whether the base station candidate position 60 is present within the range of the measurable range 110 based on the measurable range data generated by the measurable range specification unit 30 and the base station candidate position data selected by the three-dimensional candidate position selection unit 20. The measurable range presence determination unit 31 generates the base station positional relationship specification data indicating the determination result. The base station positional relationship specification data includes either of information indicating that the base station candidate position 60 is present within the range of the measurable range 110, or information indicating that the base station candidate position 60 is present outside of the range of the measurable range 110. The measurable range presence determination unit 31 writes and stores the generated base station positional relationship specification data in the determination result storage unit 34.

The measurable range presence determination unit 31 determines whether the terminal station candidate position 70 is present within the range of the measurable range 110 based on the measurable range data generated by the measurable range specification unit 30 and the terminal station candidate position data selected by the three-dimensional candidate position selection unit 20. The measurable range presence determination unit 31 generates the terminal station positional relationship specification data indicating the determination result. The terminal station positional relationship specification data includes either of information indicating that the terminal station candidate position 70 is present within the range of the measurable range 110, or information indicating that the terminal station candidate position 70 is present outside of the range of the measurable range 110. The measurable range presence determination unit 31 writes and stores the generated terminal station positional relationship specification data in the determination result storage unit 34.

The proximity range specification unit 32 generates the proximity range data indicating the proximity range 100 based on the travel trajectory data stored in the travel trajectory data storage unit 14 and the predetermined proximity distance. The proximity range presence determination unit 33 determines whether the base station candidate position 60 is present within the range of the proximity range 100 based on the proximity range data generated by the proximity range specification unit 32 and the base station candidate position data selected by the three-dimensional candidate position selection unit 20. The proximity range presence determination unit 33 adds the information indicating the determination result to the base station positional relationship specification data. That is, the proximity range presence determination unit 33 adds the information indicating that the base station candidate position 60 is present within the range of the proximity range 100, or the information indicating that the base station candidate position 60 is present outside of the range of the proximity range 100, to the base station positional relationship specification data stored in the determination result storage unit 34.

The proximity range presence determination unit 33 determines whether the terminal station candidate position 70 is present within the range of the proximity range 100 based on the proximity range data generated by the proximity range specification unit 32 and the terminal station candidate position data selected by the three-dimensional candidate position selection unit 20. The proximity range presence determination unit 33 adds the information indicating the determination result to the terminal station positional relationship specification data. That is, the proximity range presence determination unit 33 adds the information indicating that the terminal station candidate position 70 is present within the range of the proximity range 100, or the information indicating that the terminal station candidate position 70 is present outside of the range of the proximity range 100, to the terminal station positional relationship specification data stored in the determination result storage unit 34.

The reliability coefficient specification unit 22a specifies the reliability coefficient indicating the degree of reliability in the processing result of the prescribed evaluation processing performed based on the point cloud data, based on the base station positional relationship specification data and the terminal station positional relationship specification data stored in the determination result storage unit 34, and referring to the reliability coefficient table 25-1 or the reliability coefficient table 25-2 stored in the storage unit 25.

FIG. 5 is a diagram illustrating a data configuration of the reliability coefficient table 25-1 stored in the storage unit 25. The reliability coefficient table 25-1 includes items for "positional relationship pattern", "base station candidate position", "terminal station candidate position", and "reliability coefficient". In the item of "base station candidate position", information indicating three types of positional relationships is written in advance, indicating whether the base station candidate position 60 is located within the range of the proximity range 100, is located outside of the range of the proximity range 100 but within the range of the measurable range 110, or is located outside of the range of the measurable range 110.

In the item of "terminal station candidate position", information indicating three types of positional relationships is written in advance, indicating whether the terminal station candidate position 70 is located within the range of the proximity range 100, is located outside of the range of the proximity range 100 but within the range of the measurable range 110, or is located outside of the range of the measurable range 110.

Since there are three types of positional relationships in each of the base station candidate position 60 and the terminal station candidate position 70, a total of nine types of positional relationship patterns can be created. In the item of "positional relationship pattern", the signs of pt1 to pt9 assigned to each of the nine types of positional relationship patterns are written in advance. In the item of "reliability coefficient", the value of the reliability coefficient predetermined for each of the nine types of positional relationship patterns pt1 to pt9 is written in advance.

The positional relationship pattern pt1 is a pattern in which both the base station candidate position 60 and the terminal station candidate position 70 are located within the range of the proximity range 100. In the case of the positional relationship pattern pt1, it can be assumed that all of the point cloud data in the space between the base station candidate position 60 and the terminal station candidate position 70 can be acquired reliably, that is, with a high probability, and thus the reliability of the acquired point cloud data is also high. Thus, the reliability of the prescribed evaluation processing performed based on the point cloud data is also high, so "100" is written as the reliability coefficient. "Excellent" is written as a mark indicating the reliability coefficient "100".

The positional relationship pattern pt2 is a pattern in which the base station candidate position 60 is located within the range of the proximity range 100, and the terminal station candidate position 70 is located outside of the range of the proximity range 100, but is located within the range of the measurable range 110. In the case of the positional relationship pattern pt2, it can be assumed that the point cloud data of the space between the base station candidate position 60 and the terminal station candidate position 70 is generally acquired. However, from the viewpoint of the detailedness of the point cloud data, the detailedness of the point cloud data decreases as the distance from the MMS increases, and thus the reliability is lower than that of the positional relationship pattern pt1 for the terminal station candidate position 70 being far from the travel trajectory 50. Thus, the reliability of the prescribed evaluation processing performed based on such point cloud data is high to some extent, if not as high as the positional relationship pattern pt1, so "80" is written as the reliability coefficient. "Great" is written as a mark indicating the reliability coefficient "80".

The positional relationship pattern pt3 is a pattern in which the base station candidate position 60 is located within the range of the proximity range 100, but the terminal station candidate position 70 is located outside of the range of the measurable range 110. In the case of the positional relationship pattern pt3, it is assumed that the point cloud data of the space between the base station candidate position 60 and the terminal station candidate position 70 is only partially acquired. Thus, the reliability of the prescribed evaluation processing performed based on the point cloud data is low. However, in a case where the processing result of the prescribed evaluation processing, that is, the three-dimensional line-of-sight determination processing by the three-dimensional line-of-sight determination processing unit 23 is "no line-of-sight", or in a case where the processing result of the shield factor calculation processing by the shield factor calculation unit 24 indicates a "high shield factor", it can be used as reference information for the user to determine that the propagation environment is not good beyond the obtained result in reality. Thus, in the case of the positional relationship pattern pt3, the processing result of the prescribed evaluation processing can be reference information for the user in the base-station design, and thus "50" is written as the reliability coefficient. "Fair" is written as a mark indicating the reliability coefficient "50".

The positional relationship pattern pt4 is a pattern in which the base station candidate position 60 is located outside of the range of the proximity range 100, but is located within the range of the measurable range 110, and the terminal station candidate position 70 is located within the range of the proximity range 100. The positional relationship pattern pt4 corresponds to a pattern in which the positional relationship between the base station candidate position 60 and the terminal station candidate position 70 is exchanged in the positional relationship pattern pt2. Thus, in the case of the positional relationship pattern pt4, as with the positional relationship pattern pt2, "80" is written as the reliability coefficient, and "Great" is written as a mark indicating the reliability coefficient "80".

The positional relationship pattern pt5 is a pattern in which both the base station candidate position 60 and the terminal station candidate position 70 are located outside of the range of the proximity range 100, but are located within the range of the measurable range 110. In the case of the positional relationship pattern pt5, it can be assumed that the point cloud data of the space between the base station candidate position 60 and the terminal station candidate position 70 can be acquired. However, in the positional relationship pattern pt5, both the base station candidate position 60 and the terminal station candidate position 70 are located within the range of the measurable range 110, but are not located within the range of the proximity range 100. Thus, from the viewpoint of the detailedness and accuracy of the point cloud data, it is considered that the reliability is lower than that of the positional relationship patterns pt2 and pt4 in which either the base station candidate position 60 or the terminal station candidate position 70 is located in the proximity range 100. Thus, the reliability of the prescribed evaluation processing performed based on such point cloud data is high to some extent, if not as high as the positional relationship patterns pt2 and pt4, so "60" is written as the reliability coefficient. "Good" is written as a mark indicating the reliability coefficient "60".

The positional relationship pattern pt6 is a pattern in which the base station candidate position 60 is located outside of the range of the proximity range 100, but is located within the range of the measurable range 110, and the terminal station candidate position 70 is located outside of the range of the measurable range 110. Because the base station candidate position 60 is not located in the proximity range 100, the reliability of the point cloud data that can be partially acquired is lower than that of the positional relationship pattern pt3. However, in a case where the processing result of the prescribed evaluation processing, that is, the three-dimensional line-of-sight determination processing by the three-dimensional line-of-sight determination processing unit 23 is "no line-of-sight", or in a case where the processing result of the shield factor calculation processing by the shield factor calculation unit 24 indicates a "high shield factor", it can be used as reference information for the user to determine that the propagation environment is not good beyond the obtained result in reality. Thus, in the case of the positional relationship pattern pt6, the processing result of the prescribed evaluation processing can be reference information for the user in the base-station design, and thus "30", which is a value smaller than the positional relationship pattern pt3, is written as the reliability coefficient. "Poor" is written as a mark indicating the reliability coefficient "30".

The positional relationship pattern pt7 is a pattern in which the base station candidate position 60 is located outside of the range of the measurable range 110, and the terminal station candidate position 70 is located within the range of the proximity range 100. The positional relationship pattern pt7 corresponds to a pattern in which the positional relationship between the base station candidate position 60 and the terminal station candidate position 70 is exchanged in the positional relationship pattern pt3. Thus, in the case of the positional relationship pattern pt7, as with the positional relationship pattern pt3, "50" is written as the reliability coefficient, and "Fair" is written as a mark indicating the reliability coefficient "50".

The positional relationship pattern pt8 is a pattern in which the base station candidate position 60 is located outside of the range of the measurable range 110, and the terminal station candidate position 70 is located outside of the range of the proximity range 100, but is located within the range of the measurable range 110. The positional relationship pattern pt8 corresponds to a pattern in which the positional relationship between the base station candidate position 60 and the terminal station candidate position 70 is exchanged in the positional relationship pattern pt6. Thus, in the case of the positional relationship pattern pt8, as with the positional relationship pattern pt6, "30" is written as the reliability coefficient, and "Poor" is written as a mark indicating the reliability coefficient "30".

The positional relationship pattern pt9 is a pattern in which both the base station candidate position 60 and the terminal station candidate position 70 are located outside of the range of the measurable range 110. In the case of the positional relationship pattern pt9, it is assumed that the point cloud data of the space between the base station candidate position 60 and the terminal station candidate position 70 cannot be acquired. Thus, in the case of the positional relationship pattern pt9, "0", which is the smallest value as the reliability coefficient, is written, and "Bad" is written as a mark indicating the reliability coefficient "0".

FIG. 6 is a diagram illustrating a data configuration of the reliability coefficient table 25-2 stored in the storage unit 25. In the reliability coefficient table 25-1 illustrated in FIG. 5, the positional relationship patterns are classified according to whether to be located in two ranges, the proximity range 100 and the measurable range 110, and information relating to the nine types of positional relationship patterns pt1 to pt9 is stored. In contrast, in the reliability coefficient table 25-2 illustrated in FIG. 6, the positional relationship patterns are classified according to whether to be located in the measurable range 110, and information relating to the four types of positional relationship patterns ptA, ptB, ptC, and PtD is stored.

The reliability coefficient table 25-2 includes items for "positional relationship pattern", "base station candidate position", "terminal station candidate position", "reliability coefficient", and "corresponding positional relationship pattern". In the item of "positional relationship pattern", the signs of ptA to ptD assigned to each of the four types of positional relationship patterns are written in advance.

In the item of "base station candidate position", information indicating two types of positional relationships is written in advance, indicating whether the base station candidate position 60 is located within the range of the measurable range 110 or is located outside of the range of the measurable range 110. In the item of "terminal station candidate position", information indicating two types of positional relationships is written in advance, indicating whether the terminal station candidate position 70 is located within the range of the measurable range 110 or is located outside of the range of the measurable range 110.

In the item of "reliability coefficient", a predetermined reliability coefficient for each of the positional relationship patterns ptA to ptD and a mark corresponding to the value of the reliability coefficient are written. In the item of "corresponding positional relationship pattern", the sings pt1 to pt9 indicating the positional relationship patterns pt1 to pt9 of the reliability coefficient table 25-1 illustrated in FIG. 5 are written.

The positional relationship pattern ptA is a pattern in which both the base station candidate position 60 and the terminal station candidate position 70 are located within the range of the measurable range 110. Thus, in the item of "corresponding positional relationship pattern", the signs of the positional relationship patterns pt1, pt2, pt4, and pt5 included in the classification of the positional relationship pattern ptA are written. In the item of "reliability coefficient", the highest value "100" among the reliability coefficients of the positional relationship patterns pt1, pt2, pt4, and pt5 and a mark of "Excellent" corresponding to "100" are written.

The positional relationship pattern ptB is a pattern in which the base station candidate position 60 is located within the range of the measurable range 110, and the terminal station candidate position 70 is located outside of the range of the measurable range 110. Thus, in the item of "corresponding positional relationship pattern", the signs of the positional relationship patterns pt3 and pt6 included in the classification of the positional relationship pattern ptB are written. In the item of "reliability coefficient", the highest value "50" among the reliability coefficients of the positional relationship patterns pt3 and pt6 and a mark of "Fair" corresponding to "50" are written.

The positional relationship pattern ptC is a pattern in which the base station candidate position 60 is located outside of the range of the measurable range 110, and the terminal station candidate position 70 is located within the range of the measurable range 110. Thus, in the item of "corresponding positional relationship pattern", the signs of the positional relationship patterns pt7 and pt8 included in the classification of the positional relationship pattern ptB are written. In the item of "reliability coefficient", the highest value "50" among the reliability coefficients of the positional relationship patterns pt7 and pt8 and a mark of "Fair" corresponding to "50" are written.

The positional relationship pattern ptD is a pattern in which both the base station candidate position 60 and the terminal station candidate position 70 are located outside of the range of the measurable range 110. Thus, in the item of "corresponding positional relationship pattern", the sign of the positional relationship pattern pt9 included in the classification of the positional relationship pattern ptD are written. In the item of "reliability coefficient", "0" which is the reliability coefficient of the positional relationship pattern pt9 and a mark of "Bad" corresponding to "0" are written.

Process According to Second Embodiment

Figure 15:
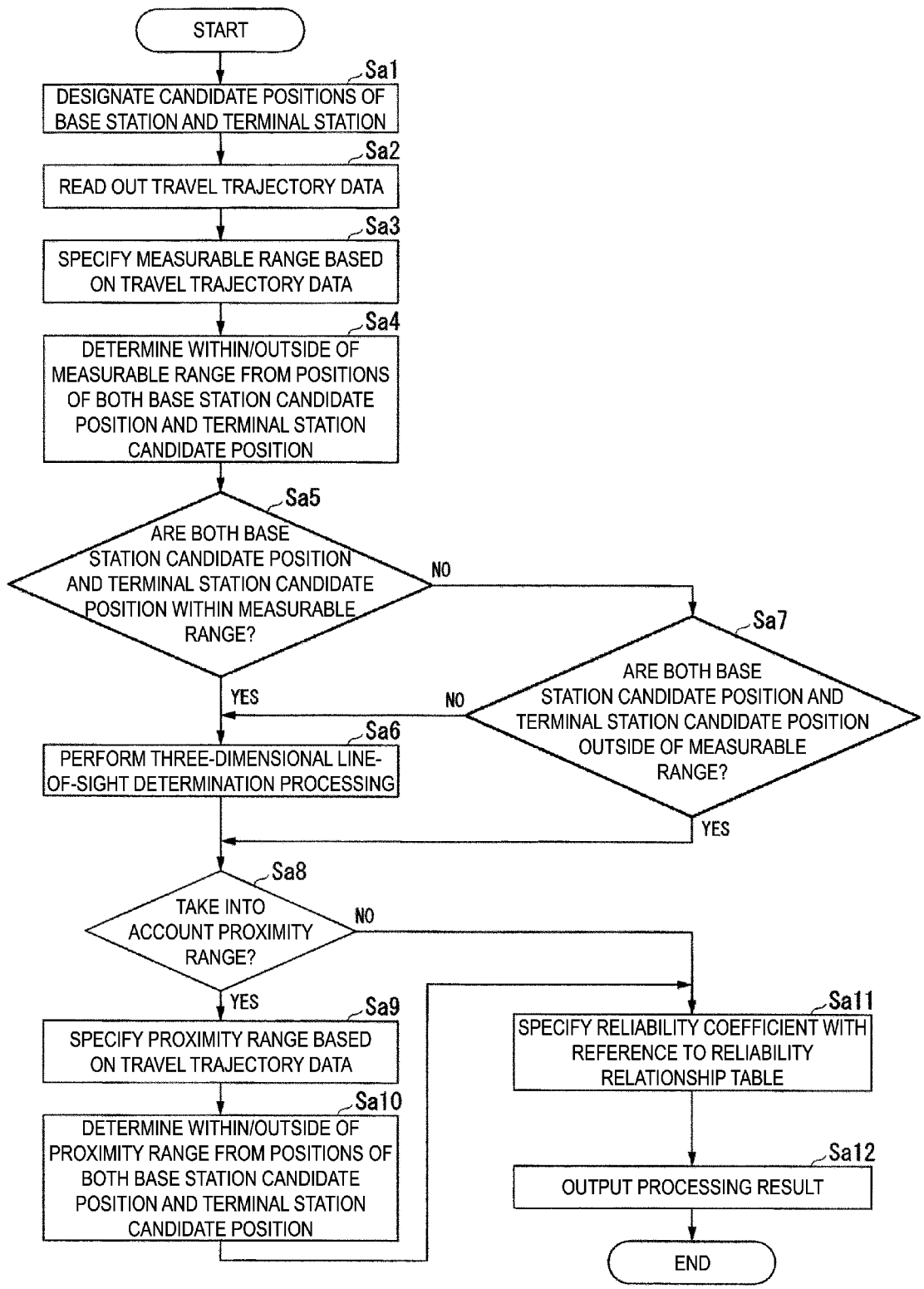
FIG. 15 is a flowchart illustrating a process flow of the point cloud data processing unit in the station placement assistance apparatus according to the second embodiment.

FIG. 15 is a flowchart illustrating a process flow of the point cloud data processing unit 6a according to the second embodiment. The process is a process corresponding to (5) the processing of the communication availability determination using the three-dimensional point cloud data of the station placement assistance method illustrated in FIG. 2. The flowchart illustrated in FIG. 15 illustrates an example in which the three-dimensional line-of-sight determination processing by the three-dimensional line-of-sight determination processing unit 23 is applied as the prescribed evaluation processing performed by the point cloud data processing unit 6a.

Prior to performing the process described below, the user of the station placement assistance apparatus 1a selects in advance whether to perform the processing to take into account the proximity range 100, that is, the processing to determine whether the base station candidate position 60 and the terminal station candidate position 70 are located within the range of the proximity range 100 or are located outside of the range of the proximity range 100. In a case where the user selects to perform the processing, the operation processing unit 10 outputs an instruction signal indicating "take into account the proximity range" in response to the user operation.

The three-dimensional candidate position selection unit 20 selects the base station candidate position 60 and the terminal station candidate position 70, and outputs the base station candidate position data indicating the base station candidate position 60 and the terminal station candidate position data indicating the terminal station candidate position 70 to the positional relationship specification unit 21a (step Sa1). As a result, the base station candidate position 60 and the terminal station candidate position 70 to be processed are designated.

The measurable range specification unit 30 reads out the travel trajectory data from the travel trajectory data storage unit 14 (step Sa2). The measurable range specification unit 30 generates the measurable range data indicating the measurable range 110 based on the read travel trajectory data and the predetermined measurable distance (step Sa3). The measurable range specification unit 30 outputs the generated measurable range data to the measurable range presence determination unit 31.

The measurable range presence determination unit 31 fetches the base station candidate position data output by the three-dimensional candidate position selection unit 20, the terminal station candidate position data, and the measurable range data output by the measurable range specification unit 30. The measurable range presence determination unit 31 determines whether the base station candidate position 60 is located within the range of the measurable range 110 or is located outside of the range of the measurable range 110, based on the measurable range data and the base station candidate position data. The measurable range presence determination unit 31 generates the determination result as the base station positional relationship specification data, and writes and stores the generated base station positional relationship specification data in the determination result storage unit 34.

The measurable range presence determination unit 31 determines whether the terminal station candidate position 70 is located within the range of the measurable range 110 or is located outside of the range of the measurable range 110, based on the measurable range data and the terminal station candidate position data. The measurable range presence determination unit 31 generates the determination result as the terminal station positional relationship specification data, and writes and stores the generated terminal station positional relationship specification data in the determination result storage unit 34 (step Sa4).

The measurable range presence determination unit 31 determines whether the determination result indicates that both the base station candidate position 60 and the terminal station candidate position 70 are present within the range of the measurable range 110 (step Sa5). In a case where the measurable range presence determination unit 31 determines that the determination result indicates that both the base station candidate position 60 and the terminal station candidate position 70 are present within the range of the measurable range 110 (step Sa5, Yes), the measurable range presence determination unit 31 outputs an instruction signal instructing the start of the processing including the base station candidate position data and the terminal station candidate position data to be processed to the three-dimensional line-of-sight determination processing unit 23.

In step Sa5, in a case where the measurable range presence determination unit 31 determines "Yes", it corresponds to the case of the reliability coefficient "100" to "60" in the reliability coefficient tables 25-1 and 25-2, the reliability of the point cloud data is high, and thus it is meaningful to perform the three-dimensional line-of-sight determination processing.

Upon receiving the instruction signal from the measurable range presence determination unit 31, the three-dimensional line-of-sight determination processing unit 23 reads out the point cloud data of the space between the base station candidate position 60 corresponding to the base station candidate position data and the terminal station candidate position 70 corresponding to the terminal station candidate position data included in the instruction signal from the point cloud data storage unit 13, and performs the three-dimensional line-of-sight determination processing based on the read point cloud data (step Sa6).

On the other hand, in a case where the measurable range presence determination unit 31 determines that the determination result indicates that both the base station candidate position 60 and the terminal station candidate position 70 are not within the range of the measurable range 110, that is, in a case of the reliability coefficient "50" to "0" in the reliability coefficient tables 25-1 and 25-2 (step Sa5, No), the measurable range presence determination unit 31 determines whether the determination result indicates that both the base station candidate position 60 and the terminal station candidate position 70 are present outside of the range of the measurable range 110 (step Sa7).

In a case where the measurable range presence determination unit 31 determines that the determination result indicates that both the base station candidate position 60 and the terminal station candidate position 70 are present outside of the range of the measurable range 110 (step Sa7, Yes), the measurable range presence determination unit 31 proceeds the process to step Sa8. In step Sa7, in the case where the measurable range presence determination unit 31 determines "Yes", it corresponds to the case of the reliability coefficient "0" in the reliability coefficient tables 25-1 and 25-2, and thus the point cloud data of the space between the base station candidate position 60 and the terminal station candidate position 70 cannot be acquired. Thus, it is not meaningful to perform the three-dimensional line-of-sight determination processing, so the processing of step Sa6 is not performed.

On the other hand, in a case where the measurable range presence determination unit 31 determines that the determination result indicates that both the base station candidate position 60 and the terminal station candidate position 70 are not located outside of the range of the measurable range 110 (step Sa7, No), the measurable range presence determination unit 31 proceeds the process to step Sa6. In step Sa7, in a case where the measurable range presence determination unit 31 determines "No", it corresponds to the case of the reliability coefficient "50" to "30" in the reliability coefficient tables 25-1 and 25-2, and thus the processing of step Sa6 is performed because it is somewhat meaningful to perform the three-dimensional line-of-sight determination processing.

The measurable range presence determination unit 31 determines whether the operation processing unit 10 outputs an instruction signal indicating "take into account the proximity range" (step Sa8). In a case where the measurable range presence determination unit 31 determines that the operation processing unit 10 does not output an instruction signal indicating "take into account the proximity range" (step Sa8, No), the measurable range presence determination unit 31 proceeds the process to step Sa11.

On the other hand, in a case where the measurable range presence determination unit 31 determines that the operation processing unit 10 outputs an instruction signal indicating "take into account the proximity range" (step Sa8, Yes), the measurable range presence determination unit 31 outputs an instruction signal instructing the start of the processing including the base station candidate position data and the terminal station candidate position data to the proximity range specification unit 32. Upon receiving the instruction signal output by the measurable range presence determination unit 31, the proximity range specification unit 32 reads out the travel trajectory data from the travel trajectory data storage unit 14. The proximity range specification unit 32 generates the proximity range data indicating the proximity range 100 based on the read travel trajectory data and the predetermined proximity distance (step Sa9). The proximity range specification unit 32 outputs the base station candidate position data and the terminal station candidate position data included in the instruction signal, and the generated proximity range data to the proximity range presence determination unit 33.

The proximity range presence determination unit 33 fetches the base station candidate position data, the terminal station candidate position data, and the proximity range data output by the proximity range specification unit 32. The proximity range presence determination unit 33 determines whether the base station candidate position 60 is located within the range of the proximity range 100 or is located outside of the range of the proximity range 100, based on the proximity range data and the base station candidate position data. The proximity range presence determination unit 33 adds the determination result to the base station positional relationship specification data stored in the determination result storage unit 34.

The proximity range presence determination unit 33 determines whether the terminal station candidate position 70 is located within the range of the proximity range 100 or is located outside of the range of the proximity range 100, based on the proximity range data and the terminal station candidate position data. The proximity range presence determination unit 33 writes the determination result to the terminal station positional relationship specification data stored in the determination result storage unit 34 (step Sa10).

For step Sa11, the processing is different depending on whether the proximity range 100 is taken into account, and thus the process flow will be illustrated below for each case.

Case Where User Selects "Take into Account Proximity Range" In a case where the operation processing unit 10 outputs an instruction signal indicating "take into account", the reliability coefficient specification unit 22*a* refers to the base station positional relationship specification data stored in the determination result storage unit 34, and detects positional relationship whether the base station candidate position 60 is located within the range of the proximity range 100, or is located outside of the range of the proximity range 100 but within the range of the measurable range 110, or is located outside of the range of the measurable range 110.

The reliability coefficient specification unit 22*a* refers to the terminal station positional relationship specification data stored in the determination result storage unit 34, and detects either positional relationship whether the terminal station candidate position 70 is located within the range of the proximity range 100, or is located outside of the range of the proximity range 100 but is located within the range of the measurable range 110, or is located outside of the range of the measurable range 110.

The reliability coefficient specification unit 22*a* refers to the reliability coefficient table 25-1 stored in the storage unit 25, reads out the reliability coefficient corresponding the detected positional relationship of the base station candidate position 60 and the detected positional relationship of the terminal station candidate position 70 and the mark corresponding to the reliability coefficient from the item of "reliability coefficient", and specifies the reliability coefficient and the mark (step Sa11).

Case Where User Does Not Select "Take into Account Proximity Range" In a case where the operation processing unit 10 does not output an instruction signal indicating "take into account the proximity range," the reliability coefficient specification unit 22*a* refers to the base station positional relationship specification data stored in the determination result storage unit 34, and the reliability coefficient specification unit 22*a* detects positional relationship whether the base station candidate position 60 is located within the range of the measurable range 110 or is located outside of the range of the measurable range 110. The reliability coefficient specification unit 22*a* refers to the terminal station positional relationship specification data stored in the determination result storage unit 34, and detects positional relationship whether the terminal station candidate position 70 is located within the range of the measurable range 110 or is located outside of the range of the measurable range 110.

The reliability coefficient specification unit 22*a* refers to the reliability coefficient table 25-2 stored in the storage unit 25, reads out the reliability coefficient corresponding the detected positional relationship of the base station candidate position 60 and the detected positional relationship of the terminal station candidate position 70 and the mark corresponding to the reliability coefficient from the item of "reliability coefficient", and specifies the reliability coefficient and the mark (step Sa11).

After either of the two types of step Sa11 described above is performed, the reliability coefficient specification unit 22*a* displays the base station candidate position data and the terminal station candidate position data stored in the determination result storage unit 34, and the specified reliability coefficient and the mark on the screen, and the three-dimensional line-of-sight determination processing unit 23 displays the processing result of the three-dimensional line-of-sight determination processing on the screen.

In contrast, in a case where the three-dimensional line-of-sight determination processing unit 23 does not output the processing result because the processing of step Sa6 is not performed, the reliability coefficient specification unit 22*a* displays the base station candidate position data and the terminal station candidate position data, and the reliability coefficient and the mark on the screen, and displays that the three-dimensional line-of-sight determination processing is "unprocessable" (step Sa12).

In the positional relationship specification unit 21*a* of the station placement assistance apparatus 1*a* according to the second embodiment described above, the measurable range specification unit 30 generates the measurable range data indicating the measurable range based on the travel trajectory data and the measurable distance. The measurable range presence determination unit 31 determines whether the base station candidate position is present within the range of the measurable range based on the measurable range data and the base station candidate position data to generate the determination result as the base station positional relationship specification data, and determines whether the terminal station candidate position is present within the range of the measurable range based on the measurable range data and the terminal station candidate position data to generate the determination result as the terminal station positional relationship specification data.

In the positional relationship specification unit 21*a*, the proximity range specification unit 32 generates the proximity range data indicating the proximity range based on the travel trajectory data and the predetermined proximity distance shorter than the measurable distance. The proximity range presence determination unit 33 determines whether the base station candidate position is present within the range of the proximity range based on the proximity range data and the base station candidate position data to add the determination result to the base station positional relationship specification data generated by the measurable range presence determination unit 31, and determines whether the terminal station candidate position is present within the range of the proximity range based on the proximity range data and the terminal station candidate position data to add the determination result to the terminal station positional relationship specification data generated by the measurable range presence determination unit 31.

As a result, in a case where the user selects "take into account the proximity range," a reliability coefficient is displayed on the screen in any of six levels: "Excellent: 100", "Great: 80", "Good: 60", "Fair: 50", "Poor: 30", and "Bad: 0". In contrast, in a case where the user does not select "take into account the proximity range," a reliability coefficient is displayed on the screen in any of three levels: "Excellent: 100", "Fair: 50", and "Bad: 0". According to the magnitude of the numerical value of the reliability coefficient or the type of the mark displayed on the screen, in a case where the user of the station placement assistance apparatus 1*a* selects "take into account the proximity range", the user of the station placement assistance apparatus 1*a* can determine the degree of reliability of the processing result of the three-dimensional line-of-sight determination processing unit 23 by the reliability coefficients of the six levels. In a case where the user of the station placement assistance apparatus 1*a* does not select "take into account the proximity range," the user of the station placement assistance apparatus 1*a* can determine the degree of reliability of the processing result of the three-dimensional line-of-sight determination processing unit 23 by the reliability coefficients of the three levels.

In the configuration of the second embodiment described above, in a case where both the base station candidate position 60 and the terminal station candidate position 70 are located outside of the range of the measurable range 110, the prescribed evaluation processing, that is, the three-dimensional line-of-sight determination processing by the three-dimensional line-of-sight determination processing unit 23 of step Sa6 is not performed, and the fact that three-dimensional line-of-sight determination processing has not been performed is displayed on the screen as "unprocessable". By indicating the reliability coefficient and the mark and the "unprocessable" of the three-dimensional line-of-sight determination processing, the user is able to grasp the state of the positional relationship of each of the travel trajectory 50, the base station candidate position 60, and the terminal station candidate position 70. Thus, even in a case where the state of acquisition of the point cloud data of the space between the base station candidate position 60 and the terminal station candidate position 70 is not good, it is possible for the user to perform an appropriate base-station design.

Note that in the second embodiment described above, an example is illustrated in which the three-dimensional line-of-sight determination processing by the three-dimensional line-of-sight determination processing unit 23 is applied as a prescribed evaluation processing, but the shield factor calculation processing by the shield factor calculation unit 24 may be applied as a prescribed evaluation processing. In this case, in step Sa6, the shield factor calculation unit 24 performs the shield factor calculation processing based on the point cloud data of the space between the base station candidate position 60 and the terminal station candidate position 70 read from the point cloud data storage unit 13.

In the second embodiment described above, in step Sa7, the measurable range presence determination unit 31 determines whether both the base station candidate position 60 and the terminal station candidate position 70 are present outside of the range of the measurable range 110. However, the configuration of the present invention is not limited to the embodiment described above. The condition of step Sa7, that is, the condition whether to perform the three-dimensional line-of-sight determination processing by the three-dimensional line-of-sight determination processing unit 23 may be changed as appropriate. For example, a condition may be applied in which the three-dimensional determination processing of step Sa6 is not performed in a case where either the base station candidate position 60 or the terminal station candidate position 70 is located outside of the range of the measurable range 110. In this case, the three-dimensional determination processing of step Sa6 is not performed in the case of the positional relationship patterns pt3, and pt6 to pt9 where the reliability coefficient is less than or equal to "50".

In the processing of step Sa7, the measurable range presence determination unit 31 may display the positional relationship of the travel trajectory 50, the base station candidate position 60, and the terminal station candidate position 70, for example, on the screen, and the user may refer to the screen, decide whether to perform the three-dimensional line-of-sight determination processing of step Sa6, and depending on the decision, operate the operation processing unit 10 to provide an instruction signal to cause the measurable range presence determination unit 31 to determine whether "Yes" or "No".

During steps Sa4 and Sa5, the reliability coefficient specification unit 22*a* may refer to the reliability coefficient table 25-2 to specify the reliability coefficient based on the determination result by the measurable range presence determination unit 31, and the determination processing of steps Sa5 and Sa7 may be performed based on the specified reliability coefficient. In this case, the determination condition of step Sa5 is a determination condition of "if the reliability coefficient is '100'?", and the determination condition of step Sa7 is a determination condition of "if the reliability coefficient is '0'?".

The order of processing may be changed so that the processing of steps Sa5, Sa6, and Sa7 is performed after step Sa11, and after the reliability coefficient specification unit 22*a* specifies the reliability coefficient, the reliability coefficient specification unit 22*a* may perform the processing of steps Sa5, Sa6, and Sa7. In this case, for example, the determination condition of step Sa7 may be a determination condition of "whether either the base station candidate position 60 or the terminal station candidate position 70 is located within the range of the proximity range 100," and the three-dimensional line-of-sight determination processing of step Sa6 may be performed in a case where "either the base station candidate position 60 or the terminal station candidate position 70 is located within the range of the proximity range 100". By applying this determination condition, the three-dimensional line-of-sight determination processing of step Sa6 is performed in the case of the positional relationship patterns pt1 to pt5, and pt7 in which the reliability coefficient is greater than or equal to "50", but the three-dimensional line-of-sight determination processing of step Sa6 is not performed for the positional relationship patterns pt6, pt8, and pt9 in which the reliability coefficient is less than or equal to "30".

In the second embodiment described above, the numerical values of the reliability coefficient written in advance to the item of the "reliability coefficient" of the reliability coefficient tables 25-1 and 25-2 are examples, and may be any numerical value as long as the order of the numerical values is maintained.

Third Embodiment

Figure 16:
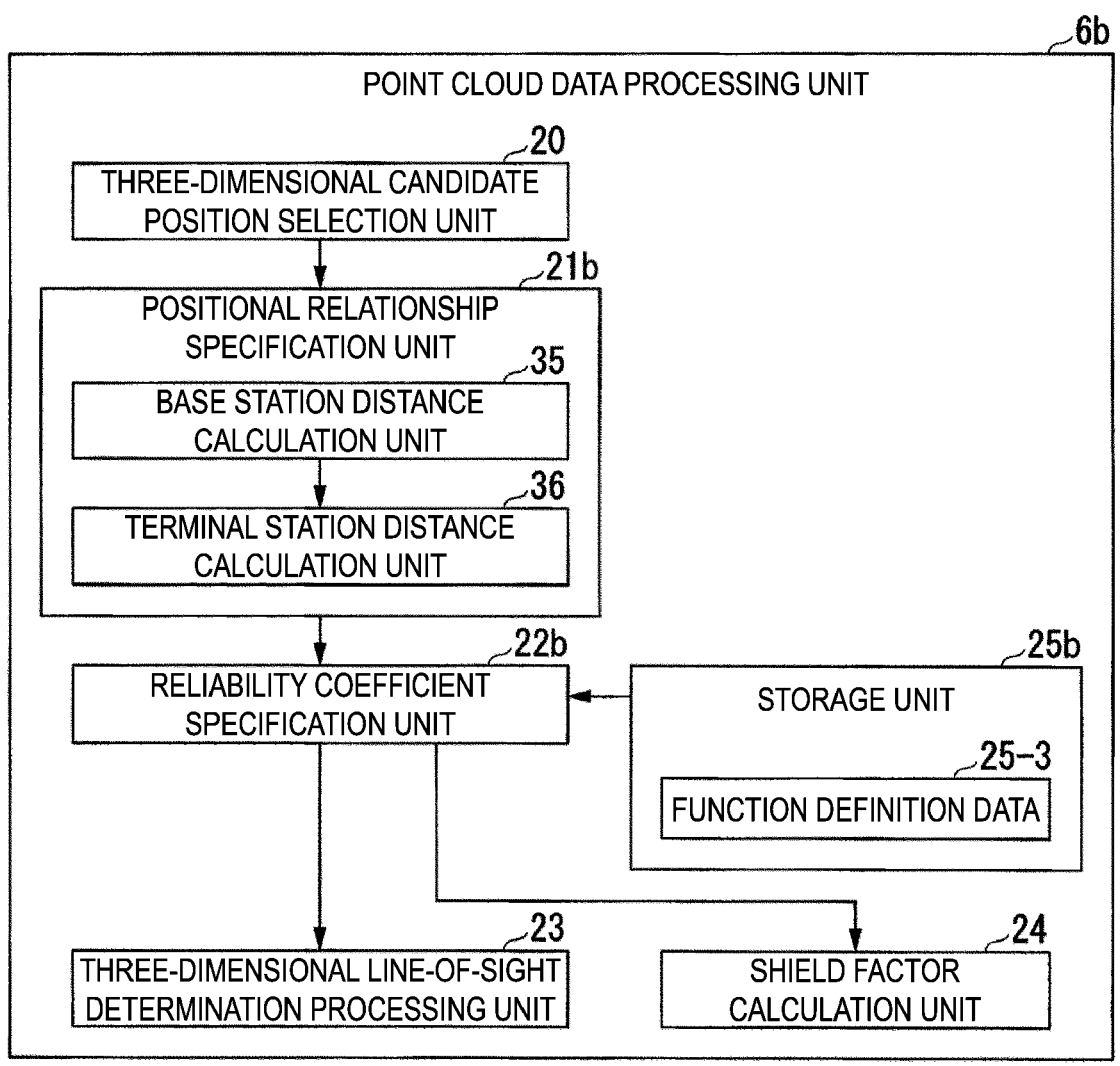
FIG. 16 is a block diagram illustrating a configuration of a point cloud data processing unit of a station placement assistance apparatus according to a third embodiment.

FIG. 16 is a block diagram illustrating an internal configuration of a point cloud data processing unit 6*b* applied to a third embodiment. In the third embodiment, the same reference signs are assigned to the same components as those in the first and second embodiments. Although not illustrated in the drawings, in the following description, the reference sign "1*b*" is given to the station placement assistance apparatus according to the third embodiment, and it is referred to as a station placement assistance apparatus 1*b*. The station placement assistance apparatus 1*b* has a configuration in which the point cloud data processing unit 6 in the station placement assistance apparatus 1 according to the first embodiment is replaced with a point cloud data processing unit 6*b* illustrated in FIG. 16. The point cloud data processing unit 6*b* includes a three-dimensional candidate position selection unit 20, a positional relationship specification unit 21*b*, a reliability coefficient specification unit 22*b*, a three-dimensional line-of-sight determination processing unit 23, a shield factor calculation unit 24, and a storage unit 25*b*.

The positional relationship specification unit 21*b* includes a base station distance calculation unit 35 and a terminal station distance calculation unit 36. The base station distance calculation unit 35 calculates the shortest distance between the travel trajectory 50 and the base station candidate position 60, based on the travel trajectory data stored in the travel trajectory data storage unit 14 and the base station candidate position data selected by the three-dimensional candidate position selection unit 20, and generates data indicating the calculated shortest distance as the base station positional relationship specification data. The shortest distance from the travel trajectory 50 to the base station candidate position 60 calculated by the base station distance calculation unit 35 is a distance that has the shortest length of the distance between the position on the two-dimensional plane where the coordinate components in the vertical direction of the base station candidate position 60 are discarded and any point on the line segment of the travel trajectory 50.

The terminal station distance calculation unit 36 calculates the shortest distance between the travel trajectory 50 and the terminal station candidate position 70, based on the travel trajectory data stored in the travel trajectory data storage unit 14 and the terminal station candidate position data selected by the three-dimensional candidate position selection unit 20, and generates data indicating the calculated shortest distance as the terminal station positional relationship specification data. The shortest distance from the travel trajectory 50 calculated by the terminal station distance calculation unit 36 to the terminal station candidate position 70 is a distance that has the shortest length of the distance between the position on the two-dimensional plane where the coordinate components in the vertical direction of the terminal station candidate position 70 are discarded and any point on the line segment of the travel trajectory 50.

Figure 17:
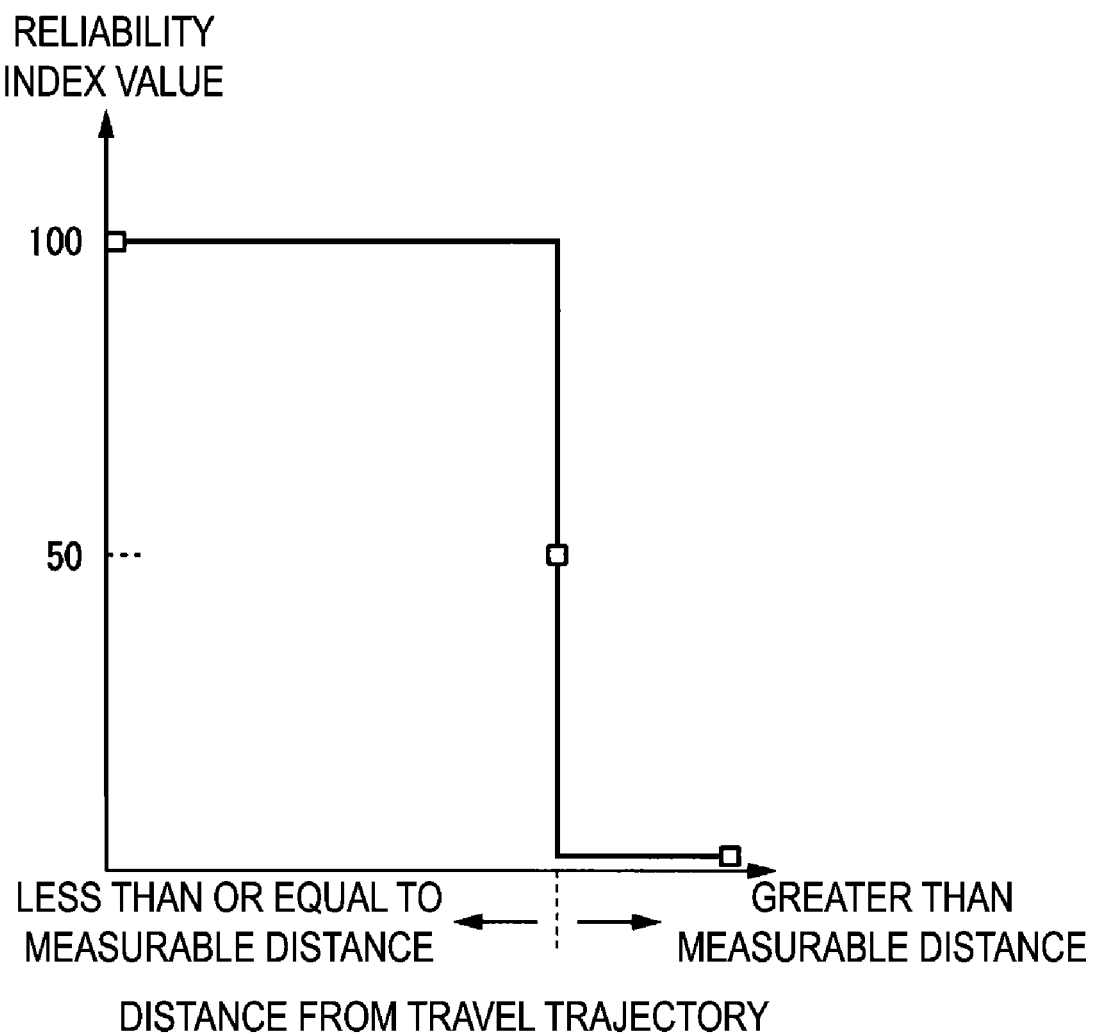
FIG. 17 is a diagram illustrating an example (Part 1) of function definition data according to the third embodiment.

The storage unit 25*b* stores the function definition data 25-3 in advance. The function indicated by the function definition data 25-3 is a function indicating a higher reliability index value as the distance from the travel trajectory 50 is shorter, and is a function that becomes "0" at a distance greater than the measurable distance. As a function indicated by the function definition data 25-3, for example, a function having the slope illustrated in FIG. 17 is applied.

The reliability coefficient specification unit 22b applies the function indicated by the function definition data 25-3 to the value of the distance indicated by the base station positional relationship specification data generated by the base station distance calculation unit 35, and determines the reliability index value. In the following description, the reliability index value obtained from the value of the distance indicated by the base station positional relationship specification data is referred to as a first reliability index value. The reliability coefficient specification unit 22b applies the function indicated by the function definition data 25-3 to the value of the distance indicated by the terminal station positional relationship specification data generated by the terminal station distance calculation unit 36, and determines the reliability index value. In the following description, the reliability index value obtained from the value of the distance indicated by the terminal station positional relationship specification data is referred to as a second reliability index value.

The reliability coefficient specification unit 22b calculates the reliability coefficient based on the first reliability index value and the second reliability index value. For example, the reliability coefficient specification unit 22b calculates the average value of the first reliability index value and the second reliability index value as the reliability coefficient.

Process According to Third Embodiment

Figure 18:
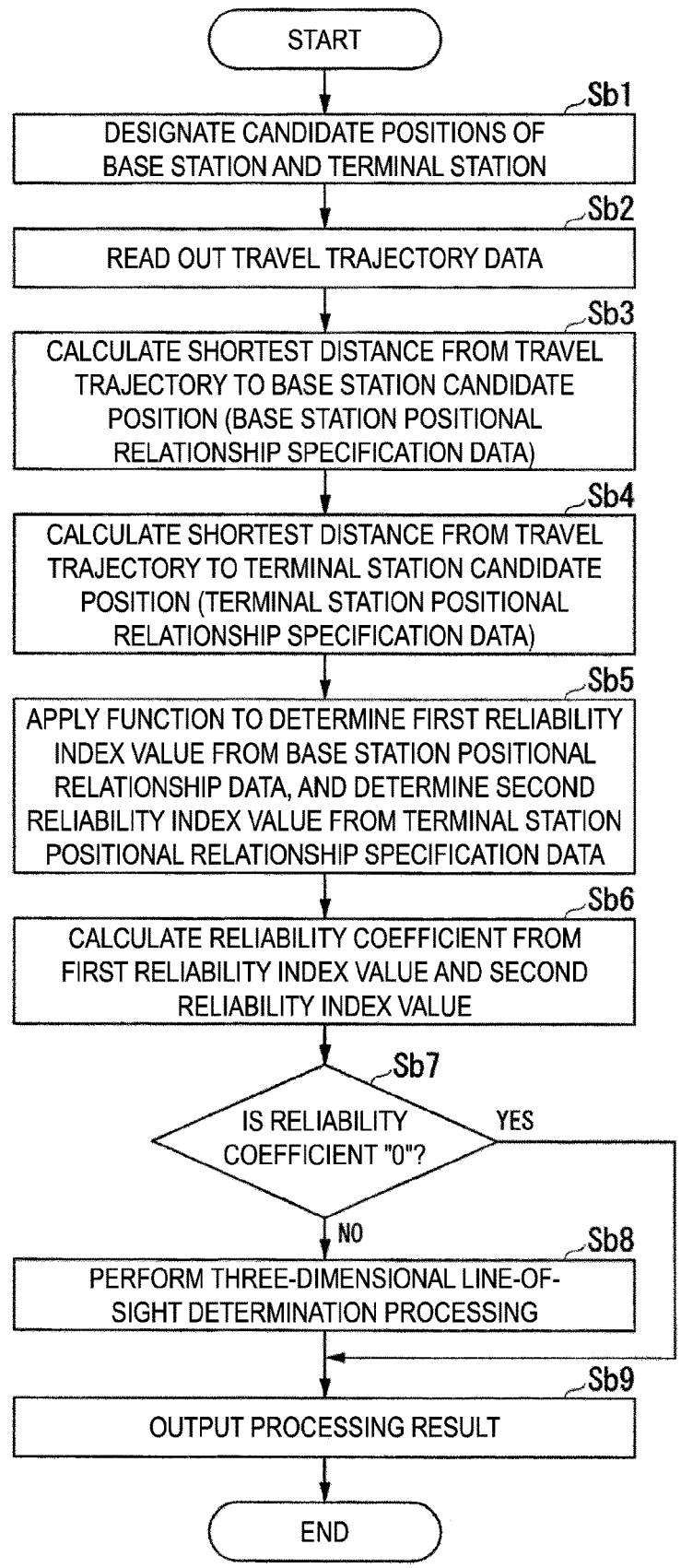
FIG. 18 is a flowchart illustrating a process flow of the point cloud data processing unit in the station placement assistance apparatus according to the third embodiment.

FIG. 18 is a flowchart illustrating a process flow of the point cloud data processing unit 6b according to the third embodiment. The process is a process corresponding to (5) the processing of the communication availability determination using the three-dimensional point cloud data of the station placement assistance method illustrated in FIG. 2. The flowchart illustrated in FIG. 18 illustrates an example in which the three-dimensional line-of-sight determination processing by the three-dimensional line-of-sight determination processing unit 23 is applied as the prescribed evaluation processing performed by the point cloud data processing unit 6b.

The three-dimensional candidate position selection unit 20 selects the base station candidate position 60 and the terminal station candidate position 70, and outputs the base station candidate position data indicating the base station candidate position 60 and the terminal station candidate position data indicating the terminal station candidate position 70 to the positional relationship specification unit 21b (step Sb1). As a result, the base station candidate position 60 and the terminal station candidate position 70 to be processed are designated.

The base station distance calculation unit 35 and the terminal station distance calculation unit 36 read out the travel trajectory data from the travel trajectory data storage unit 14 (step Sb2). The base station distance calculation unit 35 fetches the base station candidate position data indicating the base station candidate position 60 output by the three-dimensional candidate position selection unit 20. The base station distance calculation unit 35 calculates the shortest distance from the travel trajectory 50 to the base station candidate position 60 based on the travel trajectory data and the base station candidate position data, and generates data indicating the calculated shortest distance as the base station positional relationship specification data (step Sb3). The base station distance calculation unit 35 outputs the generated base station positional relationship specification data and the base station candidate position data to the reliability coefficient specification unit 22b.

The terminal station distance calculation unit 36 fetches the terminal station candidate position data indicating the terminal station candidate position 70 output by the three-dimensional candidate position selection unit 20. The terminal station distance calculation unit 36 calculates the shortest distance from the travel trajectory 50 to the terminal station candidate position 70 based on the travel trajectory data and the fetched terminal station candidate position data, and generates data indicating the calculated shortest distance as the terminal station positional relationship specification data (step Sb4). The terminal station distance calculation unit 36 outputs the generated terminal station positional relationship specification data and the terminal station candidate position data to the reliability coefficient specification unit 22b.

The reliability coefficient specification unit 22b fetches the base station positional relationship specification data and the base station candidate position data output by the base station distance calculation unit 35. The reliability coefficient specification unit 22b fetches the terminal station positional relationship specification data and the terminal station candidate position data output by the terminal station distance calculation unit 36.

The reliability coefficient specification unit 22b refers to the storage unit 25b, applies the function indicated by the function definition data 25-3 to the value of the distance indicated by the base station positional relationship specification data, and determines the first reliability index value. The reliability coefficient specification unit 22b applies the function indicated by the function definition data 25-3 to the value of the distance indicated by the terminal station positional relationship specification data, and determines the second reliability index value (step Sb5). The reliability coefficient specification unit 22b calculates the average value of the determined first reliability index value and the second reliability index value, and sets the calculated average value as the reliability coefficient (step Sb6).

In the case of the function illustrated in FIG. 17, in a case where both the shortest distance from the travel trajectory 50 to the base station candidate position 60 and the shortest distance from the travel trajectory 50 to the terminal station candidate position 70 are distances less than or equal to the measurable distance, then the first reliability index value and the second reliability index value are both "100". Thus, the reliability coefficient calculated by the reliability coefficient specification unit 22b is "100".

In a case where either one of the shortest distance from the travel trajectory 50 to the base station candidate position 60 and the shortest distance from the travel trajectory 50 to the terminal station candidate position 70 is a distance less than or equal to the measurable distance, and the other is a distance greater than the measurable distance, either one of the first reliability index value and the second reliability index value is "100" and the other is "0". Thus, the reliability coefficient calculated by the reliability coefficient specification unit 22b is "50".

In a case where both the shortest distance from the travel trajectory 50 to the base station candidate position 60 and the shortest distance from the travel trajectory 50 to the terminal station candidate position 70 are distances greater than the measurable distance, both the first reliability index value and the second reliability index value are "0". Thus, the reliability coefficient calculated by the reliability coefficient specification unit 22b is "0".

The reliability coefficient specification unit 22b determines whether the reliability coefficient is "0" (step Sb7). In a case where the reliability coefficient specification unit 22b determines that the calculated reliability coefficient is "0" (step Sb7, Yes), the reliability coefficient specification unit 22b proceeds the process to step Sb9. On the other hand, in a case where the reliability coefficient specification unit 22b determines that the reliability coefficient is not "0" (step Sb7, No), the reliability coefficient specification unit 22b outputs an instruction signal instructing the start of the processing including the base station candidate position data and the terminal station candidate position data to be processed to the three-dimensional line-of-sight determination processing unit 23.

Upon receiving the instruction signal from the reliability coefficient specification unit 22b, the three-dimensional line-of-sight determination processing unit 23 reads out the point cloud data of the space between the base station candidate position 60 corresponding to the base station candidate position data and the terminal station candidate position 70 corresponding to the terminal station candidate position data included in the instruction signal from the point cloud data storage unit 13, and performs the three-dimensional line-of-sight determination processing based on the read point cloud data (step Sb8).

The reliability coefficient specification unit 22b displays the base station candidate position data, the terminal station candidate position data, and the calculated reliability coefficient on the screen, and the three-dimensional line-of-sight determination processing unit 23 displays the processing result of the three-dimensional line-of-sight determination processing on the screen. In contrast, in a case where the three-dimensional line-of-sight determination processing unit 23 does not output the processing result because the processing of step Sb8 is not performed, the reliability coefficient specification unit 22b displays the base station candidate position data and the terminal station candidate position data, and the reliability coefficient on the screen, and displays that the three-dimensional line-of-sight determination processing is "unprocessable" (step Sb9).

In the third embodiment described above, an example has been described in which the function indicated by the function definition data 25-3 is a function illustrated in FIG. 17. In the case of the function illustrated in FIG. 17, the reliability index value obtained as the output of the function is a value of either "100" or "0". Thus, in the case where the function illustrated in FIG. 17 is used, in the processing of step Sa8 of the second embodiment illustrated in FIG. 15, in a case where the proximity range specification unit 32 determines "No", that is, in the case of "not take into account the proximity range", the same reliability coefficient is determined as the reliability coefficient specified by the reliability coefficient specification unit 22a based on the reliability coefficient table 25-2.

The function applied to the function definition data 25-3 is not limited to the function illustrated in FIG. 17. For example, functions such as those illustrated in FIGS. 19 to 22 may be applied. In the function illustrated in FIG. 19, the reliability index value obtained as an output of the function is a value of any of "100", "50", and "0", where the reliability index value is "100" in a case where the distance given to the function is less than or equal to the proximity distance defining the proximity range 100 indicated in the second embodiment, and is "50" in a case where the distance given to the function is a distance greater than the proximity distance but a distance less than or equal to the measurable distance, and is "0" in a case where the distance given to the function is a distance greater than the measurable distance. In this case, the reliability coefficient calculated by the reliability coefficient specification unit 22b is any of five values, "100", "75", "50", "25", and "0", and it is possible to indicate a reliability coefficient of five levels.

Figure 19:
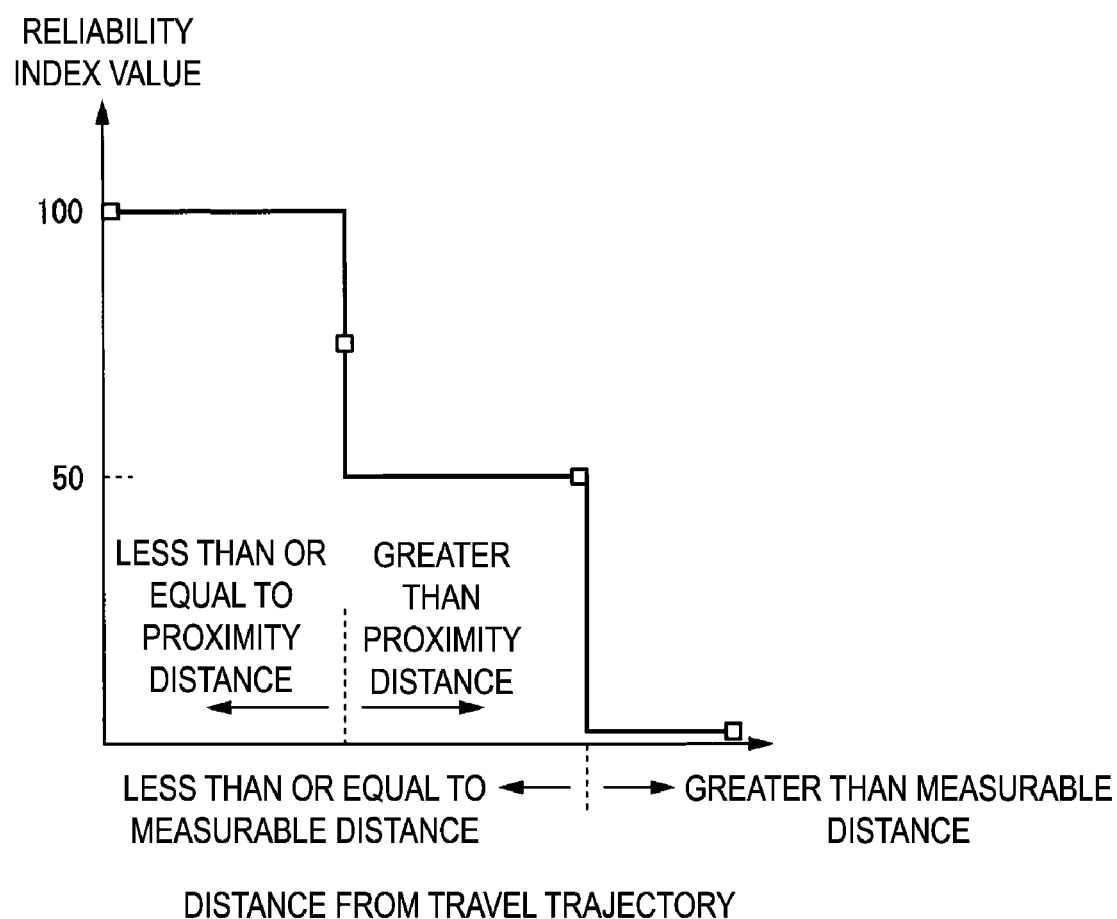
FIG. 19 is a diagram illustrating an example (Part 2) of function definition data according to the third embodiment.
Figure 20:
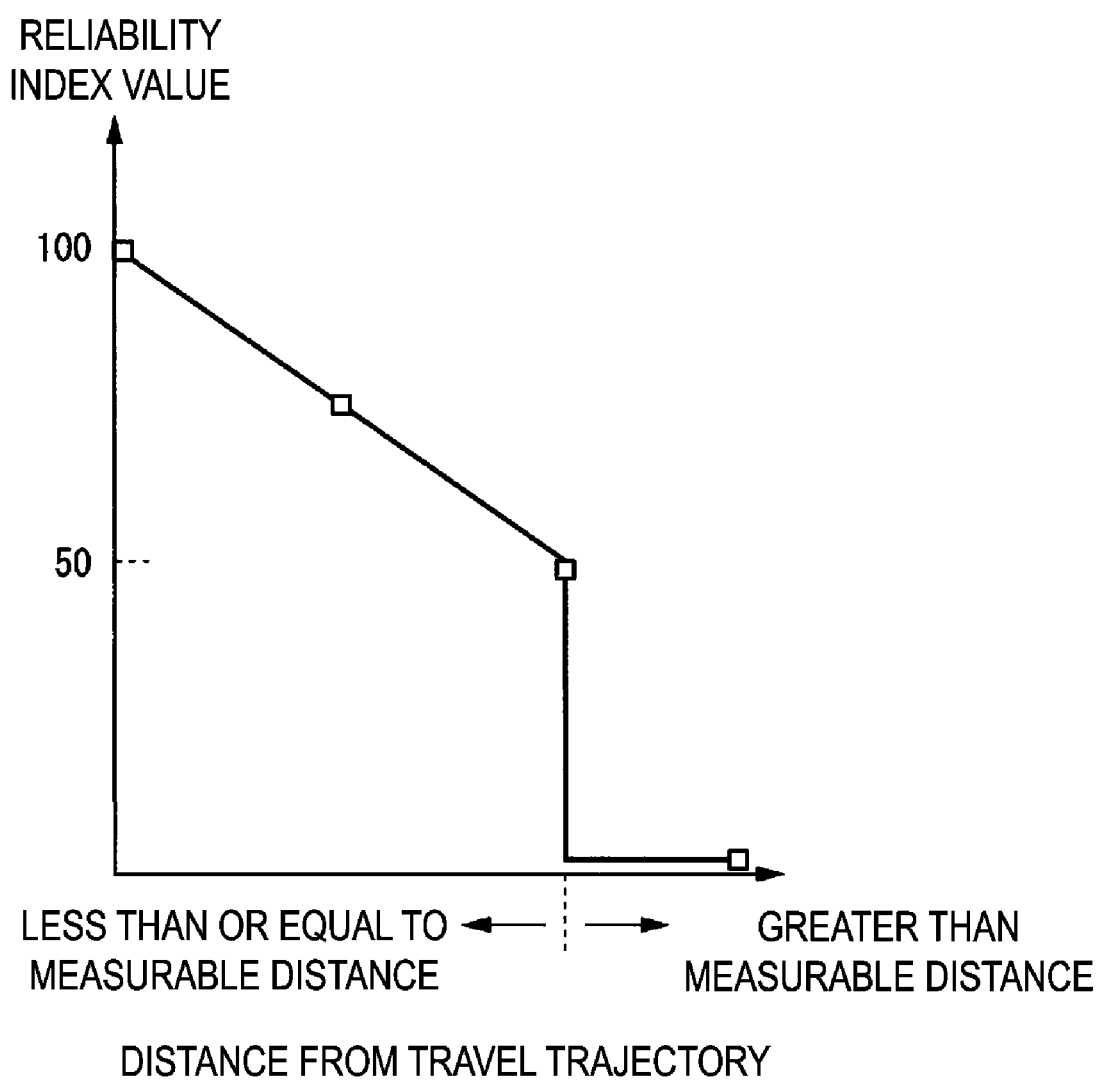
FIG. 20 is a diagram illustrating an example (Part 3) of function definition data according to the third embodiment.

The function illustrated in FIG. 20 is a monotonically decreasing function between the distance from "0" to the measurable distance, and the reliability index value obtained by giving the distance value is a continuous value in accordance with the distance. Thus, unlike the functions illustrated in FIGS. 17 and 19, the reliability coefficient calculated by the reliability coefficient specification unit 22b is a continuous value rather than a discrete value.

Figure 21:
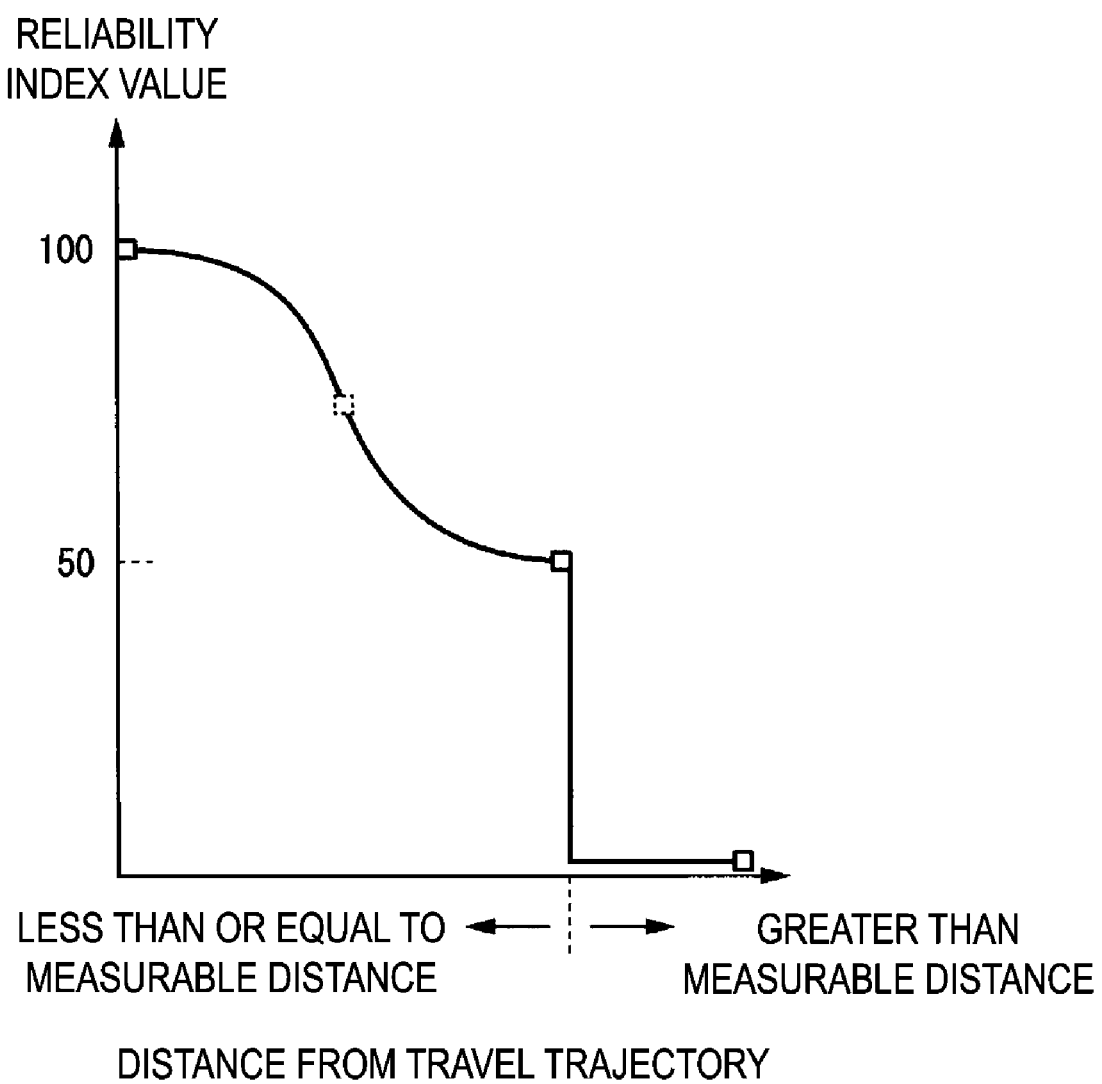
FIG. 21 is a diagram illustrating an example (Part 4) of function definition data according to the third embodiment.

The function illustrated in FIG. 21 is a cumulative distribution function, with a shorter distance resulting in a larger reliability index value compared to the function illustrated in FIG. 20. Thus, a shorter distance results in a larger continuous value of reliability coefficient.

Figure 22:
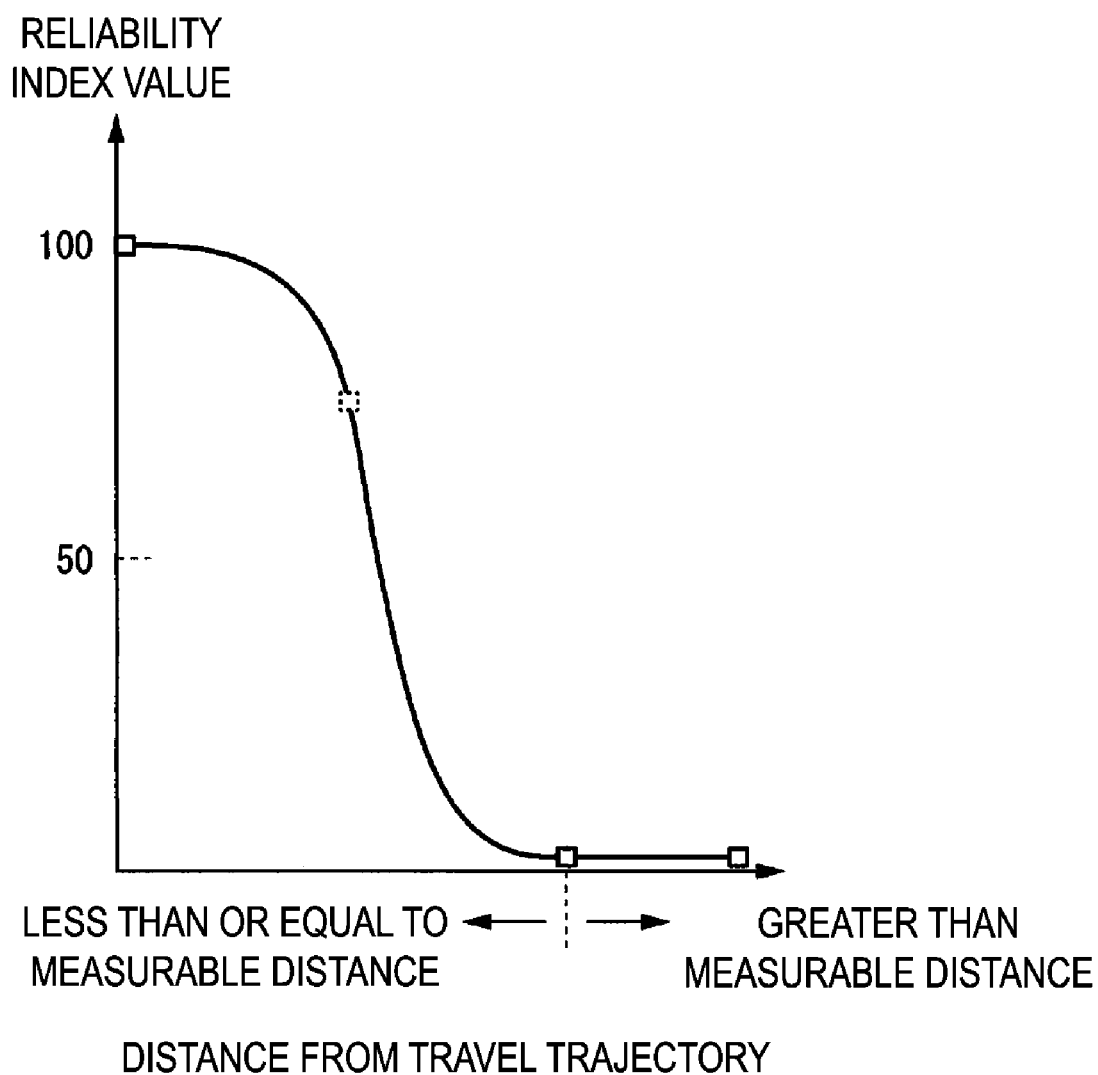
FIG. 22 is a diagram illustrating an example (Part 5) of function definition data according to the third embodiment.

In the functions illustrated in FIGS. 19 to 21, a minimum "50" reliability index value can be obtained with any distance as long as the distance is shorter than the measurable distance. In contrast, the function illustrated in FIG. 22 is a cumulative distribution function similar to the function illustrated in FIG. 21, and is a function where a shorter distance results in a larger reliability index value, and in addition, a reliability index value that changes continuously between "0" and "100" in the range of the distance from "0" to the measurable distance can be obtained.

Note that in the third embodiment described above, in step Sb7, the reliability coefficient specification unit 22b determines whether the reliability coefficient is "0", but may use a value other than "0" as a threshold, or may perform a determination based on a threshold, for example, whether the reliability coefficient is less than or equal to "30".

In the third embodiment described above, the reliability coefficient specification unit 22b applies the same function to the base station candidate position data and the terminal station candidate position data, but may apply different functions to each.

In the third embodiment described above, the reliability coefficient specification unit 22b calculates the average of the first reliability index value and the second reliability index value to determine the reliability coefficient, but may determine the reliability coefficient by an operation other than an average.

For example, the reliability coefficient specification unit 22b may calculate the reliability coefficient by an operation such as Equation (1) below, instead of an equation for calculating an average.

$$\text{Reliability coefficient}=(aX^2+bY^2+cXY)/d \qquad (1)$$

In Equation (1), X is the first reliability index value and Y is the second reliability index value. In Equation (1), a, b, c, and d are constants that are appropriately defined, and, for example, values such as the coefficient pattern 1 (a=b=1, c=0, d=200), the coefficient pattern 2 (a=b=7, c=2, d=1600), and the coefficient pattern 3 (a=7, b=5, c=2, d=1400) are applied.

FIG. 23 is a diagram illustrating relationships between combinations of first reliability index values and second reliability index values and reliability coefficients. The column of "average" of items of the reliability coefficient indicates the reliability coefficient obtained in a case of calculating the average of the first reliability index value and the second reliability index value as the reliability coefficient. The column of "coefficient pattern 1" of the items of the reliability coefficient indicates the reliability coefficient calculated by applying a, b, c, and d in the coefficient pattern 1 to Equation (1). The column of "coefficient pattern 2" of the items of the reliability coefficient indicates the reliability coefficient calculated by applying a, b, c, and d in the coefficient pattern 2 to Equation (1). The column of "coefficient pattern 3" of the items of the reliability coefficient indicates the reliability coefficient calculated by applying a, b, c, and d in the coefficient pattern 3 to Equation (1).

As described above, in a case where the average value of the first reliability index value and the second reliability index value and the reliability coefficient are used, the reliability coefficient can be indicated in five levels. In contrast, in the case of the coefficient pattern 1 and the coefficient pattern 2, the reliability coefficient can be indicated in six levels. By setting a≠b as in the coefficient pattern 3, it is possible to indicate the reliability coefficient at a greater number of levels. By increasing the levels in this manner, the degree of reliability of the prescribed evaluation processing can be indicated in more detail.

In a case of applying a function such as FIGS. 17, 19, and 20, the first reliability index value and the second reliability index value are discrete values. In this case, the reliability coefficient may be determined using a table such as that illustrated in FIGS. 5 and 6 of the second embodiment.

The functions illustrated in FIG. 17, and FIGS. 19 to 22 above have a reliability index value of "0" when the distance is greater than the measurable distance, but may be a function not to have "0" at a distance greater than the measurable distance as long as the function indicates a higher reliability index value as the distance from the travel trajectory 50 is shorter.

In the third embodiment described above, an example is illustrated in which the three-dimensional line-of-sight determination processing by the three-dimensional line-of-sight determination processing unit 23 is applied as a prescribed evaluation processing, but the shield factor calculation processing by the shield factor calculation unit 24 may be applied as a prescribed evaluation processing. In this case, in step Sb8, the shield factor calculation unit 24 performs the shield factor calculation processing based on the point cloud data read from the point cloud data storage unit 13.

In the positional relationship specification unit 21b of the station placement assistance apparatus 1b according to the third embodiment, the base station distance calculation unit 35 calculates the distance from the travel trajectory to the base station candidate position based on the travel trajectory data and the base station candidate position data, and generates the calculated distance as the base station positional relationship specification data. The terminal station distance calculation unit 36 calculates the distance from the travel trajectory to the terminal station candidate position based on the travel trajectory data and the terminal station candidate position data, and generates the calculated distance as the terminal station positional relationship specification data. The reliability coefficient specification unit 22b calculates the first reliability index value for the base station candidate position by applying the first function indicating a higher reliability index value as the distance from the travel trajectory is shorter to the base station positional relationship specification data calculated in the distance calculation step, calculates the second reliability index value for the terminal station candidate position by applying the second function indicating a higher reliability index value as the distance from the travel trajectory is shorter to the terminal station positional relationship specification data calculated in the distance calculation step, and determines the reliability coefficient based on the calculated first reliability index value and the second reliability index value. Here, the first function and the second function may be the same function or may be different functions, and, for example, the functions illustrated in FIG. 17, and FIGS. 19 to 22 are applied.

By applying a function such as that illustrated in FIGS. 17 and 19 for the configuration of the third embodiment described above, it is possible to obtain a discrete reliability coefficient substantially similar to the configuration of the second embodiment. By applying a function such as that illustrated in FIGS. 20 to 22 to the configuration of the third embodiment, the reliability coefficient can be obtained as a continuous value, and thus the degree of reliability of the prescribed evaluation processing can be indicated in more detail than the configuration of the second embodiment. As a result, even in a case where the state of acquisition of the point cloud data of the space between the base station candidate position 60 and the terminal station candidate position 70 is not good, it is possible for the user to perform an appropriate base-station design.

Fourth Embodiment

Figure 24:
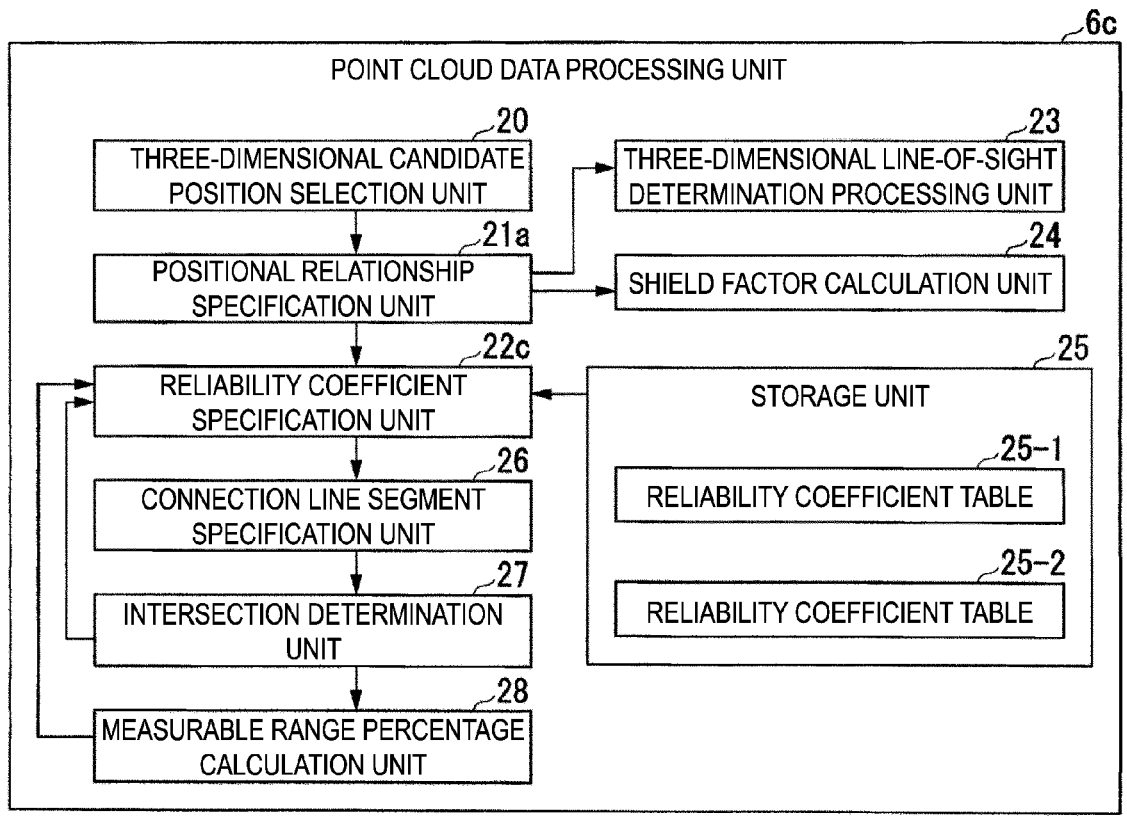
FIG. 24 is a block diagram illustrating a configuration of a point cloud data processing unit of a station placement assistance apparatus according to a fourth embodiment.

FIG. 24 is a block diagram illustrating an internal configuration of a point cloud data processing unit 6c applied to a fourth embodiment. In the fourth embodiment, the same reference signs are assigned to the same components as those in the first to third embodiments. Although not illustrated in the drawings, in the following description, the reference sign "1c" is given to the station placement assistance apparatus according to the fourth embodiment, and it is referred to as a station placement assistance apparatus 1c. The station placement assistance apparatus 1c has a configuration in which the point cloud data processing unit 6 in the station placement assistance apparatus 1 according to the first embodiment is replaced with a point cloud data processing unit 6c illustrated in FIG. 24.

The point cloud data processing unit 6c according to the fourth embodiment is provided with a configuration that improves the accuracy of the reliability coefficient specified in the second embodiment, and the summary of the configuration will be described below.

Figure 25:
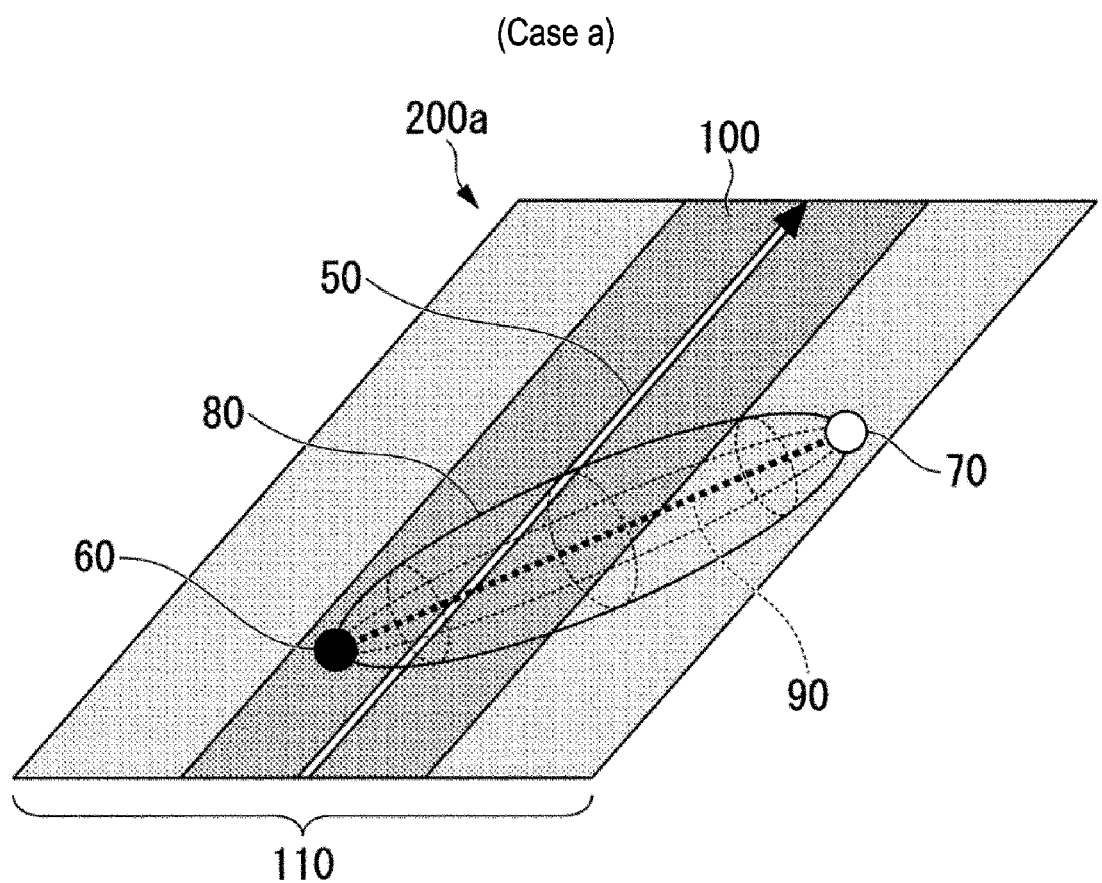
FIG. 25 is a diagram (Part 1) illustrating a positional relationship configuration of "Case a" according to the fourth embodiment.

FIG. 25 is a diagram illustrating an addition of a connection line segment 90 connecting the base station candidate position 60 and the terminal station candidate position 70 to the positional relationship configuration 200a of the "Case a" illustrated in FIG. 8. In the "Case a", as described with reference to FIG. 8, the base station candidate position 60 is located within the range of the proximity range 100. The terminal station candidate position 70 is located outside of the range of the proximity range 100, but is located within the range of the measurable range 110.

Thus, the Fresnel zone 80 formed in the space between the base station candidate position 60 and the terminal station candidate position 70 is present within the range of the measurable range 110. Thus, it is assumed that the point cloud data that is used in the prescribed evaluation processing, that is, the three-dimensional line-of-sight determination processing or the shield factor calculation processing, is generally acquired. The "Case a" is a case corresponding to the positional relationship pattern pt2 in the classification in the reliability coefficient table 25-1 illustrated in FIG. 5.

As illustrated in FIG. 25, the base station candidate position 60 is located on the left side of the travel trajectory 50, and the terminal station candidate position 70 is located on the right side of the travel trajectory. In other words, the base station candidate position 60 and the terminal station candidate position 70 are located on the left side and on the right side of the travel trajectory 50.

Figure 26:
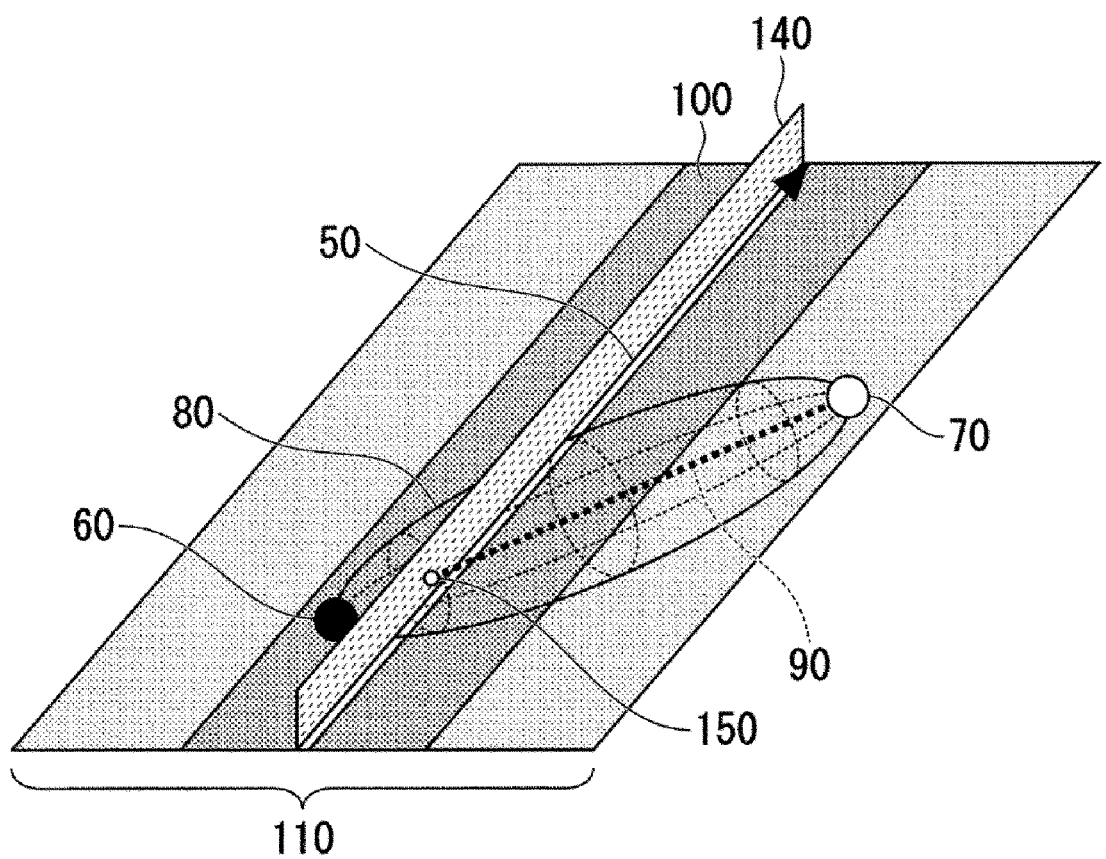
FIG. 26 is a diagram (Part 2) illustrating a positional relationship configuration of "Case a" according to the fourth embodiment.

FIG. 26 is a diagram illustrating the positional relationship of the positional relationship configuration 200a illustrated in FIG. 25 when viewed in the three-dimensional space. In practice, the base station apparatus is installed on a utility pole or the like, and the terminal station apparatus is installed on a wall surface of a building, so that each of the installation altitudes is different. Thus, as illustrated in FIG. 26, the connection line segment 90 connecting the base station candidate position 60 and the terminal station candidate position 70 in practice intersects with the vertical surface 140 of the travel trajectory 50 at the position of the intersection point 150. This positional relationship is referred to below as the connection line segment 90 and the travel trajectory 50 intersect with each other.

The base station candidate position data indicating the base station candidate position 60 and the terminal station candidate position data indicating the terminal station candidate position 70 are three-dimensional data, and thus the connection line segment 90 is three-dimensional data. Thus, by making two-dimensional data in which the coordinate components in the vertical direction of the data of the connection line segment 90 are discarded, it is possible to determine whether the connection line segment 90 and the travel trajectory 50 intersect with each other by an operation on a two-dimensional plane.

In the case of the positional relationship configuration 200a illustrated in FIG. 25, that is, the "Case a", the connection line segment 90 connecting the base station candidate position 60 and the terminal station candidate position 70 intersects with the travel trajectory 50. In this case, the portion included within the range of the proximity range 100 in the connection line segment 90 is close to the travel trajectory 50, and thus high reliability point cloud data can be acquired in the Fresnel zone 80. For this reason, in a case where the connection line segment 90 intersects with the travel trajectory 50, high reliability point cloud data can be acquired, and thus it is conceived that the degree of reliability of the processing result of the prescribed evaluation processing is also increased.

Figure 27:
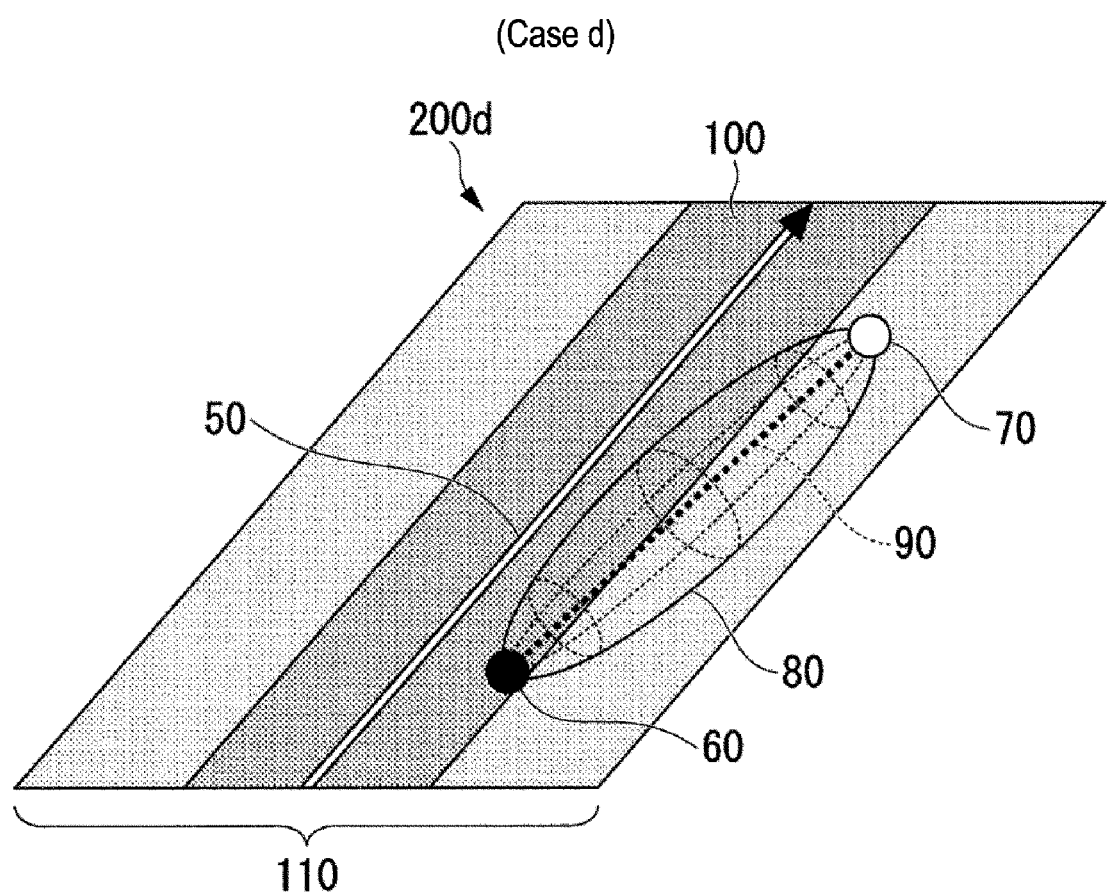
FIG. 27 is a diagram illustrating a positional relationship configuration of "Case d" according to the fourth embodiment.

FIG. 27 is a diagram illustrating an addition of a connection line segment 90 connecting the base station candidate position 60 and the terminal station candidate position 70 to the "Case d" illustrated in the positional relationship configuration 200d illustrated in FIG. 11. In the "Case d", as described with reference to FIG. 11, both the base station candidate position 60 and the terminal station candidate position 70 are located within the range of the measurable range 110, and the base station candidate position 60 is further located within the range of the proximity range 100. However, unlike the "Case a", the "Case d" is a case in which the base station candidate position 60 and the terminal station candidate position 70 are present on either one side of the left side or the right side of the travel trajectory 50. In FIG. 27, the base station candidate position 60 and the terminal station candidate position 70 are located on the right side of the travel trajectory 50. Thus, in the case of the "Case d", the connection line segment 90 does not intersect with the travel trajectory 50.

In the case of the "Case d", the connection line segment 90 is farther than the travel trajectory 50 as compared with the "Case a", and thus the reliability of the point cloud data that can be acquired in the Fresnel zone 80 tends to be lower compared to the "Case a". For this reason, in a case where the connection line segment 90 does not intersect with the travel trajectory 50, the reliability of the point cloud data that can be acquired is low. Thus, in the case of the "Case d", it is considered that the reliability of the point cloud data is lower than in the case of the "Case a", and the degree of reliability of the processing result of the prescribed evaluation processing is also decreased.

Figure 28:
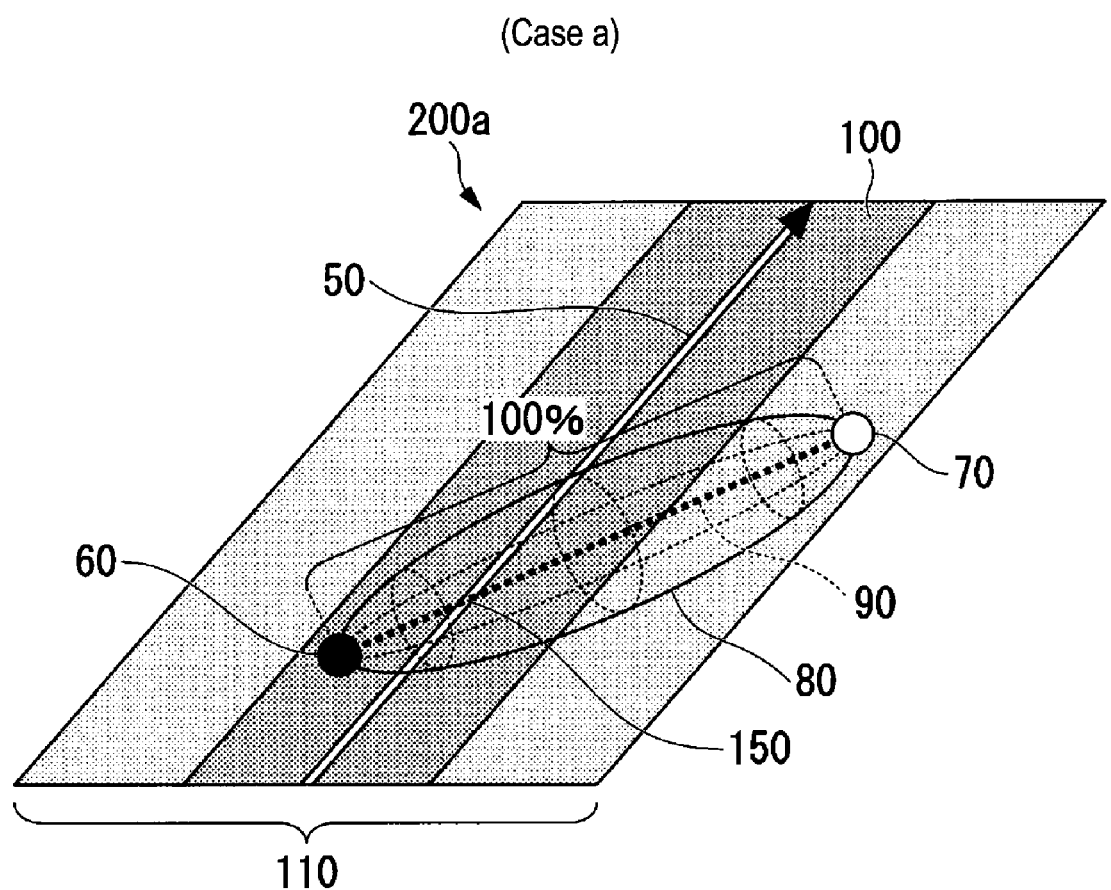
FIG. 28 is a diagram (Part 3) illustrating a positional relationship configuration of "Case a" according to the fourth embodiment.

Next, in a case where the connection line segment 90 intersects with the travel trajectory 50, the relationship between the percentage of the connection line segment 90 included within the range of the measurable range 110 and the reliability of the point cloud data will be described by comparing the "Case a" of the positional relationship configuration 200a illustrated in FIG. 28 with the "Case b" of the positional relationship configuration 200b illustrated in FIG. 29. As illustrated in FIG. 28, in the case of the "Case a", the connection line segment 90 connecting the base station candidate position 60 and the terminal station candidate position 70 is all located within the range of the measurable range 110, that is, with the percentage of 100%.

In contrast, in the case of the "Case b" of the positional relationship configuration 200b illustrated in FIG. 29, as described with reference to FIG. 9, the base station candidate position 60 is located within the range of the proximity range 100, but the terminal station candidate position 70 is located outside of the range of the measurable range 110. In the case of the "Case b", the base station candidate position 60 is located on the left side of the travel trajectory 50, and the terminal station candidate position 70 is located on the right side of the travel trajectory 50, and thus the connection line segment 90 intersects with the travel trajectory 50. However, in the case of the "Case b", a portion of the connection line segment 90 is located outside of the range of the measurable range 110. Thus, in the case of the "Case b", although the connection line segment 90 intersects with the travel trajectory 50, the idea that the reliability of the point cloud data obtained in the case of the "Case a" and the reliability of the point cloud data obtained in the case of the "Case b" are equivalent is not reasonable.

Figure 29:
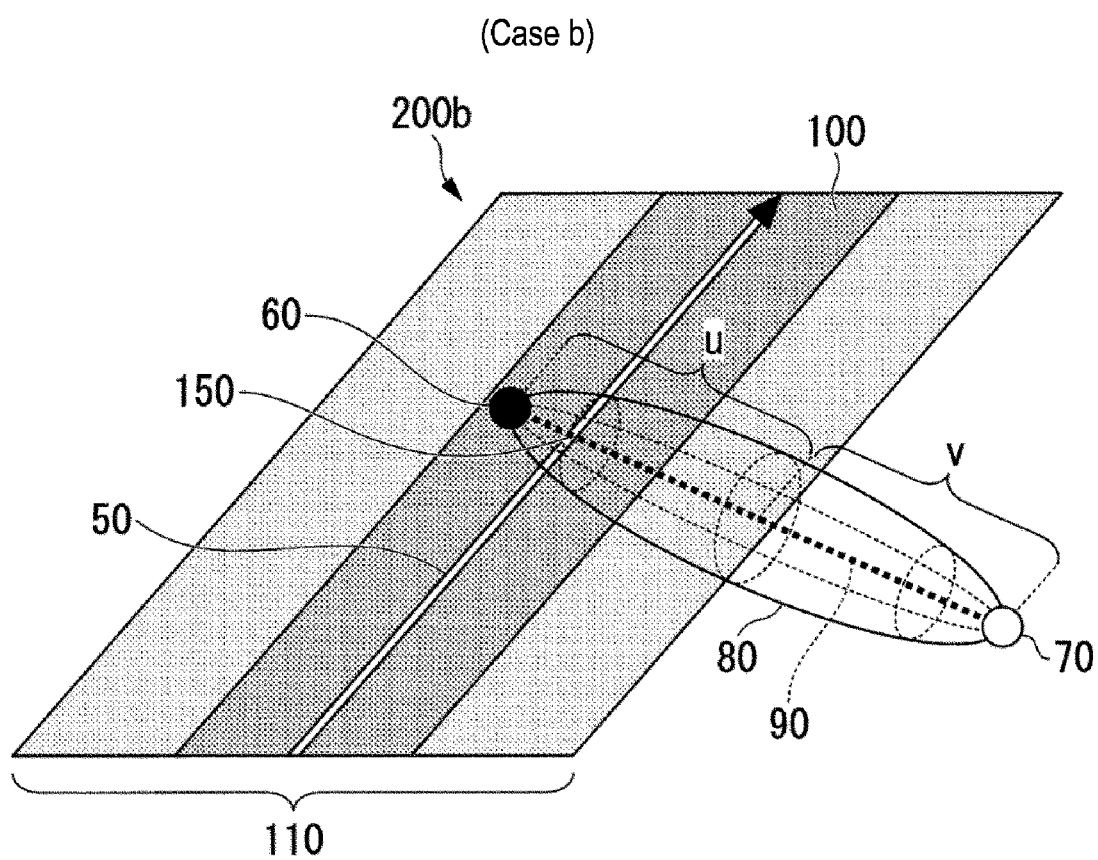
FIG. 29 is a diagram illustrating a positional relationship configuration of "Case b" according to the fourth embodiment.

Here, as illustrated in FIG. 29, in the line segment on a two-dimensional plane in which the coordinate components in the vertical direction of the connection line segment 90 are discarded, the length present within the range of the measurable range 110 is defined as "u", and the length present outside of the range of the measurable range 110 is defined as "v". In this case, the percentage X [%] present in the range of the measurable range 110 can be expressed by Equation (2) below.

$$X = u/(u+v) \times 100 [\%] \quad (2)$$

In the case of the "Case b", for the portion of "u", the reliability of the point cloud data that can be acquired is considered to have the same reliability as the reliability of the point cloud data that can be acquired in the case of the "Case a" because it is present within the range of the measurable range 110.

In contrast, for the portion of "v", the point cloud data cannot be acquired because it is present outside of the range of the measurable range 110. Thus, in the case of the "Case b", the reliability of the point cloud data is lower than in the case of the "Case a" in a case where the entire point cloud data is viewed. In this case, it is reasonable to consider that the percentage at which the degree of reliability of the processing result of the prescribed evaluation processing, or the reliability coefficient, decreases decreases by the percentage at which the connection line segment 90 is present in the measurable range 110, that is, by X [%].

Here, returning to FIG. 24, the configuration of the point cloud data processing unit 6c according to the fourth embodiment will be described. The point cloud data processing unit 6c includes a three-dimensional candidate position selection unit 20, a positional relationship specification unit 21a, a reliability coefficient specification unit 22c, a storage unit 25, a connection line segment specification unit 26, an intersection determination unit 27, a measurable range percentage calculation unit 28, a three-dimensional line-of-sight determination processing unit 23, and a shield factor calculation unit 24.

The connection line segment specification unit 26 generates the connection line segment data indicating the connection line segment 90 connecting the base station candidate position 60 and the terminal station candidate position 70, based on the base station candidate position data indicating the base station candidate position 60 and the terminal station candidate position data indicating the terminal station candidate position 70, for which the reliability coefficient specification unit 22c has specified the reliability coefficient.

The intersection determination unit 27 determines whether the connection line segment 90 and the travel trajectory 50 intersect with each other, based on the connection line segment data generated by the connection line segment specification unit 26 and the travel trajectory data stored in the travel trajectory data storage unit 14. In a case where the intersection determination unit 27 determines that the connection line segment 90 and the travel trajectory 50 intersect with each other, the measurable range percentage calculation unit 28 calculates the percentage of the connection line segment 90 that is present within the range of the measurable range 110.

The reliability coefficient specification unit 22c is provided with the following configuration in addition to the configuration provided by the reliability coefficient specification unit 22a according to the second embodiment. The reliability coefficient specification unit 22c performs weighting on the specified reliability coefficient based on the determination result of the intersection determination unit 27, and calculates a new reliability coefficient.

In a case where the measurable range percentage calculation unit 28 calculates the percentage of the connection line segment 90 that is present within the range of the measurable range 110, the reliability coefficient specification unit 22c performs weighting on the specified reliability coefficient based on the determination result of the intersection determination unit 27 and the calculated percentage of the connection line segment 90 that is present within the range of the measurable range 110, and calculates a new reliability coefficient.

Process According to Fourth Embodiment

Figure 30:
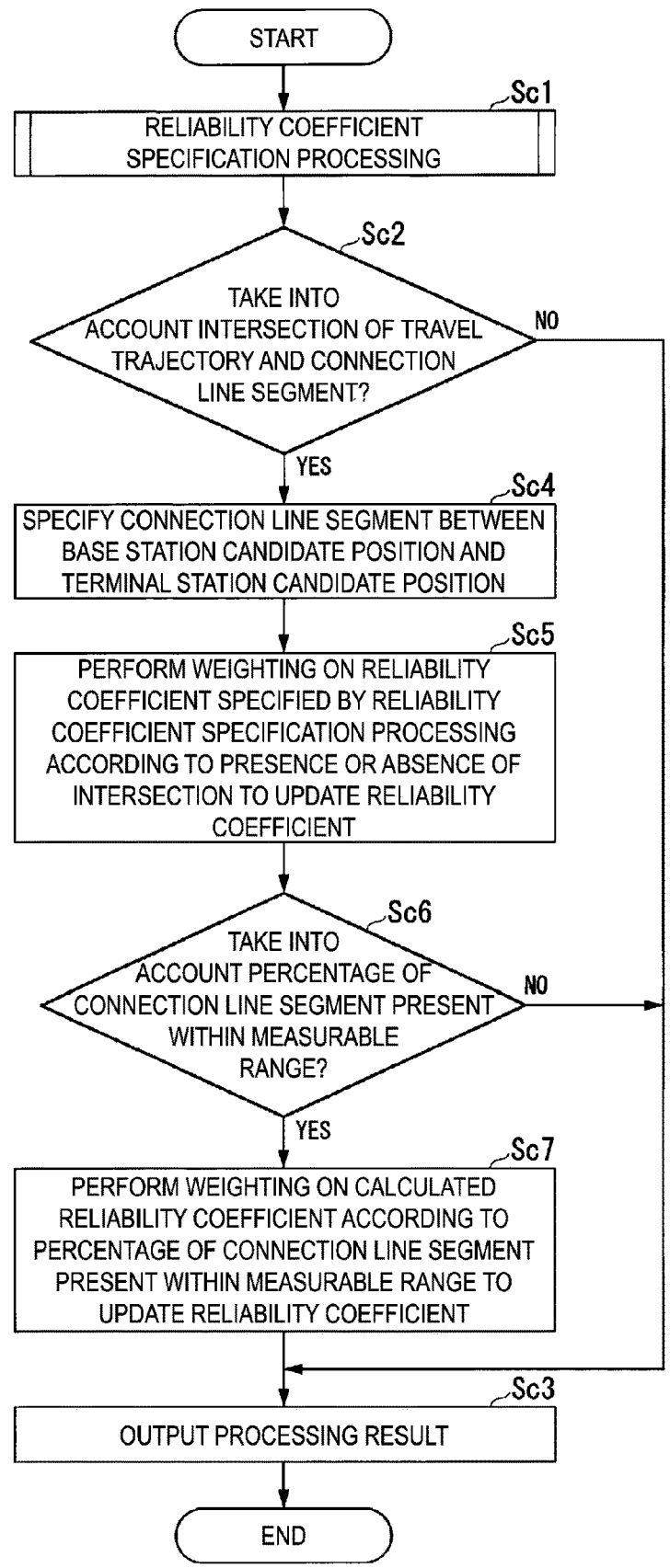
FIG. 30 is a flowchart illustrating a process flow of the point cloud data processing unit in the station placement assistance apparatus according to the fourth embodiment.

FIG. 30 is a flowchart illustrating a process flow of the point cloud data processing unit 6c according to the fourth embodiment. The process is a process corresponding to (5) the processing of the communication availability determination using the three-dimensional point cloud data of the station placement assistance method illustrated in FIG. 2. The flowchart illustrated in FIG. 30 illustrates an example in which the three-dimensional line-of-sight determination processing by the three-dimensional line-of-sight determination processing unit 23 is applied as the prescribed evaluation processing performed by the point cloud data processing unit 6c.

Prior to performing the process described below, the user of the station placement assistance apparatus 1c selects in advance whether the intersection determination processing is performed between the travel trajectory 50 and the connection line segment 90 by the intersection determination unit 27. In a case where the user selects to perform the processing, the operation processing unit 10 outputs an instruction signal indicating "take into account the intersection of the travel trajectory and the connection line segment" in response to the user operation.

Prior to performing the process described below, the user of the station placement assistance apparatus 1c selects in advance whether the measurable range percentage calculation unit 28 performs processing to calculate the percentage of the connection line segment 90 that is present within the range of the measurable range 110. In a case where the user selects to perform the processing, the operation processing unit 10 outputs an instruction signal indicating "take into account the percentage of the connection line segment that is present within the range of the measurable range" in response to the user operation.

Prior to performing the process described below, the user of the station placement assistance apparatus 1c selects in advance whether to perform the processing to take into account the proximity range 100, that is, the processing to determine whether the base station candidate position 60 and the terminal station candidate position 70 are located within the range of the proximity range 100 or are located outside of the range of the proximity range 100. In a case where the user selects to perform the processing, the operation processing unit 10 outputs an instruction signal indicating "take into account the proximity range" in response to the user operation.

At the beginning of the process of FIG. 30, the positional relationship specification unit 21a and the reliability coefficient specification unit 22c perform the processing of the subroutine of the reliability coefficient specification processing (step Sc1). The processing of the subroutine of the reliability coefficient specification processing is the same processing as in the processing of step Sa1 to step Sa11 in the process of the second embodiment illustrated in FIG. 15, and the Return statement exiting the subroutine is performed after the processing of step Sa11.

In the subroutine of the reliability coefficient specification processing, similar to the second embodiment, the three-dimensional candidate position selection unit 20 performs the processing of step Sa1, the positional relationship specification unit 21a performs the processing from step Sa2 to step Sa10, and the reliability coefficient specification unit 22c performs the processing of step Sa11.

The reliability coefficient specification unit 22c determines whether the operation processing unit 10 outputs an instruction signal indicating "take into account the intersection of the travel trajectory and the connection line segment" (step Sc2). In a case where the reliability coefficient specification unit 22c determines that the operation processing unit 10 does not output an instruction signal indicating "take into account the intersection of the travel trajectory and the connection line segment" (step Sc2, No), the reliability coefficient specification unit 22c performs the processing of step Sc3.

On the other hand, in a case where the reliability coefficient specification unit 22c determines that the operation processing unit 10 outputs an instruction signal indicating "take into account the intersection of the travel trajectory and the connection line segment" (step Sc2, Yes), the reliability coefficient specification unit 22c outputs the base station candidate position data and terminal station candidate position data stored in the determination result storage unit 34 included in the positional relationship specification unit 21a (FIG. 4), to the connection line segment specification unit 26. After outputting to the connection line segment specification unit 26, the reliability coefficient specification unit 22c waits for the output instruction signal from the intersection determination unit 27 or the measurable range percentage calculation unit 28.

The connection line segment specification unit 26 fetches the base station candidate position data and the terminal station candidate position data output by the reliability coefficient specification unit 22c. The connection line segment specification unit 26 generates the connection line segment data indicating the connection line segment 90 connecting the base station candidate position 60 and the terminal station candidate position 70, based on the fetched base station candidate position data and the terminal station candidate position data (step Sc4). The connection line segment specification unit 26 outputs the generated connection line segment data to the intersection determination unit 27.

The intersection determination unit 27 fetches the connection line segment data output by the connection line segment specification unit 26. The intersection determination unit 27 reads out the travel trajectory data from the travel trajectory data storage unit 14, determines whether the travel trajectory 50 and the connection line segment 90 intersect with each other based on the read travel trajectory data and the fetched connection line segment data, and outputs the determination result to the reliability coefficient specification unit 22c. The reliability coefficient specification unit 22c performs weighting on the already specified reliability coefficient and the mark corresponding to the reliability coefficient based on the determination result of the intersection determination unit 27, calculates a new reliability coefficient, and generates a new mark (step Sc5).

In a case where the intersection determination unit 27 determines that the travel trajectory 50 and the connection line segment 90 intersect with each other, the intersection determination unit 27 determines whether the operation processing unit 10 outputs an instruction signal indicating "take into account the percentage of the connection line segment that is present within the range of the measurable range" (step Sc6). In a case where the intersection determination unit 27 determines that the operation processing unit 10 does not output an instruction signal indicating "take into account the percentage of the connection line segment that is present within the range of the measurable range" (step Sc6, No), the intersection determination unit 27 outputs the output instruction signal to the reliability coefficient specification unit 22c. Upon receiving the output instruction signal, the standby reliability coefficient specification unit 22c performs the processing of step Sc3.

On the other hand, in a case where the intersection determination unit 27 determines that the operation processing unit 10 outputs an instruction signal indicating "take into account the percentage of the connection line segment that is present within the range of the measurable range" (step Sc6, Yes), the intersection determination unit 27 outputs the connection line segment data to the measurable range percentage calculation unit 28.

The measurable range percentage calculation unit 28 fetches the connection line segment data output by the intersection determination unit 27. The measurable range percentage calculation unit 28 reads out the travel trajectory data from the travel trajectory data storage unit 14, and calculates the length "u" within the range of the measurable range 110 in the connection line segment 90, and the length "v" outside of the range of the measurable range 110 in the connection line segment 90, based on the read travel trajectory data, the connection line segment data, and the predetermined measurable distance. The measurable range percentage calculation unit 28 calculates the percentage X [%] at which the connection line segment 90 is present within the range of the measurable range 110 according to Equation (2). The measurable range percentage calculation unit 28 outputs the data of the calculated value of X [%] and the output instruction signal to the reliability coefficient specification unit 22c.

Upon receiving the data of the value of X [%] and the output instruction signal from the measurable range percentage calculation unit 28, the standby reliability coefficient specification unit 22c fetches the data of the value of X [%]. The reliability coefficient specification unit 22c performs weighting on the newly calculated reliability coefficient and the newly generated mark based on the determination result of the intersection determination unit 27 in step Sc5, based on the fetched value of X [%], further calculates a new reliability coefficient, generates a new mark (step Sc7), and performs the processing of step Sc3.

The reliability coefficient specification unit 22c displays the base station candidate position data and the terminal station candidate position data stored in the determination result storage unit 34 included in the positional relationship specification unit 21a (FIG. 4), and the final obtained reliability coefficient and the mark corresponding to the reliability coefficient on the screen, and the three-dimensional line-of-sight determination processing unit 23 displays the processing result of the three-dimensional line-of-sight determination processing on the screen. In contrast, in a case where the three-dimensional line-of-sight determination processing unit 23 does not output the processing result because the processing of step Sa6 in the subroutine of the reliability coefficient specification processing of step Sc1 is not performed, the reliability coefficient specification unit 22c displays the base station candidate position data and the terminal station candidate position data, and the final obtained reliability coefficient and the mark corresponding to the reliability coefficient on the screen, and displays that the three-dimensional line-of-sight determination processing is "unprocessable" (step Sc3).

Here, the final obtained reliability coefficient and the mark corresponding to the reliability coefficient displayed on the screen are any of the following three display patterns.

First Display Pattern

In a case where the user does not select "take into account the intersection of the travel trajectory and the connection line segment", that is, in a case where the determination of "No" is made in the processing of step Sc2, the reliability coefficient and the mark specified by the reliability coefficient specification unit 22c in step Sa11 of the subroutine of the reliability coefficient specification processing of step Sc1 are displayed on the screen. In this case, the same processing as in the second embodiment is performed, so the same reliability coefficient and the mark as in the second embodiment are displayed on the screen.

Second Display Pattern

In a case where the user selects "take into account the intersection of the travel trajectory and the connection line segment" ("Yes" in step Sc2) but does not select "take into account the percentage at which the connection line segment is present within the range of the measurable range", that is, in a case where the determination of "No" is made in the processing of step Sc6, the reliability coefficient and the mark weighted by the reliability coefficient specification unit 22c in step Sc5 based on the determination result of the intersection determination unit 27 are displayed on the screen.

For example, in the case of the "Case a" of the positional relationship configuration 200a illustrated in FIG. 25 and the "Case d" of the positional relationship configuration 200d illustrated in FIG. 27, the base station candidate position 60 and the terminal station candidate position 70 are located within the range of the measurable range 110, and the base station candidate position 60 is further located within the range of the proximity range 100. At this time, suppose that the processing in the case of taking into account the proximity range 100 is performed, and the reliability coefficient specification unit 22c refers to the reliability coefficient table 25-1 illustrated in FIG. 5. The "Case a" and the "Case d" correspond to the positional relationship pattern pt2 indicated in the reliability coefficient table 25-1.

Thus, in the processing of step Sa11 of the subroutine of the reliability coefficient specification processing of step Sc1, the reliability coefficient specification unit 22c reads out "80" as the reliability coefficient and reads out "Great" as the corresponding mark. For the "Case a", the intersection determination unit 27 determines that the travel trajectory 50 and the connection line segment 90 intersect with each other, so that the reliability coefficient specification unit 22c maintains the value of the reliability coefficient as "80", generates the mark as "Great$^+$" in step Sc5, for example, and displays "Great$^+$: 80" on the screen.

In contrast, for the "Case d", the intersection determination unit 27 determines that the travel trajectory 50 and the connection line segment 90 do not intersect with each other, so that the reliability coefficient specification unit 22c decreases the value of the reliability coefficient to "70", generates the mark as "Great$^-$" in step Sc5, for example, and displays "Great$^-$: 70" on the screen.

Third Display Pattern

In a case where the user selects "take into account the intersection of the travel trajectory and the connection line segment" and further selects "take into account the percentage at which the connection line segment is present within the range of the measurable range", that is, in a case where the determination of "Yes" is made in the processing of step Sc6, the reliability coefficient and the mark weighted by the reliability coefficient specification unit 22c in step of Sc7 based on the determination result of the intersection determination unit 27 and the percentage X [%] at which the connection line segment 90 is present within the range of the measurable range 110 calculated by the measurable range percentage calculation unit 28 are displayed on the screen.

For example, in the case of the "Case a" of the positional relationship configuration 200a illustrated in FIG. 28, the base station candidate position 60 and the terminal station candidate position 70 are located within the range of the measurable range 110, and the base station candidate position 60 is further located within the range of the proximity range 100. At this time, suppose that the processing in the case of taking into account the proximity range 100 is performed, and the reliability coefficient specification unit 22c refers to the reliability coefficient table 25-1 illustrated in FIG. 5.

The "Case a" corresponds to the positional relationship pattern pt2 indicated in the reliability coefficient table 25-1. Thus, in the case of the "Case a", in the processing of step Sa11 of the subroutine of the reliability coefficient specification processing of step Sc1, the reliability coefficient specification unit 22c reads out "80" as the reliability coefficient and reads out "Great" as the corresponding mark.

For the "Case a", the intersection determination unit 27 determines that the travel trajectory 50 and the connection line segment 90 intersect with each other, so that the reliability coefficient specification unit 22c maintains the value of the reliability coefficient as "80" and generates the mark as "Great$^+$" in step Sc5, for example. In step Sc7, the measurable range percentage calculation unit 28 calculates X=100[%], and thus the reliability coefficient specification unit 22c maintains "80" calculated and "Great$^+$" generated in step Sc5 and displays "Great$^+$: 80" on the screen.

In contrast, in the case of the "Case b" of the positional relationship configuration 200b illustrated in FIG. 29, the base station candidate position 60 is located within the range of the proximity range 100, but the terminal station candidate position 70 is located outside of the range of the measurable range 110. Thus, the "Case b" corresponds to the positional relationship pattern pt3 indicated in the reliability coefficient table 25-1.

Thus, in the case of the "Case b", in the processing of step Sa11 of the subroutine of the reliability coefficient specification processing of step Sc1, the reliability coefficient specification unit 22c reads out "50" as the reliability coefficient and reads out "Fair" as the corresponding mark. For the "Case b", the intersection determination unit 27 determines that the travel trajectory 50 and the connection line segment 90 intersect with each other, so that the reliability coefficient specification unit 22c maintains the value of the reliability coefficient as "50" and generates the mark as "Fair$^+$" in step Sc5, for example. In step Sc7, in a case where the measurable range percentage calculation unit 28 calculates, for example, X=70[%], the reliability coefficient specification unit 22c calculates "35" of 70[%] of "50" calculated in step Sc5 as a new reliability coefficient, generates "Fair$^-$" indicating the degree of reliability that is smaller than the mark "Fair" corresponding to the reliability coefficient "50" as a new mark, and displays "Fair$^-$: 35" on the screen.

Note that in a case where the user does not select "take into account the proximity range", the reliability coefficient specification unit 22c refers to the reliability coefficient table 25-2 illustrated in FIG. 6. In this case, the reliability coefficient specification unit 22c performs the above-described weighting based on the four types of reliability coefficients and the marks stored in the reliability coefficient table 25-2, calculates a new reliability coefficient, and generates a new mark.

In the station placement assistance apparatus 1c according to the fourth embodiment described above, the connection line segment specification unit 26 generates the connection line segment data indicating the connection line segment connecting the base station candidate position and the terminal station candidate position, based on the base station candidate position data and the terminal station candidate position data. The intersection determination unit 27 determines whether the travel trajectory intersects with the connection line segment based on the travel trajectory data and the connection line segment data. The reliability coefficient specification unit 22c performs weighting on the specified reliability coefficient based on the determination result determined by the intersection determination unit 27. Furthermore, in the case where the measurable range percentage calculation unit 28 is provided, the measurable range percentage calculation unit 28 calculates the percentage of the connection line segment that is present within the range of the measurable range in the case where the intersection determination unit 27 determines that the travel trajectory and the connection line segment intersect with each other.

The reliability coefficient specification unit 22c performs weighting on the specified reliability coefficient based on the determination result determined by the intersection determination unit 27 and the percentage of the connection line segment that is present within the range of the measurable range calculated by the measurable range percentage calculation unit 28.

As a result, in the fourth embodiment described above, the reliability coefficient obtained from the configuration of the second embodiment and the mark corresponding to the reliability coefficient are changed in accordance with whether the travel trajectory 50 and the connection line segment 90 intersect with each other, and in the case where the travel trajectory 50 and the connection line segment 90 intersect with each other, the reliability coefficient and the mark corresponding to the reliability coefficient are further changed in accordance with the percentage of the connection line segment 90 included in the measurable range 110. Thus, it is possible to indicate the degree of reliability of the processing result of the prescribed evaluation processing in more detail than in the configuration of the second embodiment. The user can optionally select to take into account whether the travel trajectory 50 and the connection line segment 90 intersect with each other, and in the case where the travel trajectory 50 and the connection line segment 90 intersect with each other, further select to take into account the percentage of the connection line segment 90 included in the measurable range 110, and thus the user can select the accuracy of three levels in accordance with the condition and confirms the reliability coefficient and the mark corresponding to the reliability coefficient.

By using the station placement assistance apparatus 1c of the fourth embodiment, the user is able to confirm a reliability coefficient and a mark corresponding to the reliability coefficient that is more accurate than the second embodiment. Thus, the user can more closely decide such as whether the base station candidate position 60 and the terminal station candidate position 70 output by the station placement assistance apparatus 1c are used as is, whether to re-examine in another condition, or whether to add a new area to examine station placement, collect point cloud data, and specify the reliability coefficient for examination. Thus, even in a case where the state of acquisition of the point cloud data of the space between the base station candidate position 60 and the terminal station candidate position 70 is not good, it is possible for the user to perform an appropriate base-station design.

Note that in the fourth embodiment described above, an example is illustrated in which the three-dimensional line-of-sight determination processing by the three-dimensional line-of-sight determination processing unit 23 is applied as a prescribed evaluation processing, but the shield factor calculation processing by the shield factor calculation unit 24 may be applied as a prescribed evaluation processing. In this case, in step Sa6 of the subroutine of the reliability coefficient specification processing of step Sc1, the shield factor calculation unit 24 performs the shield factor calculation processing based on the point cloud data read from the point cloud data storage unit 13.

In the fourth embodiment described above, the positional relationship specification unit 21a of the second embodiment, the reliability coefficient specification unit 22c having the configuration of the reliability coefficient specification unit 22a of the second embodiment, and the storage unit 25 are provided. However, instead of these, the positional relationship specification unit 21b, the reliability coefficient specification unit 22b, and the storage unit 25b of the third embodiment may be provided. In this case, in the subroutine of the reliability coefficient specification processing of step Sc1 in FIG. 30, steps Sb1 to Sb8 of the flowchart illustrated in FIG. 18 are applied, and the reliability coefficient specification unit 22b performs processing for weighting and updating the reliability coefficient in steps Sc5 and Sc7, and the mark corresponding to the reliability coefficient.

In the fourth embodiment described above, the measurable range percentage calculation unit 28 calculates the percentage of the connection line segment 90 included within the range of the measurable range 110, and the reliability coefficient specification unit 22c changes the reliability coefficient and the mark based on the percentage, but the reliability coefficient specification unit 22c may further change the reliability coefficient and the mark taking into account the percentage of the connection line segment 90 included within the range of the proximity range 100.

Fifth Embodiment

Figure 31:
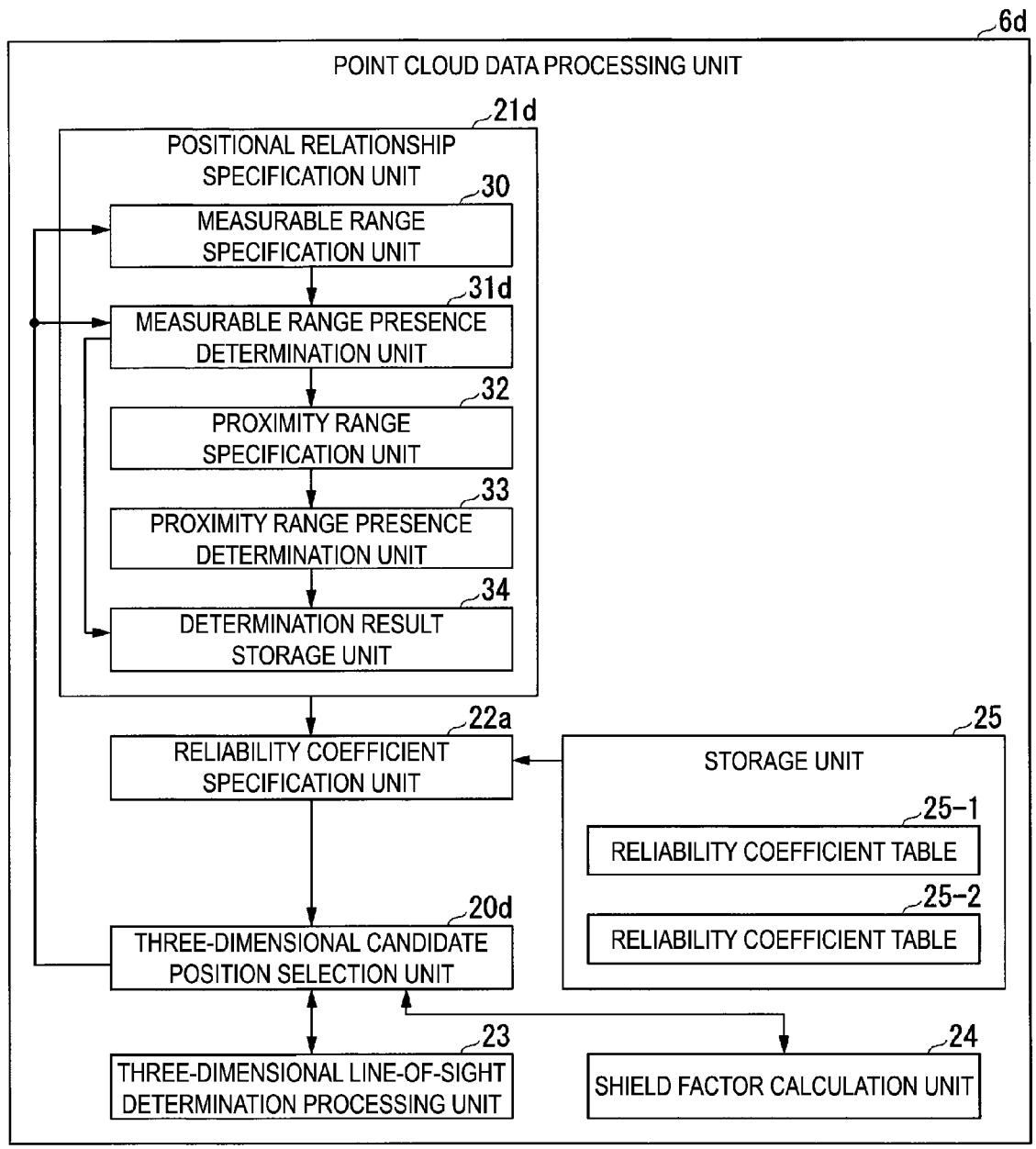
FIG. 31 is a block diagram illustrating a configuration of a point cloud data processing unit of a station placement assistance apparatus according to a fifth embodiment.

FIG. 31 is a block diagram illustrating an internal configuration of a point cloud data processing unit 6d applied to a fifth embodiment. In the fifth embodiment, the same reference signs are assigned to the same components as those in the first to fourth embodiments. Although not illustrated in the drawings, in the following description, the reference sign "1d" is given to the station placement assistance apparatus according to the fifth embodiment, and it is referred to as a station placement assistance apparatus 1d. The station placement assistance apparatus 1d has a configuration in which the point cloud data processing unit 6 in the station placement assistance apparatus 1 according to the first embodiment is replaced with a point cloud data processing unit 6d illustrated in FIG. 31.

The point cloud data processing unit 6d includes a three-dimensional candidate position selection unit 20d, a positional relationship specification unit 21d, a reliability coefficient specification unit 22a, a storage unit 25, a three-dimensional line-of-sight determination processing unit 23, and a shield factor calculation unit 24.

Similar to the three-dimensional candidate position selection unit 20 according to the first embodiment, the three-dimensional candidate position selection unit 20d selects base station candidate position data indicating any one of the base station candidate positions 60. The three-dimensional candidate position selection unit 20d selects data indicating each of the positions of the plurality of the terminal station candidate positions 70 selected by the user, which are positions on a wall surface with good line-of-sight of any one of the buildings selected by the user among the buildings with good line-of-sight in two dimensions from the base station candidate position 60 indicated by the selected base station candidate position data, as the plurality of terminal station candidate position data.

For example, the user of the station placement assistance apparatus 1d operates the operation processing unit 10 to select any one of building identification data from among the building identification data associated with the two-dimensional base station candidate position data corresponding to the base station candidate position data selected by the three-dimensional candidate position selection unit 20d from the two-dimensional line-of-sight determination result storage unit 15. The three-dimensional candidate position selection unit 20d reads out the point cloud data in the range indicated by the data indicating the line-of-sight range of the building corresponding to the building identification data selected by the user from the point cloud data storage unit 13, and displays the read point cloud data on the screen. As a result, the point cloud data of a portion of the wall surface that has good line-of-sight in two dimensions of one building selected by the user is displayed on the screen. The user operates the operation processing unit 10 to select a plurality of three-dimensional positions which are candidates for installing a plurality of terminal stations, from among the point cloud data displayed on the screen, and outputs the selected three-dimensional positions to the three-dimensional candidate position selection unit 20d. The three-dimensional candidate position selection unit 20d fetches the plurality of three-dimensional positions output by the operation processing unit 10, and sets each of the plurality of three-dimensional positions fetched as terminal station candidate position data.

The three-dimensional candidate position selection unit 20d selects, from among the plurality of terminal station candidate position data selected, any one of terminal station candidate position data indicating the optimal terminal station candidate position 70 based on the reliability coefficient specified by the reliability coefficient specification unit 22a.

The positional relationship specification unit 21d includes a measurable range specification unit 30, a measurable range presence determination unit 31d, a proximity range specification unit 32, a proximity range presence determination unit 33, and a determination result storage unit 34. The measurable range presence determination unit 31d has the same configuration as the measurable range presence determination unit 31 according to the second embodiment, except that the measurable range presence determination unit 31d is not provided with the configuration of the processing of steps Sa5, Sa6, and Sa7 illustrated in FIG. 15 for determining whether to cause the three-dimensional line-of-sight determination processing unit 23 to perform the processing among the processing performed by the measurable range presence determination unit 31 according to the second embodiment.

Figure 32:
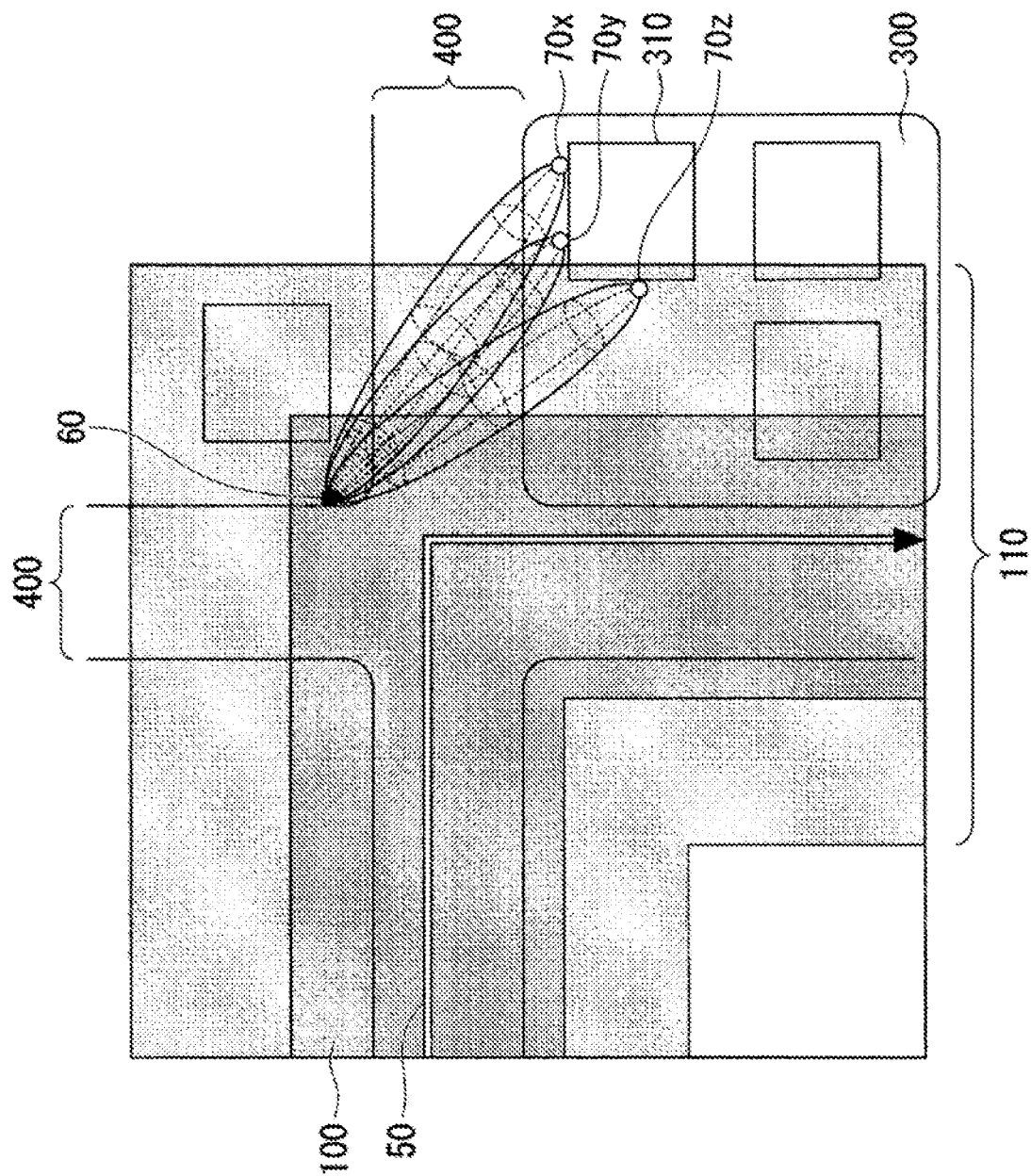
FIG. 32 is a diagram illustrating a positional relationship configuration between the travel trajectory, the base station candidate position, and the terminal station candidate position according to the fifth embodiment.

For example, FIG. 32, similar to FIG. 11, is a diagram illustrating a map of an urban area, and buildings 310 indicated in rectangular shapes are constructed on a site 300 divided in a grid by a region of a road 400. Three terminal station candidate positions 70x, 70y, and 70z are set for a building 310. The three-dimensional candidate position selection unit 20d specifies the optimal position at which the terminal station apparatus is installed from among the three terminal station candidate positions 70x, 70y, and 70z based on the reliability coefficient specified by the reliability coefficient specification unit 22a.

In FIG. 32, the terminal station candidate positions 70x and 70y are located outside of the range of the measurable range 110. In contrast, the terminal station candidate position 70z is located within the range of the measurable range 110. The base station candidate position 60 is located within the range of the proximity range 100.

As illustrated in FIG. 32, the terminal station candidate positions 70x, 70y, and 70z all have good line-of-sight from the base station candidate position 60, so that the processing result of the three-dimensional line-of-sight determination processing performed by the three-dimensional line-of-sight determination processing unit 23 is "good line-of-sight", and the processing result of the shield factor calculation processing by the shield factor calculation unit 24 indicates a "low shield factor" sufficient for wireless communication. Thus, it is not possible to determine which of the terminal station candidate positions 70x, 70y, and 70z is the optimal installation position, based on the processing result of the three-dimensional line-of-sight determination processing unit 23 and the shield factor calculation unit 24. In contrast, taking into account the reliability coefficient, the terminal station candidate positions 70x and 70y are located outside of the range of the measurable range 110, and the terminal station candidate position 70z is located within the range of the measurable range 110. Thus, the reliability coefficient of the terminal station candidate positions 70x and 70y and the reliability coefficient of the terminal station candidate position 70z are different reliability coefficients, so that it is possible to determine that the terminal station candidate position 70z is the optimal terminal station candidate position by determining based on the reliability coefficient.

Process According to Fifth Embodiment

Figure 33:
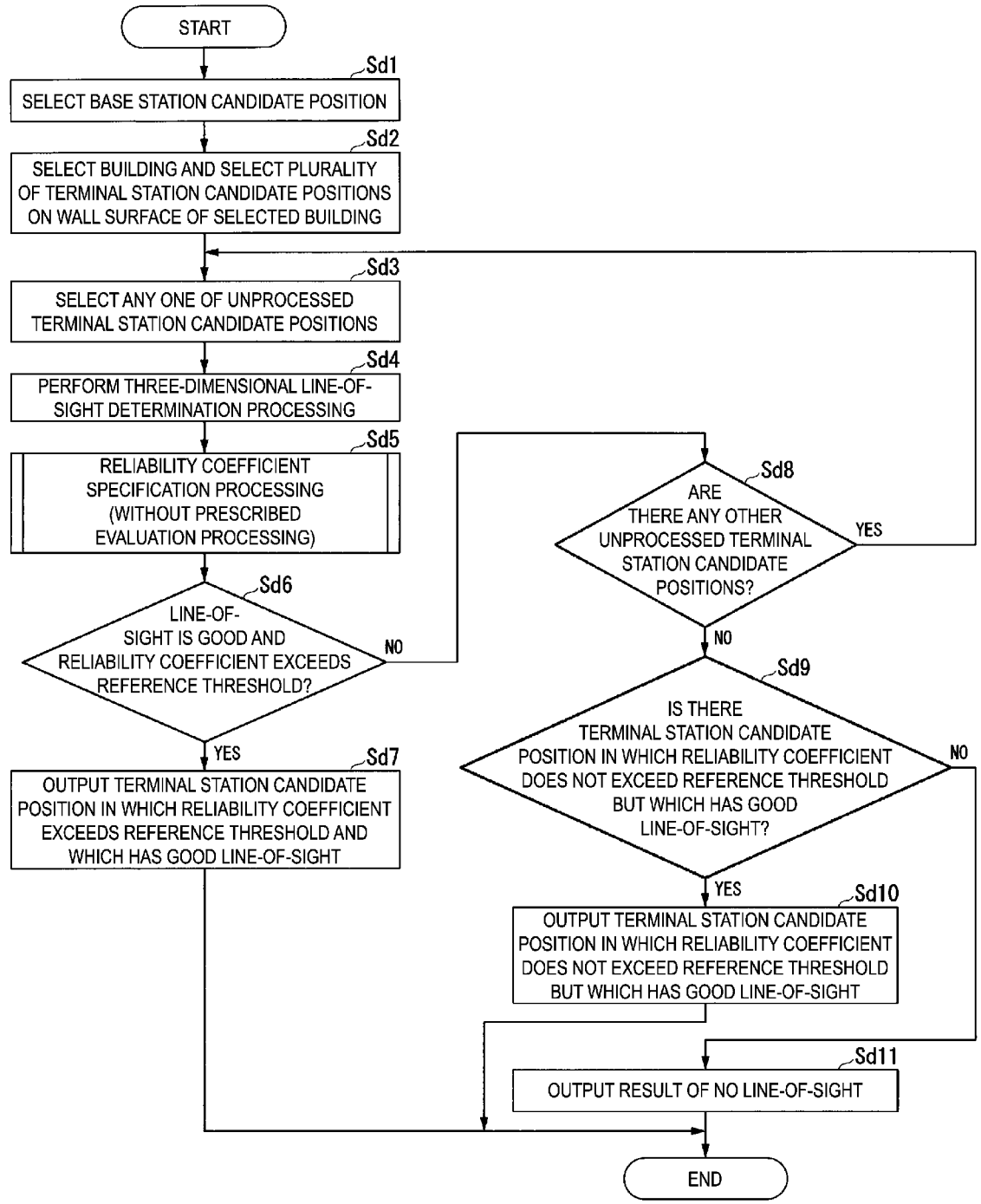
FIG. 33 is a flowchart illustrating a process flow of the point cloud data processing unit in the station placement assistance apparatus according to the fifth embodiment.

FIG. 33 is a flowchart illustrating a process flow of the point cloud data processing unit 6d according to the fifth embodiment. The process is a process corresponding to (5) the processing of the communication availability determination using the three-dimensional point cloud data of the station placement assistance method illustrated in FIG. 2. The flowchart illustrated in FIG. 33 illustrates an example in which the three-dimensional line-of-sight determination processing by the three-dimensional line-of-sight determination processing unit 23 is applied as the prescribed evaluation processing performed by the point cloud data processing unit 6d.

Prior to performing the process described below, the user of the station placement assistance apparatus 1d selects in advance whether to perform the processing to take into account the proximity range 100, that is, the processing to determine whether the base station candidate position 60 and the terminal station candidate position 70 are located within the range of the proximity range 100 or are located outside of the range of the proximity range 100. In a case where the user selects to perform the processing, the operation processing unit 10 outputs an instruction signal indicating "take into account the proximity range" in response to the user operation.

The three-dimensional candidate position selection unit 20d selects one base station candidate position data (step Sd1). The three-dimensional candidate position selection unit 20d selects data indicating each of the positions of the plurality of the terminal station candidate positions 70 selected by the user, which are positions on a wall surface with good line-of-sight of any one of the buildings selected by the user among the buildings with good line-of-sight in two dimensions from the base station candidate position 60 indicated by the selected base station candidate position data, as the plurality of terminal station candidate position data (step Sd2). The three-dimensional candidate position selection unit 20d selects any one of the unprocessed terminal station candidate position data (step Sd3).

The three-dimensional candidate position selection unit 20d outputs an instruction signal instructing the start of the processing including the selected base station candidate position data and the terminal station candidate position data to the three-dimensional line-of-sight determination processing unit 23. Upon receiving the instruction signal from the three-dimensional candidate position selection unit 20d, the three-dimensional line-of-sight determination processing unit 23 fetches the base station candidate position data and the terminal station candidate position data included in the instruction signal, and reads outs the point cloud data of the space between the base station candidate position 60 indicated by the base station candidate position data and the terminal station candidate position 70 indicated by the terminal station candidate position data from the point cloud data storage unit 13. Then, the three-dimensional line-of-sight determination processing unit 23 performs the three-dimensional line-of-sight determination processing based on the read point cloud data, and outputs the determination result to the three-dimensional candidate position selection unit 20d (step Sd4).

The three-dimensional candidate position selection unit 20d outputs the selected base station candidate position data and the terminal station candidate position data to the measurable range presence determination unit 31d of the positional relationship specification unit 21d, and outputs an instruction signal instructing the start of the processing of specifying the positional relationship to the measurable range specification unit 30. Upon receiving the instruction signal instructing the start of the processing of specifying the positional relationship from the three-dimensional candidate position selection unit 20d, the measurable range specification unit 30 performs a subroutine of the reliability coefficient specification processing (without the prescribed evaluation processing) illustrated in FIG. 34 (step Sd5).

Figure 34:
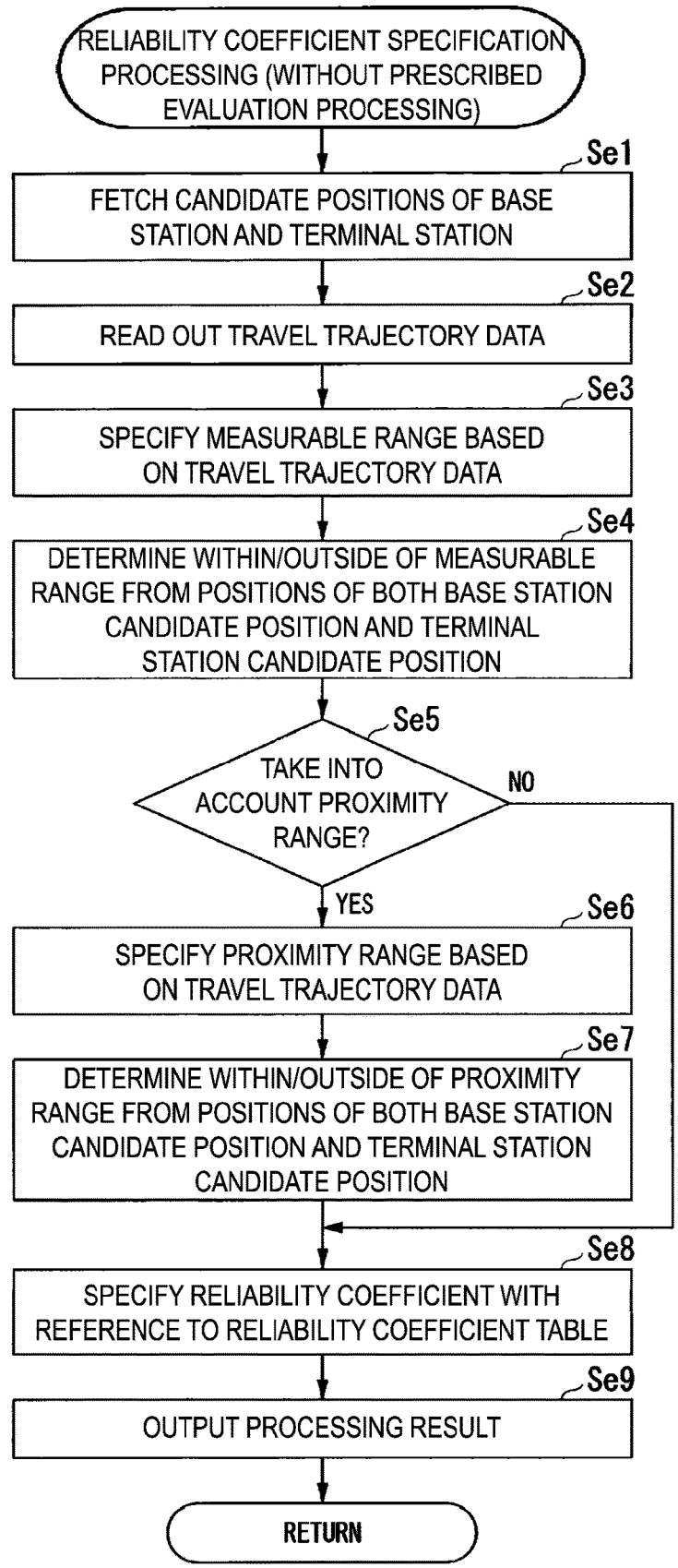
FIG. 34 is a flowchart illustrating a flow of a subroutine of a reliability coefficient specification processing performed according to the fifth embodiment.

As illustrated in FIG. 34, the measurable range presence determination unit 31d fetches the base station candidate position data and the terminal station candidate position data output by the three-dimensional candidate position selection unit 20d (step Se1). In steps Se2 and Se3, the same processing as in steps Sa2 and Sa3 of FIG. 15 is performed by the measurable range specification unit 30. In step Se4, the same processing as in step Sa4 is performed by the measurable range presence determination unit 31d.

For step Se5, the same processing as in step Sa8 is performed by the measurable range presence determination unit 31d. For steps Se6 and Se7, the same processing as in steps Sa9 and Sa10 is performed by the proximity range specification unit 32 and the proximity range presence determination unit 33, respectively. For steps Se8 and Se9, the same processing as in steps Sa11 and Sa12 is performed by the reliability coefficient specification unit 22a, and in step Se9, the reliability coefficient specification unit 22a outputs the specified reliability coefficient to the three-dimensional candidate position selection unit 20d, and exits the subroutine.

The three-dimensional candidate position selection unit 20d determines whether the processing result of the three-dimensional line-of-sight determination processing unit 23 is "good line-of-sight" and the reliability coefficient exceeds a predetermined reference threshold (step Sd6).

In a case where the three-dimensional candidate position selection unit 20d determines that the processing result of the three-dimensional line-of-sight determination processing unit 23 is "good line-of-sight" and that the reliability coefficient exceeds the predetermined reference threshold (step Sd6, Yes), the three-dimensional candidate position selection unit 20d displays the terminal station candidate position data to be processed on the screen as the "terminal station candidate position 70 which has good line-of-sight and in which the reliability coefficient exceeds the reference threshold", that is, the terminal station candidate position data indicating the optimal terminal station candidate position 70 (step Sd7).

On the other hand, in a case where the three-dimensional candidate position selection unit 20d determines that the processing result of the three-dimensional line-of-sight determination processing unit 23 is "no line-of-sight" or that the reliability coefficient does not exceed the predetermined reference threshold (step Sd6, No), the three-dimensional candidate position selection unit 20d determines whether there are any other unprocessed terminal station candidate positions 70 (step Sd8).

In a case where the three-dimensional candidate position selection unit 20d determines that there are other unprocessed terminal station candidate positions 70 (step Sd8, Yes), the process proceeds to step Sd3. On the other hand, in a case where the three-dimensional candidate position selection unit 20d determines that there is no other unprocessed terminal station candidate position 70 (step Sd8, No), the three-dimensional candidate position selection unit 20d determines whether there is a terminal station candidate position 70 in which the reliability coefficient does not exceed the reference threshold but which has good line-of-sight in the processed terminal station candidate positions 70 (step Sd9).

In the case where the three-dimensional candidate position selection unit 20d determines that there is a terminal station candidate position 70 in which the reliability coefficient does not exceed the reference threshold but which has good line-of-sight in the processed terminal station candidate positions 70 (step Sd9, Yes), the three-dimensional candidate position selection unit 20d displays the terminal station candidate position data of the terminal station candidate position 70 in which the reliability coefficient does not exceed the reference threshold but which has good line-of-sight as the terminal station candidate position data indicating the "terminal station candidate position 70 in which the reliability coefficient does not exceed the reference threshold but which has good line-of-sight" on the screen (step Sd10).

On the other hand, in the case where the three-dimensional candidate position selection unit 20d determines that there is no terminal station candidate position 70 in which the reliability coefficient does not exceed the reference threshold but which has good line-of-sight in the processed terminal station candidate positions 70 (step Sd9, No), the three-dimensional candidate position selection unit 20d displays the result of "no line-of-sight" on the screen (step Sd11).

For example, suppose that the three-dimensional candidate position selection unit 20d selects the position illustrated in FIG. 32 as the base station candidate position 60, selects the building 310 illustrated in FIG. 32 as any one of the buildings with good line-of-sight in two dimensions from the base station candidate position 60, and selects three terminal station candidate positions 70x, 70y, and 70z on a wall surface with good line-of-sight of the selected building.

Suppose that the reliability coefficient specification unit 22a performs the process of FIG. 33 in the order of the terminal station candidate positions 70x, 70y, and 70z. At this time, when the processing in the case of taking into account the proximity range 100 is performed, the reliability coefficient specification unit 22a specifies the reliability coefficient "50" for the terminal station candidate positions 70x and 70y because they correspond to the positional relationship pattern pt3 in the reliability coefficient table 25-1 in FIG. 5. In contrast, the reliability coefficient specification unit 22a specifies the reliability coefficient "80" for the terminal station candidate position 70z because it corresponds to the positional relationship pattern pt2 in the reliability coefficient table 25-1 in FIG. 5. Thus, it is possible for the three-dimensional candidate position selection unit 20d to select the terminal station candidate position 70z with the larger reliability coefficient as the optimal installation position.

In a case where the three-dimensional candidate position selection unit 20d does not select the terminal station candidate position 70z, the process proceeds through step Sd8 to step Sd9. In this case, in step Sd9, the three-dimensional candidate position selection unit 20d makes the determination of "Yes", that is, determines that there are terminal station candidate positions 70x and 70y in which the reliability coefficient does not exceed the reference threshold but which have good line-of-sight. Thus, in step Sd10, the three-dimensional candidate position selection unit 20d displays terminal station candidate position data for each of the terminal station candidate positions 70x and 70y on the screen.

In a case where none of the terminal station candidate positions 70x, 70y, and 70z have three-dimensional line-of-sight between them and the base station candidate position 60, the process proceeds through step Sd8 to step Sd9. In this case, the three-dimensional candidate position selection unit 20d makes the determination of "No" in step Sd9, and displays the result of "no line-of-sight" on the screen.

Another Configuration Example of Fifth Embodiment

Figure 35:
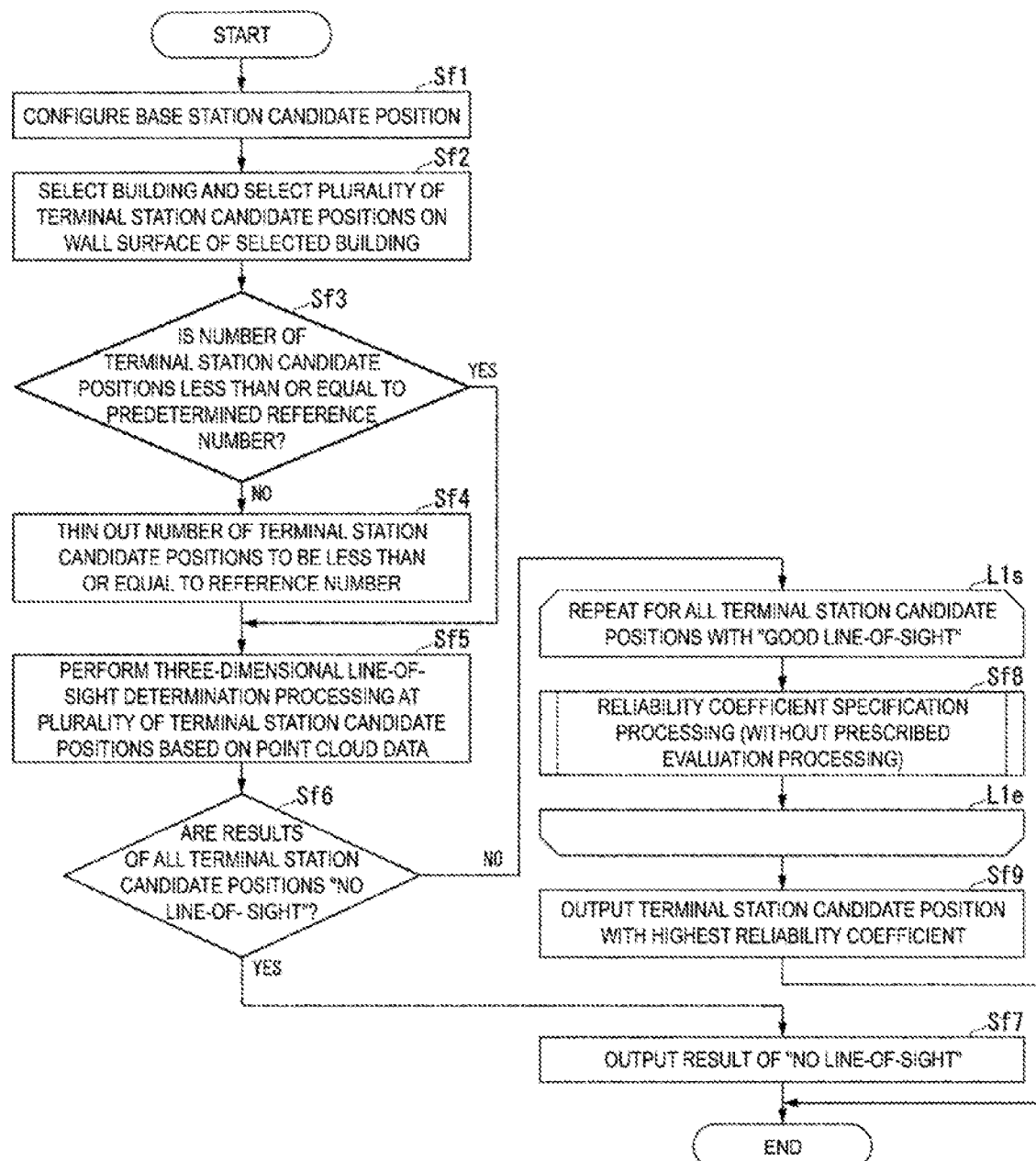
FIG. 35 is a flowchart illustrating a process flow according to another configuration example of the point cloud data processing unit in the station placement assistance apparatus according to the fifth embodiment.
Figure 36:
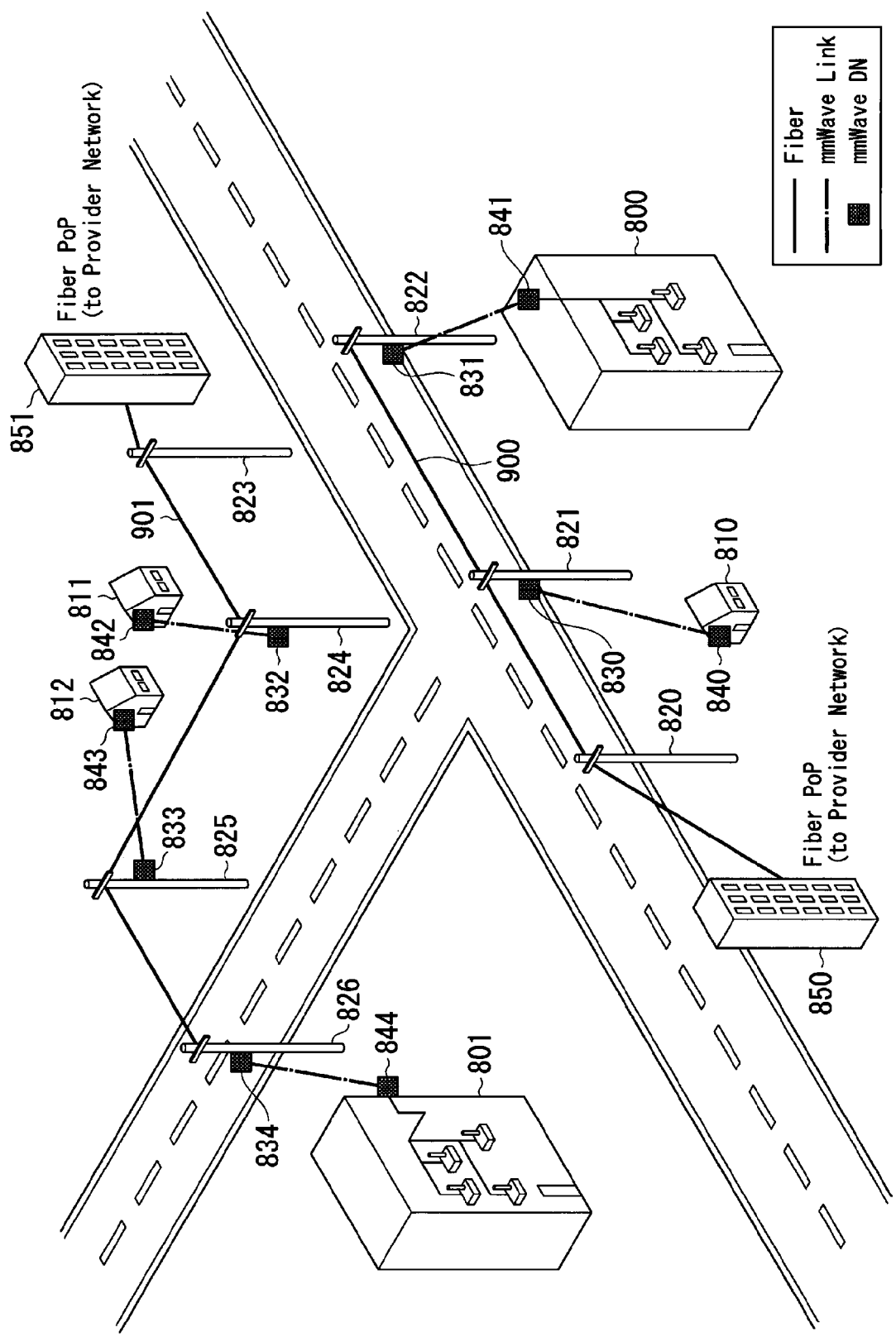
FIG. 36 is a diagram illustrating an example of a use case proposed by TIP.

In the flowchart illustrated in FIG. 33, the three-dimensional candidate position selection unit 20d selects one by one according to a predetermined order from among the plurality of terminal station candidate positions 70 to perform evaluation whether the terminal station candidate position is optimal, but the three-dimensional candidate position selection unit 20d may select the optimal terminal station candidate position 70 by performing the process of the flowchart illustrated in FIG. 35. Note that the process is also a process corresponding to (5) the processing of the communication availability determination using the three-dimensional point cloud data of the station placement assistance method illustrated in FIG. 2.

Prior to performing the process described below, the user of the station placement assistance apparatus 1d selects in advance whether to perform the processing to take into account the proximity range 100, that is, the processing to determine whether the base station candidate position 60 and the terminal station candidate position 70 are located within the range of the proximity range 100 or are located outside of the range of the proximity range 100. In a case where the user selects to perform the processing, the operation processing unit 10 outputs an instruction signal indicating "take into account the proximity range" in response to the user operation.

The three-dimensional candidate position selection unit 20d selects one base station candidate position data (step Sf1). The three-dimensional candidate position selection unit 20d selects data indicating each of the positions of the plurality of the terminal station candidate positions 70 selected by the user, which are positions on a wall surface with good line-of-sight of any one of the buildings selected by the user among the buildings with good line-of-sight in two dimensions from the base station candidate position 60 indicated by the selected base station candidate position data, as the plurality of terminal station candidate position data (step Sf2).

The three-dimensional candidate position selection unit 20d determines whether the number of selected terminal station candidate position data is less than or equal to a predetermined reference number (step Sf3). In a case where the three-dimensional candidate position selection unit 20d determines that the number of selected terminal station candidate position data is less than or equal to a predetermined reference number (step Sf3, Yes), the three-dimensional candidate position selection unit 20d outputs an instruction signal instructing the start of the processing including the base station candidate position data and the plurality of terminal station candidate position data to the three-dimensional line-of-sight determination processing unit 23, and the process proceeds to step Sf5.

On the other hand, in a case where the three-dimensional candidate position selection unit 20d determines that the number of selected terminal station candidate position data is not less than or equal to a predetermined reference number (step Sf3, No), the three-dimensional candidate position selection unit 20d thins out the terminal station candidate position data so as to be within the reference number and decreases the number of terminal station candidate position data (step Sf4), and outputs an instruction signal indicating the start of the processing including the base station candidate position data and the plurality of terminal station candidate position data after decreasing the number to the three-dimensional line-of-sight determination processing unit 23, and the process proceeds to step Sf5.

Upon receiving the instruction signal from the three-dimensional candidate position selection unit 20d, the three-dimensional line-of-sight determination processing unit 23 reads out the point cloud data of the space between the base station candidate position 60 indicated by the base station candidate position data and the terminal station candidate position 70 indicated by each of the plurality of terminal station candidate position data included in the instruction signal from the point cloud data storage unit 13, and performs the three-dimensional line-of-sight determination processing between the base station candidate position 60 and each of the plurality of terminal station candidate positions 70. The three-dimensional line-of-sight determination processing unit 23 outputs the processing result of the three-dimensional line-of-sight determination processing to the three-dimensional candidate position selection unit 20d (step Sf5).

The three-dimensional candidate position selection unit 20d fetches the processing result of the three-dimensional line-of-sight determination processing output by the three-dimensional line-of-sight determination processing unit 23, and determines whether the processing results of the fetched three-dimensional line-of-sight determination processing are all "no line-of-sight" (step Sf6).

In a case where the three-dimensional candidate position selection unit 20d determines that the processing results of the three-dimensional line-of-sight determination processing are all "no line-of-sight" (step Sf6, Yes), the three-dimensional candidate position selection unit 20d displays the result of "no line-of-sight" on the screen (step Sf7).

On the other hand, in a case where the three-dimensional candidate position selection unit 20d determines that the processing results of the three-dimensional line-of-sight determination processing are not all "no line-of-sight" (step Sf6, No), the three-dimensional candidate position selection unit 20d generates combinations of the base station candidate position data and each of the plurality of terminal station candidate position data. The three-dimensional candidate position selection unit 20d outputs the plurality of generated combinations to the measurable range presence determination unit 31d of the positional relationship specification unit 21d one by one, and outputs an instruction signal instructing the start of the processing of specifying the positional relationship to the measurable range specification unit 30 repeatedly for the number of combinations (loops L1s to L1e). The positional relationship specification unit 21d and the reliability coefficient specification unit 22a perform the subroutine of the reliability coefficient specification processing (without the prescribed evaluation processing) illustrated in FIG. 34 repeatedly for the number of combinations generated by the three-dimensional candidate position selection unit 20d (step Sf8). The reliability coefficient specification unit 22a outputs the reliability coefficient for each combination to the three-dimensional candidate position selection unit 20d.

The three-dimensional candidate position selection unit 20d fetches the reliability coefficient for each combination output by the reliability coefficient specification unit 22a, selects a combination having the largest reliability coefficient, and displays the position indicated by the terminal station candidate position data included in the selected combination as the optimal terminal station candidate position 70 on the screen (step Sf9).

Here, suppose that the three-dimensional candidate position selection unit 20d selects the position illustrated in FIG. 32 as the base station candidate position 60, selects the building 310 illustrated in FIG. 32 as any one of the buildings with good line-of-sight in two dimensions from the base station candidate position 60, and selects three terminal station candidate positions 70x, 70y, and 70z on a wall surface with good line-of-sight of the selected building. In this case, by the process illustrated in FIG. 35 described above, the three-dimensional candidate position selection unit 20d selects the terminal station candidate position 70z having the largest reliability coefficient as the optimal position.

In a case where none of the terminal station candidate positions 70x, 70y, and 70z have three-dimensional line-of-sight between them and the base station candidate position 60, the three-dimensional candidate position selection unit 20d makes the determination of "Yes" in step Sf6, and displays the result of "no line-of-sight" on the screen.

Comparing the process of FIG. 33 with the process of FIG. 35, because the plurality of terminal station candidate positions 70 are processed one by one in FIG. 33, if there is a terminal station candidate position 70 which has good line-of-sight in three dimensions and in which the reliability coefficient exceeds the reference threshold in the middle of the processing, the terminal station candidate position 70 is selected as optimal. Thus, even if there is a larger reliability coefficient among the unprocessed terminal station candidate positions 70, it is not selected. In contrast, in the process of FIG. 35, all of the reliability coefficients of the terminal station candidate positions 70 having good line-of-sight in three dimensions are specified and the terminal station candidate position 70 having the largest reliability coefficient among the specified reliability coefficients is selected as optimal, so that the optimal terminal station candidate position 70 can be selected more accurately even though it takes more time compared to the process of FIG. 33.

In the station placement assistance apparatus 1d according to the fifth embodiment described above, in a case where the plurality of terminal station candidate positions 70 on the wall surface of the building are selected, the three-dimensional candidate position selection unit 20d specifies the optimal terminal station candidate position 70 from among the plurality of terminal station candidate positions 70 based on the reliability coefficient corresponding to each of the plurality of terminal station candidate positions 70 specified by the reliability coefficient specification unit 22a. As a result, even in a case where the state of acquisition of the point cloud data of the space between the base station candidate position 60 and the terminal station candidate position 70 is not good, it is possible for the user to perform an appropriate base-station design.

Note that in the configuration and another configuration example of the fifth embodiment described above, an example is illustrated in which the three-dimensional line-of-sight determination processing by the three-dimensional line-of-sight determination processing unit 23 is applied as a prescribed evaluation processing, but the shield factor calculation processing by the shield factor calculation unit 24 may be applied as a prescribed evaluation processing. In this case, the determination processing by the three-dimensional candidate position selection unit 20d of step Sd6 is a determination processing of "whether the shield factor is sufficiently low to perform wireless communication and the reliability coefficient exceeds the reference threshold". The determination processing by the three-dimensional candidate position selection unit 20d of step Sf6 is a processing for determining "whether none of the shield factors of the terminal station candidate positions are sufficiently low to perform wireless communication".

Note that instead of the positional relationship specification unit 21d, the reliability coefficient specification unit 22a, and the storage unit 25 of the configuration and another configuration example of the fifth embodiment described above, the positional relationship specification unit 21b, the reliability coefficient specification unit 22b, and the storage unit 25b of the third embodiment may be provided. In this case, as a subroutine of the reliability coefficient specification processing (without the prescribed evaluation processing) illustrated in FIG. 34, the processing of steps Sb1 to Sb6 in FIG. 18 is applied, and in the processing of step Sb1, the base station distance calculation unit 35 fetches the base station candidate position data output by the three-dimensional candidate position selection unit 20d, and the terminal station distance calculation unit 36 performs the processing of fetching the terminal station candidate position data output by the three-dimensional candidate position selection unit 20d.

In the configuration and another configuration example of the fifth embodiment described above, the connection line segment specification unit 26 and the intersection determination unit 27 according to the fourth embodiment may be added, and the reliability coefficient specification unit 22a may determine the reliability coefficient by taking into account the intersection of the connection line segment 90 and the travel trajectory 50. In the configuration of the fifth embodiment described above, the connection line segment specification unit 26, the intersection determination unit 27, and the measurable range percentage calculation unit 28 according to the fourth embodiment may be added, and the reliability coefficient specification unit 22a may determine the reliability coefficient by taking into account the intersection of the connection line segment 90 and the travel trajectory 50, and the percentage of the connection line segment 90 included in the range of the measurable range 110.

Note that, in the first to fifth embodiments described above, millimeter wave radio has been illustrated as an example of wireless communication performed between the base station apparatus installed at the base station candidate position 60 and the terminal station apparatus installed at the terminal station candidate position 70, but it may be a terrestrial digital communication, a communication by satellite radio wave, or a communication using Ultra High Frequency (UHF), other than the millimeter wave wireless communication.

In the fifth embodiment described above, in the processing illustrated in steps Sd6 and Sd9 of FIG. 33 and step Sf3 of FIG. 35, determination processing using an inequality sign or an inequality sign with an equality sign is performed. However, the present invention is not limited to those embodiments, and determination processing as to "whether a value is greater than a threshold", "whether a value is less than a threshold", "whether a value is equal to or greater than a threshold", and "whether a value is equal to or less than a threshold" is merely an example. Depending on how a threshold is set, the above determination processing may be respectively replaced by "whether a value is equal to or greater than a threshold", "whether a value is equal to or less than a threshold", "whether a value is greater than a threshold", and "whether a value is less than a threshold". The threshold used in the determination processing is also merely an example, and a different threshold may be used for each threshold.

The station placement assistance apparatuses 1, 1a, 1b, 1c, and 1d in the above-described embodiments may be implemented by a computer. In this case, a program for realizing the functions may be recorded on a computer-readable recording medium and the program recorded on the recording medium may be read and executed by a computer system to achieve the functions. Note that the "computer system" as used herein includes an OS and hardware such as peripheral devices. The "computer-readable recording medium" refers to a portable medium such as a flexible disk, a magneto-optical disk, a ROM, or a CD-ROM, or a storage device such as a hard disk built into a computer system. Further, the "computer-readable recording medium" may also include such a medium that stores programs dynamically for a short period of time, one example of which is a communication line used when a program is transmitted via a network such as the Internet or a communication line such as a telephone line, and may also include such a medium that stores programs for a certain period of time, one example of which is a volatile memory inside a computer system that functions as a server or a client in the case. The above program may be a program for implementing a part of the aforementioned functions, may be a program capable of implementing the aforementioned functions in combination with another program that has already been recorded in the computer system, or may be a program to be implemented using a programmable logic device such as a field programmable gate array (FPGA).

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

In a base-station design that uses point cloud data to decide a place to install a wireless base station and a terminal station, the present invention can be applied for line-of-sight determination or shield factor calculation from the base station installed on an outdoor facility such as a utility pole to the terminal station installed on a wall surface of a building.

REFERENCE SIGNS LIST

1: Station placement assistance apparatus
2: Design area designation unit
3: Base station candidate position extraction unit
4: Terminal station candidate position extraction unit
5: Two-dimensional line-of-sight determination processing unit
6: Point cloud data processing unit
7: Station number calculation unit
10: Operation processing unit
11: Map data storage unit
12: Facility data storage unit
13: Point cloud data storage unit
14: Travel trajectory data storage unit
15: Two-dimensional line-of-sight determination result storage unit
20: Three-dimensional candidate position selection unit
21: Positional relationship specification unit
22: Reliability coefficient specification unit
23: Three-dimensional line-of-sight determination processing unit
24: Shield factor calculation unit

The invention claimed is:

1. A station placement assistance method comprising:
specifying a positional relationship including generating base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and
specifying a reliability coefficient indicating a degree of reliability of a processing result of a prescribed evaluation processing performed based on the point cloud data, based on the base station positional relationship specification data and the terminal station positional relationship specification data;
wherein specifying the reliability coefficient includes calculating a first reliability index value for the base station candidate position by applying a first function indicating a higher reliability index value as the distance from the travel trajectory is shorter to the base station positional relationship specification data, calculating a second reliability index value for the terminal station candidate position by applying a second function indicating a higher reliability index value as the distance from the travel trajectory is shorter to the terminal station positional relationship specification data, and specifying the reliability coefficient based on the first reliability index value and the second reliability index value calculated.

2. The station placement assistance method according to claim 1, wherein
the specifying the positional relationship comprises:
specifying a measurable range including generating measurable range data indicating a measurable range based on the travel trajectory data and the measurable distance; and determining measurable range presence including determining, based on the measurable range data and the base station candidate position data, whether a base station candidate position is present within a range of the measurable range to generate a determination result as the base station positional relationship specification data, and determining, based on the measurable range data and the terminal station candidate position data, whether a terminal station candidate position is present within a range of the measurable range to generate a determination result as the terminal station positional relationship specification data.

3. The station placement assistance method according to claim 2, wherein the specifying the positional relationship comprises:

specifying a proximity range including generating proximity range data indicating a proximity range based on the travel trajectory data and a proximity distance predetermined that is shorter than the measurable distance; and determining proximity range presence including determining, based on the proximity range data and the base station candidate position data, whether the base station candidate position is present within a range of the proximity range to add a determination result to the base station positional relationship specification data generated in the determining the measurable range presence, and determining, based on the proximity range data and the terminal station candidate position data, whether the terminal station candidate position is present within a range of the proximity range to add a determination result to the terminal station positional relationship specification data generated in the determining the measurable range presence.

4. The station placement assistance method according to claim 1, wherein the specifying the positional relationship comprises:

calculating a base station distance including generating a distance from the travel trajectory calculated based on the travel trajectory data and the base station candidate position data to the base station candidate position as the base station positional relationship specification data; and calculating a terminal station distance including generating a distance from the travel trajectory calculated based on the travel trajectory data and the terminal station candidate position data to the terminal station candidate position as the terminal station positional relationship specification data.

5. The station placement assistance method according to claim 1, comprising specifying a connection line segment including generating connection line segment data indicating a connection line segment connecting the base station candidate position and the terminal station candidate position, based on the base station candidate position data and the terminal station candidate position data; and determining intersection including determining whether the travel trajectory intersects with the connection line segment based on the travel trajectory data and the connection line segment data, wherein the specifying the reliability coefficient comprises:

weighting the reliability coefficient specified based on a determination result in the determining the intersection, or the specifying the connection line segment and the determining the intersection; and calculating a measurable range percentage including calculating a percentage of the connection line segment present within a range of the measurable range, in a case where it is determined that the travel trajectory and the connection line segment intersect in the determining the intersection, and the specifying the reliability coefficient comprises:

weighting the reliability coefficient specified based on a determination result in the determining the intersection and the percentage of the connection line segment present within the range of the measurable range.

6. The station placement assistance method according to claim 1, comprising:

in a case where a plurality of the terminal station candidate positions on a wall surface of a building are selected, selecting a three-dimensional candidate position including specifying an optimal one of the terminal station candidate position from among a plurality of the terminal station candidate positions based on the reliability coefficient corresponding to a plurality of the base station candidate positions specified by the specifying the reliability coefficient.

7. A station placement assistance apparatus comprising:

a processor; and a storage medium having computer program instructions stored thereon, when executed by the processor, perform to:

generate base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and specify a reliability coefficient indicating a degree of reliability of a processing result of a prescribed evaluation processing performed based on the point cloud data, based on the base station positional relationship specification data and the terminal station positional relationship specification data;

wherein specify the reliability coefficient includes calculating a first reliability index value for the base station candidate position by applying a first function indicating a higher reliability index value as the distance from the travel trajectory is shorter to the base station positional relationship specification data, calculating a second reliability index value for the terminal station candidate position by applying a second function indicating a higher reliability index value as the distance from the travel trajectory is shorter to the terminal station positional relationship specification data, and specifying the reliability coefficient based on the first reliability index value and the second reliability index value calculated.

8. A non-transitory computer-readable medium having computer-executable instructions that, upon execution of the instructions by a processor of a computer, cause the computer:

specifying a positional relationship including generating base station positional relationship specification data indicating a positional relationship between travel trajectory and a base station candidate position, and terminal station positional relationship specification data indicating a positional relationship between the travel trajectory and a terminal station candidate position, based on travel trajectory data indicating the travel trajectory of a moving body for measuring an object present in a three-dimensional space within a measurable distance predetermined and acquiring point cloud data indicating a position of the object measured in the three-dimensional space, the measurable distance, base station candidate position data indicating a candidate position for installing a base station apparatus, and terminal station candidate position data indicating a candidate position for installing a terminal station apparatus; and specifying a reliability coefficient indicating a degree of reliability of a processing result of a prescribed evaluation processing performed based on the point cloud data, based on the base station positional relationship specification data and the terminal station positional relationship specification data;

wherein specifying the reliability coefficient includes calculating a first reliability index value for the base station candidate position by applying a first function indicating a higher reliability index value as the distance from the travel trajectory is shorter to the base station positional relationship specification data, calculating a second reliability index value for the terminal station candidate position by applying a second function indicating a higher reliability index value as the distance from the travel trajectory is shorter to the terminal station positional relationship specification data, and specifying the reliability coefficient based on the first reliability index value and the second reliability index value calculated.

9. The station placement assistance apparatus of claim 7 wherein specifying the positional relationship includes specifying a measurable range including generating measurable range data indicating a measurable range based on the travel trajectory data and the measurable distance; and determining measurable range presence including determining, based on the measurable range data and the base station candidate position data, whether a base station candidate position is present within a range of the measurable range to generate a determination result as the base station positional relationship specification data, and determining, based on the measurable range data and the terminal station candidate position data, whether a terminal station candidate position is present within a range of the measurable range to generate a determination result as the terminal station positional relationship specification data.

10. The station placement assistance apparatus of claim 9 wherein specifying the positional relationship includes:

specifying a proximity range including generating proximity range data indicating a proximity range based on the travel trajectory data and a proximity distance predetermined that is shorter than the measurable distance; and determining proximity range presence including determining, based on the proximity range data and the base station candidate position data, whether the base station candidate position is present within a range of the proximity range to add a determination result to the base station positional relationship specification data generated in the determining the measurable range presence, and determining, based on the proximity range data and the terminal station candidate position data, whether the terminal station candidate position is present within a range of the proximity range to add a determination result to the terminal station positional relationship specification data generated in the determining the measurable range presence.

11. The station placement assistance apparatus of claim 7 wherein in a case where a plurality of the terminal station candidate positions on a wall surface of a building are selected, selecting a three-dimensional candidate position including specifying an optimal one of the terminal station candidate position from among a plurality of the terminal station candidate positions based on the reliability coefficient corresponding to a plurality of the base station candidate positions specified by the specifying the reliability coefficient.

* * * * *